United States Patent
Nguyen-Dang

(10) Patent No.: US 11,191,045 B2
(45) Date of Patent: Nov. 30, 2021

(54) MESH NETWORK SYSTEM AND TECHNIQUES

(71) Applicant: SMARTREK TECHNOLOGIES INC., Saint-Honore-de-Shenley (CA)

(72) Inventor: Thien-Ly Nguyen-Dang, Quebec (CA)

(73) Assignee: SMARTREK TECHNOLOGIES INC., Saint-Honore-de-Shenley (CA)

(*) Notice: Subject to any disclaimer, the term of this patent is extended or adjusted under 35 U.S.C. 154(b) by 32 days.

(21) Appl. No.: 16/536,698

(22) Filed: Aug. 9, 2019

(65) Prior Publication Data
US 2020/0092832 A1 Mar. 19, 2020

Related U.S. Application Data

(63) Continuation of application No. 14/661,572, filed on Mar. 18, 2015, now Pat. No. 10,383,069.
(Continued)

(51) Int. Cl.
*H04W 56/00* (2009.01)
*H04W 52/02* (2009.01)
*H04W 84/18* (2009.01)

(52) U.S. Cl.
CPC ..... *H04W 56/001* (2013.01); *H04W 52/0209* (2013.01); *H04W 52/0219* (2013.01);
(Continued)

(58) Field of Classification Search
None
See application file for complete search history.

(56) References Cited

U.S. PATENT DOCUMENTS 5,793,993 A 8/1998 Broedner et al.
6,243,391 B1 * 6/2001 Holmquist ........ H04L 12/40026
370/410
(Continued)

FOREIGN PATENT DOCUMENTS

BR PI0714314 A2 4/2013
CA 2734301 A1 9/2012
(Continued)

OTHER PUBLICATIONS

Biagioni, "Collision-Free Broadcasting in Wireless Ad-Hoc Networks Using Cooperative Diversity", Information and Computer Sciences, University of Hawai, 2007, 10 pages.
(Continued)

*Primary Examiner* — Gregory B Sefcheck
*Assistant Examiner* — Suk Jin Kang
(74) *Attorney, Agent, or Firm* — BCF LLP

(57) ABSTRACT

The present relates to a node to be integrated in a network of wirelessly connected nodes, to a network system, to method for operating a node of a network, and to a method for communicating within a network. A method is disclosed for communicating within a network of cooperatively synchronized nodes, configured to broadcast data packets to the network during broadcast phases through a flooding mechanism, each data packet comprising hop data. The method comprises, for each broadcast phase, broadcasting a data packet from a source node during a predetermined time slot; and receiving the data packet at one or more destination node during said predetermined time slot. The broadcasting and receiving are repeated according to the hop data, at respective predetermined time slots, wherein each destination node corresponds to a source node in a next execution of broadcasting and the data packet received corresponds
(Continued)

substantially to the data packet to be broadcasted in the next repetition.

20 Claims, 54 Drawing Sheets

Related U.S. Application Data

(60) Provisional application No. 61/955,018, filed on Mar. 18, 2014.

(52) U.S. Cl.
CPC ........ *H04W 52/0222* (2013.01); *H04W 84/18* (2013.01); *Y02D 30/70* (2020.08)

(56) References Cited

U.S. PATENT DOCUMENTS

| | | | |
|---|---|---|---|
| 6,622,178 B1 | 9/2003 | Burke et al. | |
| 6,973,052 B2 | 12/2005 | Wang et al. | |
| 7,483,450 B1 | 1/2009 | Giese et al. | |
| 8,254,351 B2 | 8/2012 | Fitzner et al. | |
| 8,265,797 B2 | 9/2012 | Nickerson et al. | |
| 8,305,954 B2 | 11/2012 | Salonidis et al. | |
| 8,457,674 B2 | 6/2013 | Sandhu et al. | |
| 8,458,266 B2 | 6/2013 | Jeong et al. | |
| 8,565,927 B1 | 10/2013 | Campbell et al. | |
| 8,583,066 B2 | 11/2013 | Soul et al. | |
| 8,600,692 B2 | 12/2013 | Lachapelle | |
| 8,605,621 B2 | 12/2013 | Javaid et al. | |
| 8,774,820 B2 | 7/2014 | Wang et al. | |
| 8,830,891 B2 | 9/2014 | Chhabra | |
| 9,137,815 B2 | 9/2015 | Sampath et al. | |
| 2003/0056136 A1 | 3/2003 | Aweya et al. | |
| 2004/0153771 A1 | 8/2004 | Sund et al. | |
| 2005/0063313 A1 | 3/2005 | Nanavati et al. | |
| 2005/0102430 A1 | 5/2005 | Huber et al. | |
| 2005/0136882 A1* | 6/2005 | Boulton | H04B 1/7156 455/343.4 |
| 2005/0141470 A1 | 6/2005 | Jung et al. | |
| 2005/0233704 A1 | 10/2005 | Maekawa | |
| 2005/0233789 A1 | 10/2005 | Maekawa | |
| 2006/0240798 A1 | 10/2006 | Jarosinski et al. | |
| 2006/0250220 A1 | 11/2006 | Stewart | |
| 2006/0270417 A1* | 11/2006 | Chi | G06F 3/0231 455/452.2 |
| 2008/0031208 A1 | 2/2008 | Abhishek et al. | |
| 2008/0219210 A1 | 9/2008 | Shuey et al. | |
| 2009/0047930 A1 | 2/2009 | Krishnaswamy et al. | |
| 2009/0092069 A1* | 4/2009 | Rhee | H04W 52/0241 370/311 |
| 2010/0097969 A1* | 4/2010 | De Kimpe | H04W 52/0216 370/311 |
| 2010/0106797 A1 | 4/2010 | Nagaraja | |
| 2010/0106989 A1 | 4/2010 | Chen | |
| 2010/0229011 A1 | 9/2010 | Pedersen et al. | |
| 2011/0138210 A1 | 6/2011 | Belali et al. | |
| 2012/0131369 A1 | 5/2012 | Paljug | |
| 2012/0297212 A1* | 11/2012 | Belali | G06F 1/3209 713/310 |
| 2012/0310599 A1 | 12/2012 | Tanaka et al. | |
| 2013/0223481 A1* | 8/2013 | Flammer, III | H04B 1/713 375/136 |
| 2013/0290757 A1 | 10/2013 | Barlow et al. | |
| 2013/0301471 A1* | 11/2013 | Brown | H04W 40/30 370/254 |
| 2013/0318380 A1 | 11/2013 | Behrens et al. | |
| 2013/0329617 A1* | 12/2013 | Jarosinski | H04B 1/1615 370/311 |
| 2014/0010138 A1* | 1/2014 | Flammer, III | H04L 1/1854 370/312 |
| 2014/0047254 A1 | 2/2014 | Ha et al. | |
| 2014/0269561 A1 | 9/2014 | Tuzi | |
| 2014/0280726 A1* | 9/2014 | Tuzi | H04L 45/02 709/217 |
| 2015/0095537 A1 | 4/2015 | Sengoku | |
| 2015/0100711 A1 | 4/2015 | Sengoku | |
| 2015/0180653 A1 | 6/2015 | Nix | |
| 2015/0234774 A1 | 8/2015 | Sengoku | |
| 2015/0263833 A1* | 9/2015 | Li | H04L 12/403 370/449 |
| 2017/0264339 A1* | 9/2017 | Flammer, III | H04W 76/15 |

FOREIGN PATENT DOCUMENTS

| | | |
|---|---|---|
| CN | 101349914 A | 1/2009 |
| CN | 100493212 C | 5/2009 |
| CN | 100583178 C | 1/2010 |
| CN | 102111843 A | 6/2011 |
| CN | 102138493 A | 8/2011 |
| CN | 102440172 A | 5/2012 |
| CN | 102547906 A | 7/2012 |
| CN | 102647250 A | 8/2012 |
| CN | 103152143 A | 6/2013 |
| CN | 103166730 A | 6/2013 |
| CN | 103210818 A | 7/2013 |
| CN | 203167738 U | 9/2013 |
| CN | 103354654 A | 10/2013 |
| CN | 203415085 U | 1/2014 |
| CN | 102387602 B | 2/2014 |
| DE | 10330860 B4 | 12/2006 |
| HK | 1145884 A1 | 9/2013 |
| JP | 4733052 B2 | 7/2011 |
| JP | 2013013049 A | 1/2013 |
| JP | 2013102485 A | 5/2013 |
| JP | 5252658 B2 | 7/2013 |
| JP | 5331591 B2 | 10/2013 |
| JP | 5373925 B2 | 12/2013 |
| JP | 5386743 B2 | 1/2014 |
| JP | 5389933 B2 | 1/2014 |
| KR | 100999686 B1 | 12/2010 |
| KR | 101085364 B1 | 11/2011 |
| KR | 101097503 B1 | 12/2011 |
| KR | 101241905 B1 | 3/2013 |
| KR | 20130137250 A | 12/2013 |
| TW | I426740 B | 2/2014 |
| WO | 2007/117860 A2 | 10/2007 |
| WO | 2009/013234 A1 | 1/2009 |

OTHER PUBLICATIONS

Ferrari et al., "Efficient Network Flooding and Time Synchronization with Glossy", Information Processing in Sensor Networks (IPSN), 10th International Conference on IEEE, 2011, pp. 73-84.
Jakllari et al., "On Broadcasting with Cooperative Diversity in Multi-hop Wireless Networks", IEEE Journal on Selected Areas in Communications, vol. 25, No. 2, Feb. 2007, pp. 484-496.
Scaglione, "Opportunistic Large Arrays: Cooperative Transmission in Wireless Multihop Ad Hoc Networks to Reach Far Distances", IEEE Transactions on Signal Processing, vol. 51, No. 8, Aug. 2003, pp. 2082-2092.
Sirkeci-Mergen et al., "Asymptotic Analysis of Multi-Stage Cooperative Broadcast in Wireless Networks", IEEE/ACM Transactions on Networking (TON), 14.SI, 2006, pp. 2531-2550.

\* cited by examiner

TYPICAL END NODE BLOCK SCHEMATIC

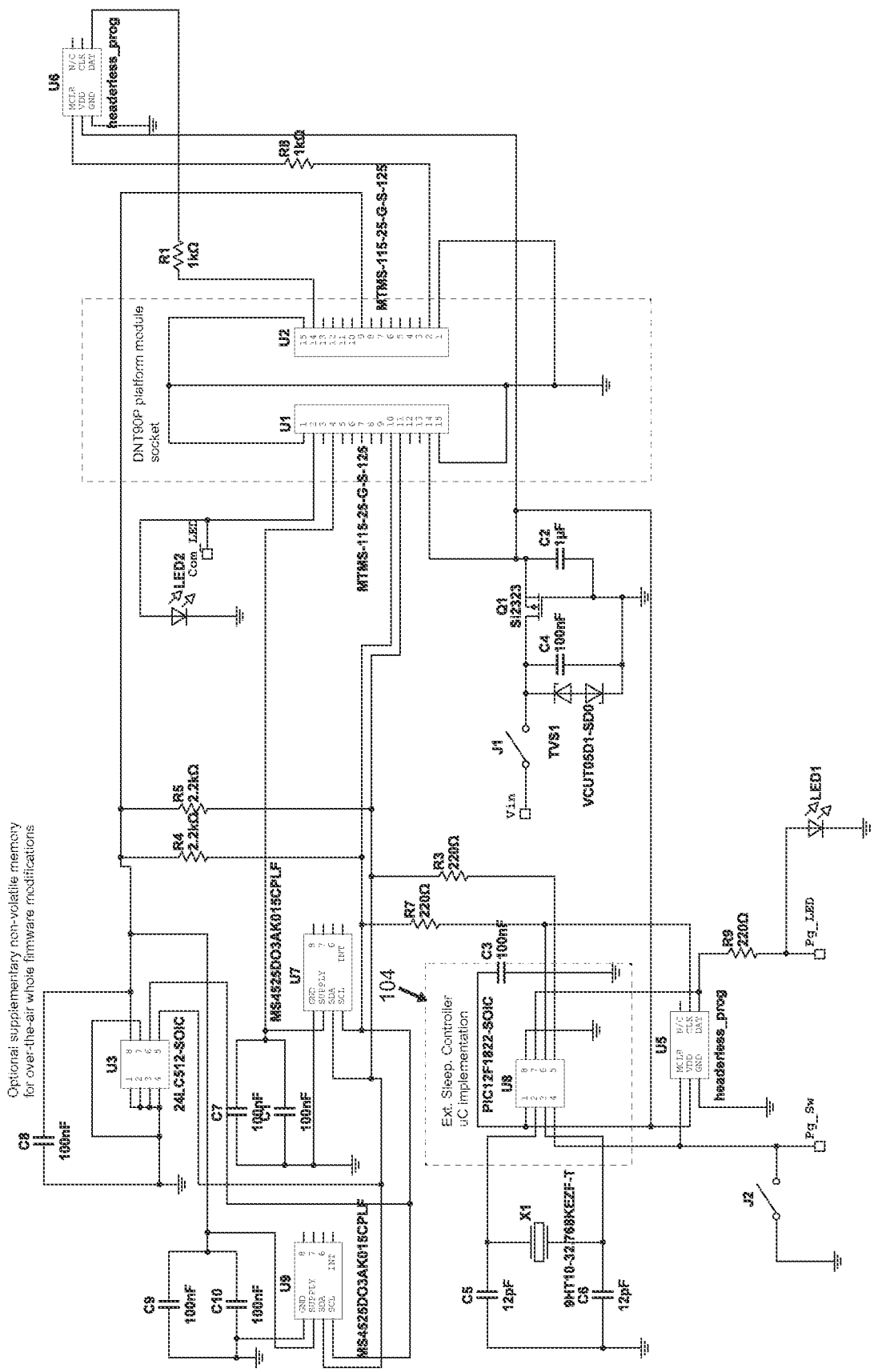
FIGURE 1B - EXAMPLE DUAL PORT VACUUM SENSOR INTEGRATION

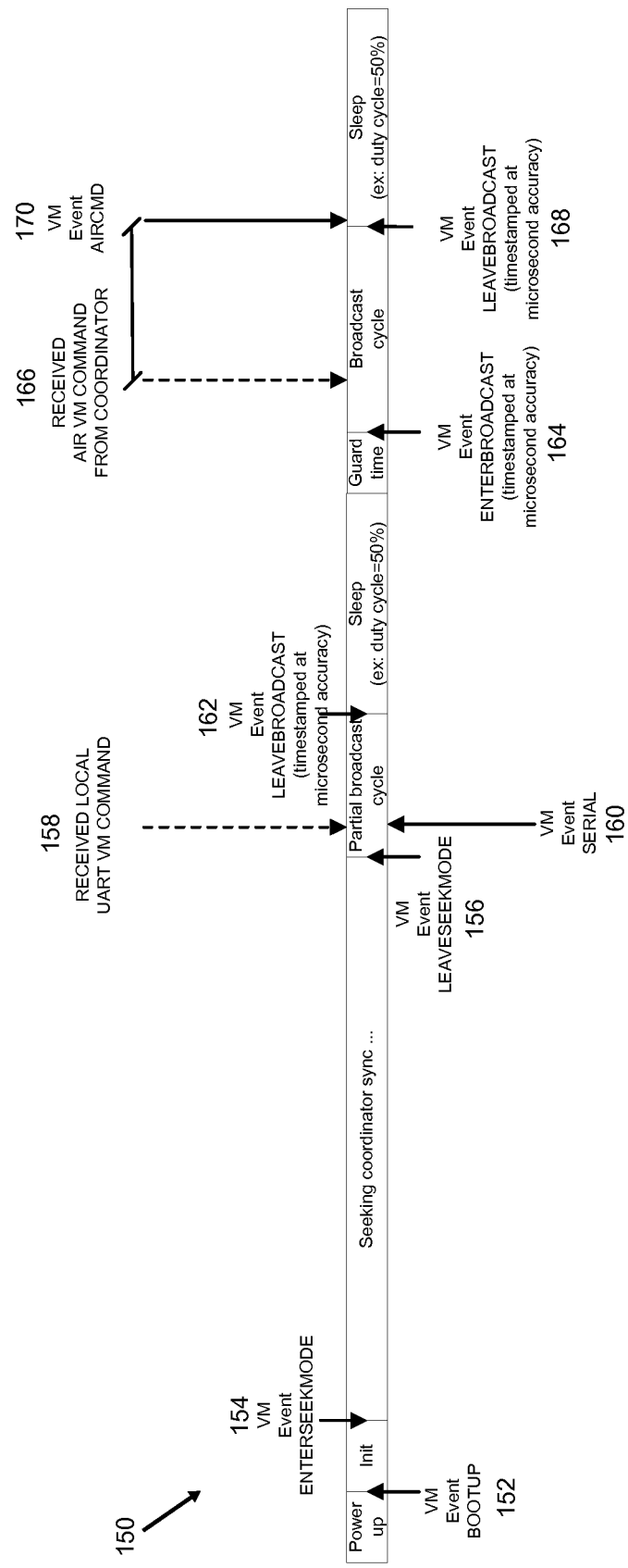

Example special functions executable by user (non-exhaustive list):

GetExecType()   : returns eventTypeID number

Send(var len)   : sets vm_regBufferCount = len, thus triggering a send operation, either via local comm. Bus, or via RF packet reply Delay(var len)   : this should be converted at bytecode compile time to multiple static calls to static delay function, so that the VM hypervisor can check for time overflows GetBuffer(...)   : set of accessor functions for R SetBuffer(...)   : set of mutator functions for R CopyBuffer(r1, r2, len): copy len bytes from location R[r2] to buffer location R[r1]

GetRegisterXXX(...)   : set of accessors for configuration register in memory set XXX (can be volatile, non-volatile...). In the preferred embodiment, there are 3 such sets: RAM, RAMBUF, EEPROM. EEPROM is the non-volatile holder, RAMBUF is the temporary structure that the user is allowed to write to, and RAM is the effective configuration used by the mesh controller.

SetRegisterXXX(...)   : set of mutators for configuration register

TransferConfigXXX()   : set of functions to transfer of all configuration register from RAMBUF to destination XXX. If XXX=RAMBUF, then transfer from RAM->RAMBUF GetPinIn(ID)   : get state of I/O pin ID. Note that allowable ID is defined by VM engine (as a sandbox security measure, not all pins of the hardware uC is typically allowed).

GetPinDir(ID)   : get direction of I/O pin ID

SetPinOut(ID, val)   : set state of I/O pin ID

SetPinDir(ID, dir)   : set direction of I/O pin ID

GetPerReg(reg)   : accessor for a SFR ("peripheral" uC-specific register) (reg is mapped to specific uC's own SFRs, with optional read/only flags also mapped, in order to generate a sandbox in which user code can control certain native SFRs, but not all of them, for mesh operation safety purposes)

SetPerReg(reg)   : same as above, but mutator

I2C_Stop()   : master I2C stop signal

I2C_ReadAck()   : master I2C read and ACK signal send

I2C_ReadNak()   : master I2C read and NAK signal send

I2C_Start(addr_rw)   : master I2C start command, with addr_rw is I2C address bit-combined with read-write flag (LSBit)

I2C_Write(val) : master I2C write command

FIGURE 3C

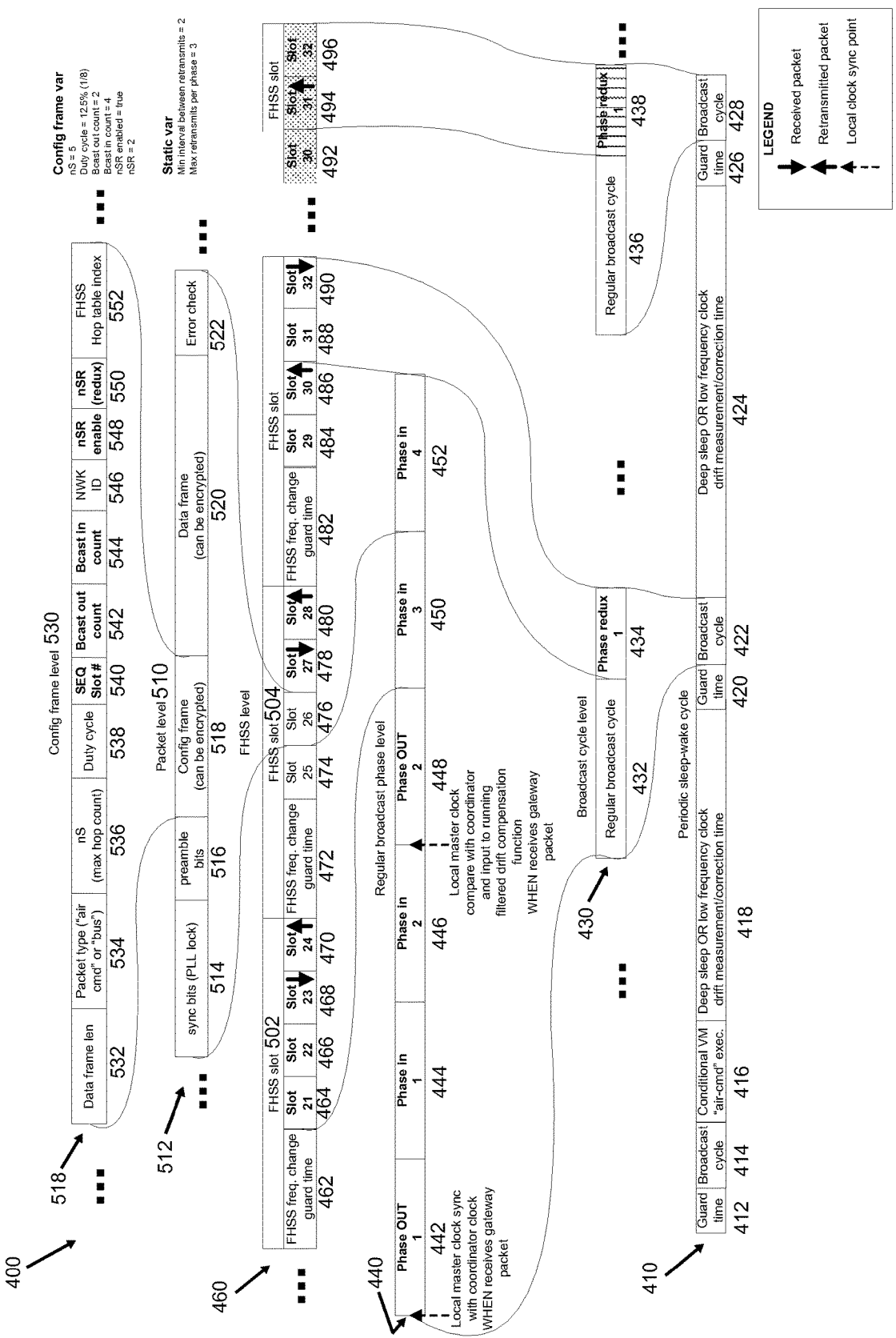
FIGURE 4 - EXAMPLE MESH CONTROLLER PHYSICAL LEVEL PROTOCOL

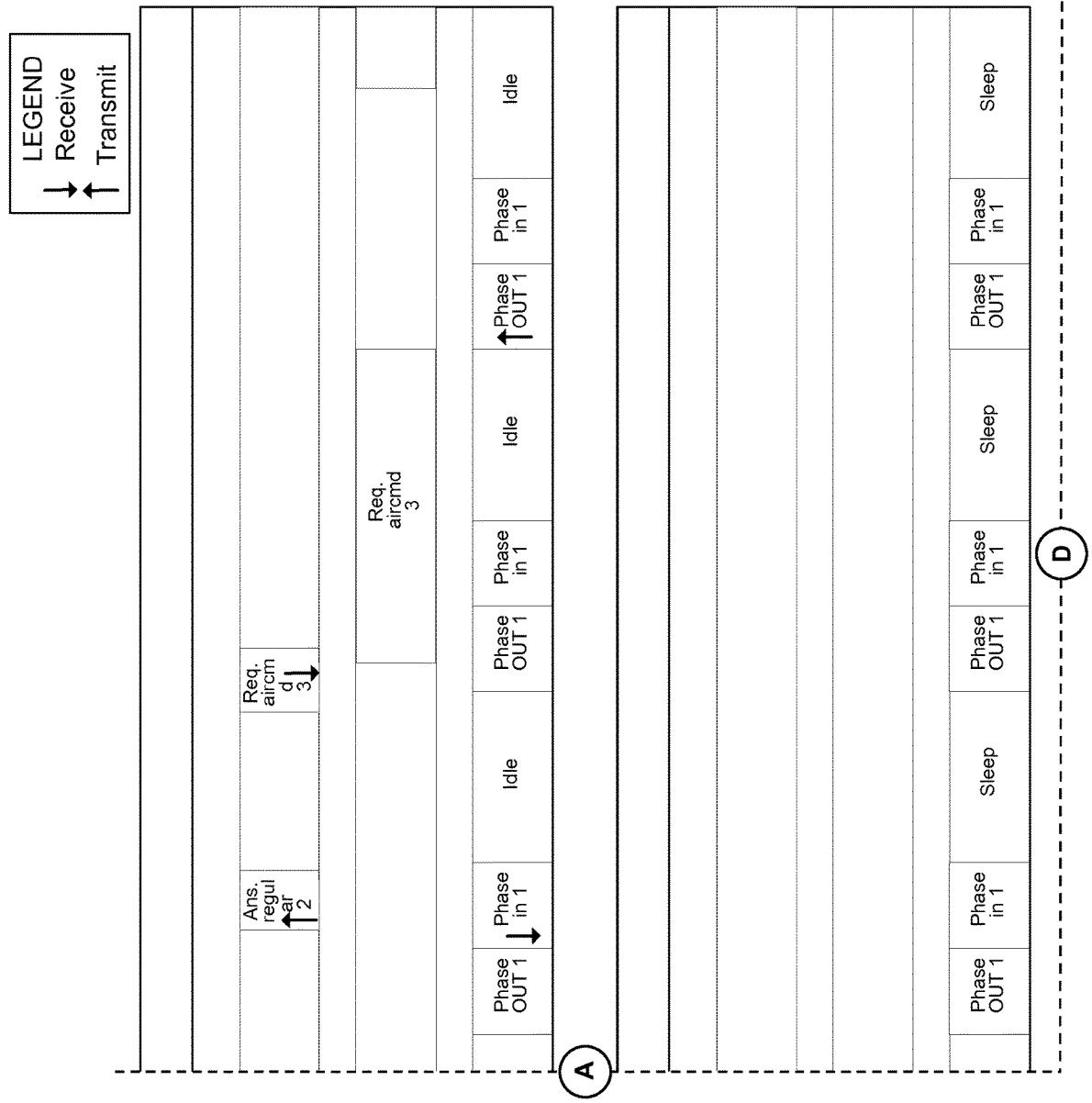

EXAMPLE BASIC REDUX PHASE ACCESS FLOWCHART

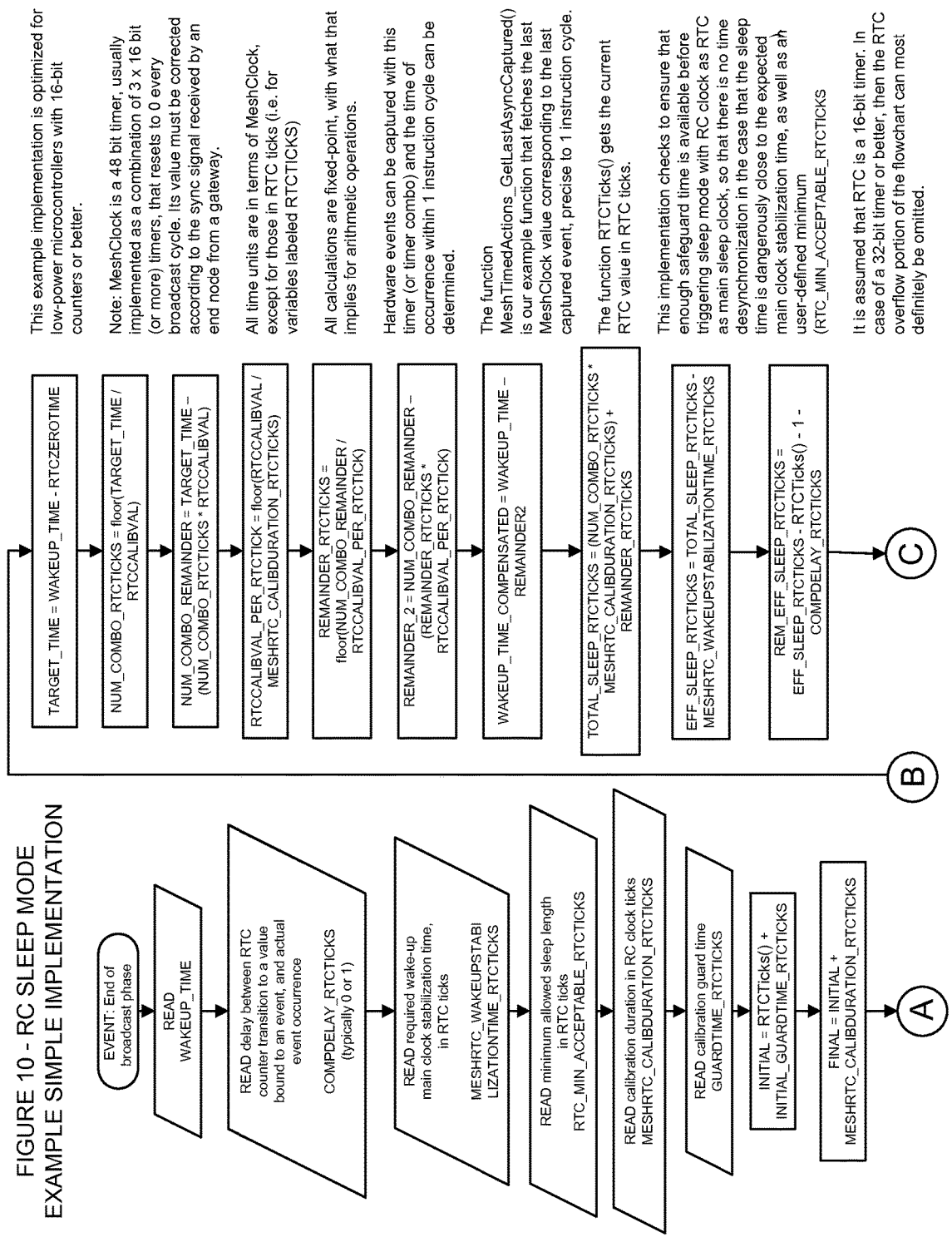

Source Code Exhibit 2 - Example VM code
FIGURE 15A
*SOURCE CODE EXHIBIT - VM Client*

```
#include "refdes.evi"
#define ADDR 0x91

//A mesh VM can be used to create a user-space sandbox in which a user (i.e. integrator)
//can safely implement application-specific code within the same mesh controller, without
//supplementary hardware needed.
//This is an example of a repeater node implementation, which only return 2 bytes when
//receiving a request for information from the coordinator nodes: RSSI (8bits), and
//voltage (8bits). At bootup, a special code living within the sleep controller allows
//user to change rf channel via a button, using a specific button-pressing sequence.

//Custom VM function executed at mesh controller bootup function exec_bootup(){
      //Insert specific boot-up code here
}

//Custom VM function executed when end node mesh controller receives an "air cmd", which
//is a command from coordinator node to execute a VM function over the air.

function exec_aircmd(){
      local V;
      //time to read voltage using I2C bus
      if(I2C_Start(ADDR) ){ //failure
            V=0;
      }
      else{
            V = I2C_ReadNak();
      }
      I2C_Stop();
      SetBuffer(0,GetRSSI(),1); //first byte to be sent is RSSI
      SetBuffer(1,V,1); //2nd byte to be sent is Voltage fetched from I2C bus
      Send(2); //send 2 bytes back to gateway
}

//In this particular implementation of a VM, the same VM codebase is executed with the
//same entry point independently of the event chosen. The last event type triggered is
//stored in the mesh controller
//memory, and can be fetched back with VM high-level language .GetExecType() function function main()
{
      local execType;
      execType = GetExecType();
      if(execType==MESHEXECTYPE_BOOTUP_bm){
            exec_bootup();
      }
      else if(execType==MESHEXECTYPE_AIRCMD_bm){
            exec_aircmd();
      }
```

*Source Code Exhibit 2 - Example VM code*

```
Screenshot of the VM toolchain that was developed in order to
generate the required bytecode corresponding to this client-
specific code:
```

FIGURE 16
ASYMMETRIC SNIFFER ENABLE
NETWORK IMPLEMENTATION – PACKET CODEC

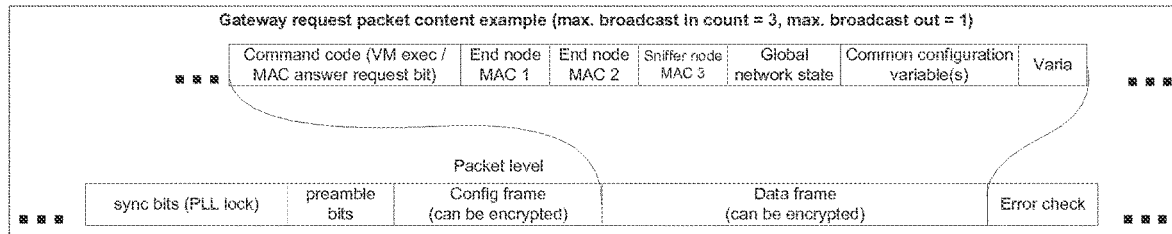

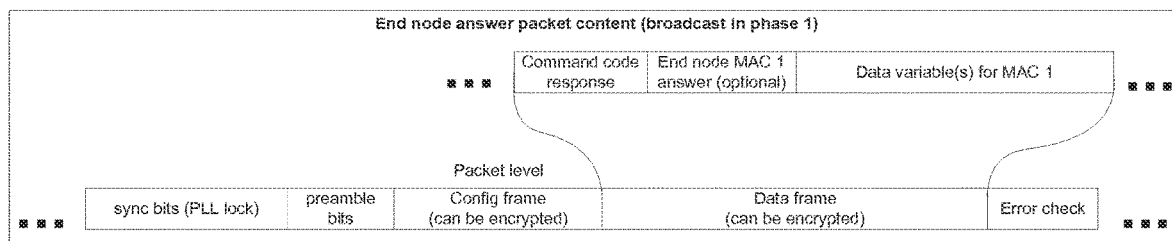

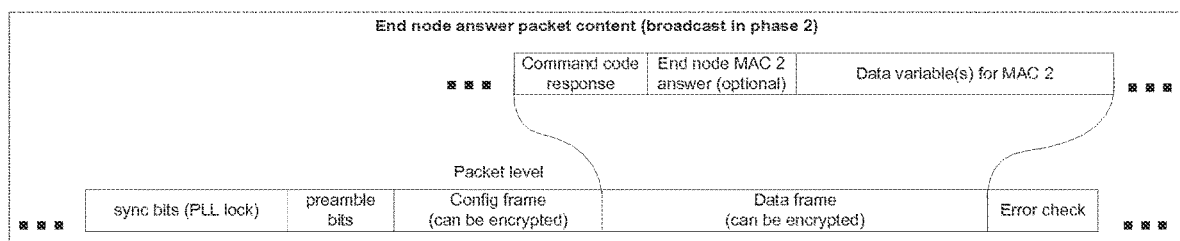

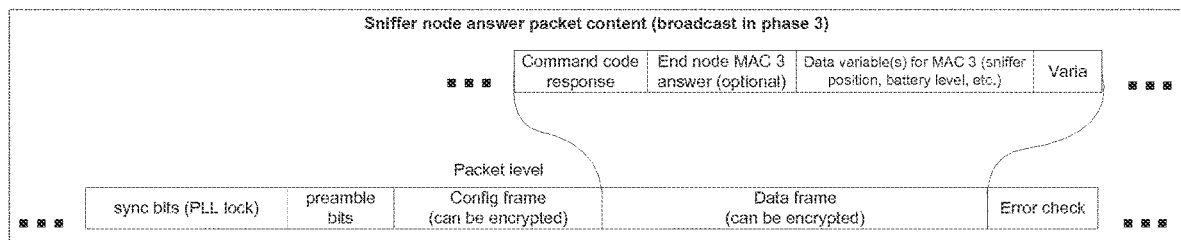

Note: Varia are optional bitstream spaces in the remaining available space within a packet that can accommodate a slower, higher-level protocol, such as for instance, encoding a $2^{nd}$ binary message using BASE64 and split and spliced into multiple subsequent packets, with ASCII characters 13 or 10 to denote message end marker, for instance.

A sniffer can use the varia spaces to signal a priority request, or alternately such a flag can be embedded into said sniffer data variables (as such a sniffer node is also an end node like any other sensor end node).

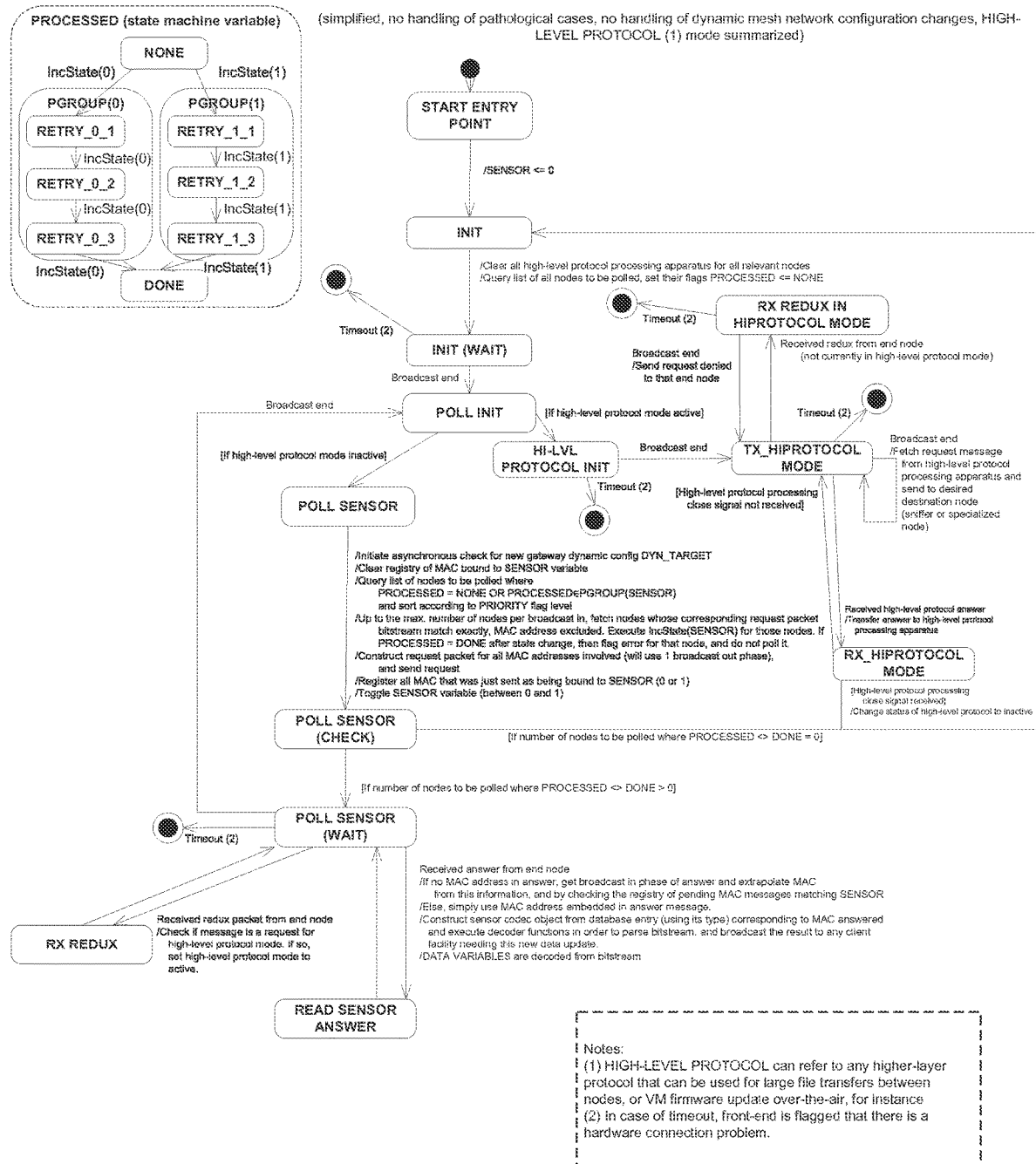

ASYMMETRIC SNIFFER ENABLED NETWORK IMPLEMENTATION – END NODE SNIFFER STATE MACHINE – UDP STYLE POLLING
(simplified, dynamic config checking enabled, HIGH-LEVEL PROTOCOL (1) summarized)

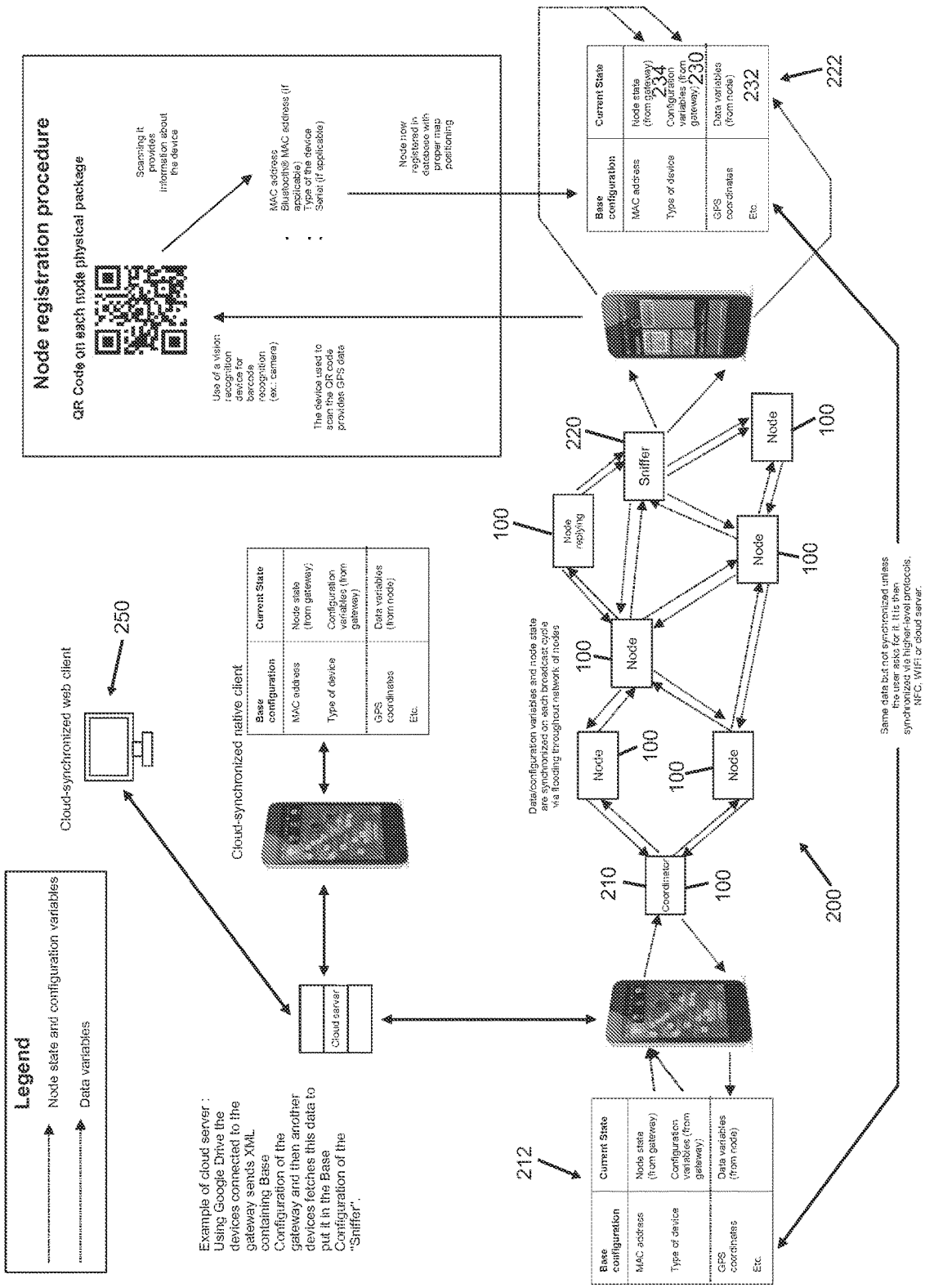
FIGURE 19 – GATEWAY AND SNIFFER DATABASE SYNCHRONIZATION

FIGURE 20 – Simple High-Level Protocol Model stack example for single gateway-node (Master-Slave) communication

|  | Data unit | True layer level | Code-Name | Function |
|---|---|---|---|---|
| Host layers (high-level protocols) | Data (File) | 5+ | 5+. Custom | Custom layers can be superimposed on top of the previous layers. For instance, one can decide to emulate a full OSI stack by replicating the OSI layer from the OSI Layer 2 (Data Link Layer), with its full 64-bit MAC addressing scheme. Another example, in the case where only pure Master-Slave connectivity between a gateway and a specific end node is required (i.e. no end node to end node message routing is required, which would entail an intermediary layer to emulate full peer-to-peer mode), and without strict requirement for QoS (Quality of Service) such as found in TCP/IP, it is possible to send binary blobs such as camera images in this fashion, and also possible to emulate a terminal link with a command-line interface between the gateway and the end node. A typical use-case of this methodology can be embodied by the host connected to the gateway via CLI enabled router connected to a mesh controller, which can be remote controlled by the host connected to the gateway via CLI commands. In this case, the type of CLI stream as implemented in a typical computer Operating System (OS) can be encoded within the FILE_TYPE header of the previous protocol layer, in order to distinguish between CLI stream type, for instance (in/out streams, versus error streams, is a typical example). |
|  | Segments (Chunks) | 4. Message Layer | 4. Smartrek RF Level 4 | A layer in which a long bit-stream (also called "file") of any kind is segregated by type via a header type indentifier FILE_TYPE. Post-pended to the PDU, i.e. in its footer, is a checksum/error-correction code in order to further safeguard the payload against corruption. |
|  | Packet (Datagram) | 3. Packet Segmentation Layer | 3. Smartrek RF Level 3 | A layer dedicated to segmenting longer message into shorter bitstreams that can fit within the payload of the precedent layer. Message ordering is enforced using a message sequence identifier in the PDU, called MSG_SEQ, and another sequence identifier, called "frame sequence ID", or FRAME_SEQ, is used to order the parts of a message that was splitted in order to fit individual RF packets (maximum of splitted components is thus dependent on the bit length of FRAME_SEQ). This layer can be designed to be symmetrical, i.e. the same protocol can be used for a gateway to end node message, or vice versa. The PDU also contains a PREAMBLE identifier, with identify the function of the PDU sent, with minimally includes: Frame Data Carry function (a part from a higher-level message is encapsulated in such a frame), Frame Count function (identifies the expected number of parts splitted from a given source message), Frame Cancel function (flags destination that a current send procedure has been interrupted), Buffer Flush function (to reset the buffers of the higher-level protocol, and thus reset the state machines used for protocol handling) and Frame Acknowledge function (used to answer back, i.e. acknowledge, a Frame Data Carry or a Frame Count function sent by the other peer). The typical behavior after a source peer sends a long message segmented into chunks in this fashion to another destination peer, is for the latter to send an acknowledgement every time it receives a message from the source peer, and accumulate the chunks in an ordered fashion inside of a holding structure (such as a tree map, in one possible embodiment). The source peer accumulates the acknowledgement PDUs from the destination peer, and at the end of its current message send cycle, it checks to see if any acknowledgement from the destination is missing. If so, it builds a list of chunks to be re-sent to destination, and re-sends them. It typically repeats this procedure until all chunks have been received, or after repeated failed deliveries condition is detected, in which case it considers its message delivery to have failed, and notifies its host of the condition (a simpler basic implementation can neglect this timeout condition, and any message send with failed acknowledgement reception by sender will trigger a sender retry until its protocol buffers are forcibly cleared by host, for instance). |
| Media layers (low-level protocols) | Bit/Frame | 2. Physical Data Link | 2. Smartrek RF Level 2 | A mesh data connection with network dynamic parameters for broadcast cycle configuration, error correction code, and data payload. The data payload (a.k.a. the SDU) is considered as being the "data frame" of the physical (a.k.a. media) layer, and the rest of the information sent is considered as being part of the "config frame" of said layer (by default contained in the header of the PDU, the footer containing the error correction code). Moreover, a MAC addressing scheme is typically implemented here, with optional multi-phase feature. Redux priority access requests signals are directly addressed by a given host to this layer. |
|  | Bit | 1. Physical Raw | 1. Smartrek RF Level 1 | A cooperative bit-synchronized data connection for mesh networks, the standard of which has 1 gateway connected to multiple end nodes. Each transmission from a node to another is occurring within a broadcast cycle. Typical embodiment uses a FHSS FSK transceiver with a super-heterodyne receiver, and with a method for controlling sleep cycles to ensure that all end nodes are synchronized with the main gateway every broadcast cycle. |

SUB-PACKET LEGEND

| | |
|---|---|
| B-(i#, j#, k#) | Coordinator command telling end-nodes which one is allowed to communicate during which phase. A B-(i#, j#, k#) command occurring at triplet (X, Y, Z) from coordinator is expected to result in an answer at (X, Y+2, 0) by node i#, at (X, Y+2, 1) by j#, and at (X, Y+2, 2) by k# (as seen by coordinator node). This is facultative as long as the same node assignment is agreed upon for communication prior to beginning this communication protocol mode. |
| Q-i# | Coordinator request for end node i send-back of their requested number of assigned transmission packet count for a level-1 cycle |
| R-n | End node i# answer to Q-i# query, with n being the number of packet per level-1 cycle requested |
| P(X, Y, Z) | Custom payload (can consist of multiple sub-packets as implemented by the higher-level protocol used) corresponding to a coordinator request at (X, Y, 0), with an answer expected to occur at (X, Y + 2, Z) |
| A-bxxx | Sequence of acknowledgment sub-packets (content not explicitly listed) using bit-mask strategy (x being a bit). Those are used as acknowledgement for end-node source packets only (no explicit acknowledgement needed for a coordinator source packet). If reception at coordinator site oft that acknowledgement occurs at triplet (X, Y, Z), then it is a bundled acknowledgement for all phases that was sent by an end node at (X, Y – 2, ...), which thus corresponds to a prior coordinator order at (X, Y – 4, 0) |
| A-(X, Y, Z) A-(X, Y, Z+1) ... | Decoded acknowledge sub-packet content listing |

Because of the broadcast cycle delays due to host bus transmission of all nodes, the minimum number of broadcast cycles per synchronization cycle corresponds to the number required so that the coordinator node host can receive the R-n packet for any Q-i# requests sent at the beginning of said synchronization cycle, as well as for any end node to receive the acknowledge signals for all previous cycles. In case of acknowledgement miss, any node can detect the condition and embed the missing chunk in any of the next "files" to be sent in its sequence offiles to be segmented and sent via synchronization cycles.

Note that for this special case, network throughput is maximized if the "file" data sent per node per synchronization cycle are close to be of the same size. It is possible to use those "files" as wrappers of higher-level protocols in order to enforce this condition.

GRAPHIC LEGEND

 Communication bus buffer transferred to RF packet buffer event marker

 Example trace of communication path initiated by coordinator at Packet ID (X, Y, Z) = (22, 15, 0) with all end node answers and subsequent acknowledgments of those answers

 Example trace of communication path initiated by coordinator at Packet ID (X, Y, Z) = (23, 0, 0) with all end node answers and subsequent acknowledgments of those answers

FIGURE 22D

MESH NETWORK SYSTEM AND TECHNIQUES

CROSS REFERENCE TO RELATED APPLICATIONS

The present application is a continuation of U.S. patent application Ser. No. 14/661,572, filed on Mar. 18, 2015, entitled "Mesh Network System and Techniques," which claims priority to U.S. Provisional Application No. 61/955,018, filed on Mar. 18, 2014, each of which is incorporated by reference herein in its entirety.

FIELD

The present relates to network systems and techniques, and more particularly, to a node to be integrated in a network of wirelessly connected nodes, to a network system, to method for operating a node of a network, and to a method for communicating within a network.

BACKGROUND

The cooperative synchronized networks idea stems from the principle of having a synchronization on the physical layer of a given mesh network, be it via wavelength-level phase synchronization, or via a more easily achievable implementation with synchronization at bit-level in order to enable deployment on existing industry-standard design targets.

Known in the art are contention-enabled technologies such as Zigbee™, for example.

Bit-synchronized networks are a special case of antenna diversity found in phased array radar, for example, with less timing constraint, which is enough for ensuring minimal interference between simultaneous packet transmission of multiple node neighbours, the imperfection due to phase delay and multi-path fading being accounted for by FM capture effect. It is very seldom considered as a solution outside of the theoretical realm, and is often only tested in small scale settings where long range delay interference are minimal, or assessed in a pure simulated framework. For instance, the Glossy implementation using DSSS transceivers do this in a setting within a physical boundary that is less than the path delay threshold for which bit-synchronization fails. Extension of the principle to situations where pure bit-synchronization fails, i.e. when path delays exceed the threshold for proper bit synchronization (such a timing threshold can be defined as corresponding to the 1/(2*bit-rate)) using a fallback mechanism has not been assessed in the current art literature.

Using such a network, the time taken for a given packet from a source node to flood the whole network can be precisely time-bounded, independently of the density of nodes deployed, in an ideal setting where bit-synchronization holds. This can be used to drastically lower the wake/sleep duty cycle of the network for a given data bandwidth in the case where high node density is required for operating the network. Discounting real-life limitation in synchronization clock precision, the power consumption is in a direct relationship with said duty cycle, and thus can linearly scale down as low as the duty cycle permits.

However, in a real-life implementation setting, the maximum duty cycle is bounded to the worst-case clock tolerances in the manufactured mesh network nodes. As current technology typically allows for clock tolerances between 10 and 100 ppm, this implies that each node clock has to be corrected by a coordinator node in order to correct clock drift periodically in order to maintain the tight tolerances needed for bit-synchronization a medium speeds (for instance, in the order of a few microseconds in the case of a FHSS network at bit-rates in the order of kilobits/sec, and less than 1 microsecond if one were to use a DSSS network such as what is found in IEEE802.15.4 radio technology). Clock synchronization is a known problem for distributed radio transceiver networks. It is however specially critical in the case of bit-synchronized cooperative networks.

Not only must the network have a coordinator node with a reference clock in order to broadcast timing information to the rest of the nodes (be it in a direct or indirect fashion), called in-band clock synchronization, but there must also be a safety mechanism in order to ensure that a given node is awake when this synchronization broadcast arrives. Thus, a safety guard time is usually added in the wake schedule time of any node in order to ensure this. In the case of regular contention-enabled mesh networks, this guard time has to include the effects of all the following: clock tolerances (drift and jitter), broadcast flood non-linear propagation worst-case time with respect to network size and density, number of retries allowed, etc. and is an ongoing subject of research due to the complexity of contention-enabled broadcast packet propagation.

In the case of a bit-synchronized network, this guard time can be typically linked to the chosen clock manufacturing tolerances. Thus, the state of the art dictates that the minimum safe duty cycle will be limited to the chosen clock relative tolerance (for example, T=1000 ppm internal RC oscillator: oscillator tolerance T, desired interval between wake cycles: X sec). Idealized broadcast interval without synchronization guard time: Y sec. Idealized duty cycle (a typical configuration parameter) defined as D=Y/X. The required guard time per broadcast cycle is X*T. Real duty cycle is thus R=(Y+X*T)/X=Y/X+T=D+T. Thus, asymptotic case where D tens to zero, we have minimum duty cycle limited to R=T. Thus, in order to accommodate low effective duty cycles, one has to typically use higher-cost crystals, a combination of multiple crystals. This also limits the hardware platforms onto which a cooperative bit-synchronized mesh network can be deployed, and legacy retrofitting is usually impossible, and design required dedicated hardware platforms, lest one needs to cope with less efficient minimum network power consumption, a trade-off that can be unacceptable for long-range, high RF power, long-lasting, low power consumption applications, such as in high-interference locations such as large forest deployments.

The alternate method for network-wide clock synchronization is using out-band methods in order to avoid the clock tolerance problem, such as using GPS time base from a GPS unit installed per-node, with implied hefty penalties in node cost, due to raw hardware cost as well as increased integration complexity.

The conventional FSK or FSK-like mesh network node electronic design architecture is typically the following: RF node front-end (typically a general purpose RF ASIC with analog front-end circuitry for both transmitter and receiver with a dedicated clock in order to generate local oscillator-derived signals, said ASIC being linked to a "mesh controller" processing unit which contains glue logic interfaces (such as UART, SPI, I2C, CAN, MODBUS etc.) to a host processing unit which is customized according to specific implementation. Thus, there is usually the need for at least 3 dedicated ICs per sensor node, and that is discounting supplementary glue logic circuitry to external sensors in order to link them to said host processing unit. A supplementary technical challenge when employing cooperative bit-synchronized networks is that timing is key, and thus, for single core processors employed as mesh controllers, all interrupts must be typically be deactivated before a timing-critical operation (such as a packet transmit begin trigger signal) occurs. In other terms, running of parallel user-code can possibly jeopardize mesh synchronization integrity between nodes, depending on whether user-code execution overflows into the time slots dedicated for broadcast cycles. This is why current solutions usually employ a supplementary processor core dedicated to user firmware.

Work on optimizing and leveraging a cooperative bit-synchronized network using flooding broadcasts as the sole and prime mechanism of communication has been limited to standard master-slave polling methodologies, where a master (by default, the node chosen as being the coordinator node) polls a node, waits for its answer, then polls the next one in an arbitrary order often predefined from a configuration database (the most known of which is standard round-robin). Moreover, network transit of sensor data, industry-standard mesh networks, is usually limited to collection at the coordinator node location, the synchronization of said collected data to other clients being done using external networks such as IP, telephony or satellite-based networks. A typical example would be a sensor collection system which will have users bound to a mobile device with access to cellular or satellite infrastructure if those users need their sensor data while roaming in the field. Indeed, in a practical setting, transit of whole network data cannot be feasibly sent to another client node using the same mesh network without heavy power consumption penalties, because for each client, the sensor typically has to actively send the whole of its collected data with said client device using direct client MAC addressing (analogous to IEEE802.15.4 unicast packet send methods). This is thus not practical in a power-sensitive setting such as for forestry applications, lest costly portable power sources or energy harvesting strategies be used at each deployed node location, because the total network power consumption is typically multiplied by the number of client devices required.

In addition, in a master-slave sensor architecture within a cooperative bit-synchronized mesh network as described above, the coordinator node typically sends a broadcast packet with flooding slotting information in order to time-bound the flooding process to a finite number of hops, and then the requested sensor node being polled or controlled sends back its answer in a similar fashion. This implies that in a whole broadcast flood phase (either "out", i.e. from a coordinator node to the whole network, and "in", i.e. from an end node back to said coordinator), only one data sub-packet can be flooded throughout the whole network at any given time (thus this is very different at the core than ad-hoc mesh routing strategies found within the convention IEEE802.15.4 physical stack). In the case that more than one end node attempt to flood back an answer throughout the whole network (if there are no multiple network operating on different RF channels or hop tables in the case of a FHSS system), either only one packet will reach back to the coordinator node, or even none of them depending on the mesh physical configuration.

This has a corollary: there must be some addressing mechanism put in place in order to ensure that during a broadcast "in" phase, only one end node answers. Typically, a MAC address (or any identification scheme that end nodes agree to) is send by the coordinator node embedded in the data sub-packet (this can be considered as being part of a 'control' sub-frame in the higher protocol layers according to the OSI model). This means that by its very inception, an end node within such a network must wait for a specific gateway signal before being allowed to send back its data. In the case where a large quantity of nodes are deployed in the field, and for low wake-sleep duty cycles, the reaction time of a node degrades linearly with the number of nodes deployed, using a standard node-balanced polling scheme. This can cause problems when higher rates of polling for specific nodes are required when large networks are deployed that need to save energy in order to last longer.

Another corollary is that the communication is done by the very nature of the mesh network in a half-duplex fashion, and thus there will always be a minimal network overhead caused by the requirement of a packet from the coordinator node indirectly containing network sleep synchronization information as well as the request information outbound to a destination end-node. Due to the symmetrical nature of broadcast phases (i.e. phase "out" and phase "in" take the same time as they have to share the same maximum number of hops setting), there is a base information bandwidth reduction factor of 2 in the maximum network speed at which a select end-node can send back a stream of data.

Hence, in light of the aforementioned, there is a need for an improved system which, by virtue of its design and components, would be able to overcome some of the above-discussed prior art concerns.

SUMMARY

The object of the present invention is to provide a device which, by virtue of its design and components, satisfies some of the above-mentioned needs and is thus an improvement over other related mesh network systems and/or methods known in the prior art.

In accordance with the present invention, the above mentioned object is achieved, as will be easily understood, by a mesh network system such as the one briefly described herein and such as the one exemplified in the accompanying drawings.

It is an object of the present to provide a reliable, fast and low power consumption remote data acquisition and device control with multiple channel-sharing clients in an environment with multiple interference-generating physical elements, in the presence of multi-path fading and time delays associated with longer ranges, using an extension of a cooperative bit synchronized frequency-modulated wireless mesh network, and related corresponding manufacturing processes and applications.

Another object is to solve broad engineering requirements besides the use of a bit-synchronized cooperative mesh network using whole network broadcast packet flooding as the principal communication method, for example:
 How to enable deployment of said mesh technology with low duty cycles using existing industry-standard hardware platforms, and how to minimize cost of integration by time-sharing the mesh controller processor with ancillary functionalities;
 How to enable the use of multiple bandwidth-asymmetric clients that communicate via the same sensor network they aim to monitor and control, and that can refresh their databases with the whole network current sensor data without drastically impacting network power consumption;
 How to improve perceived sensor network responsivity via direct interaction between lower protocol levels (according to the OSI model) up to the HMI level How to mitigate the bandwidth reduction issue by segmenting a broadcast cycle (network activity cycle between sleep cycles) into more than the standard 2 broadcast cycles typical of the master-slave half-duplex architecture How to improve absolute sensor network responsivity using a novel scheme that we call the "redux phase"

How to leverage the low power consumption of the network in order to retrofit duty cycling and auto configuration of a parallel higher-bandwidth and higher-consumption multi-hop network (for instance IEEE802.11s), which can be critical for on-demand mesh wi-fi without power harvesting solutions in place In accordance with an aspect, there is provided a node to be integrated in a network of wirelessly connected nodes, the node comprising:

- a main module comprising a main controller having a main clock, the main controller being operable between an active configuration wherein the main clock oscillates and an inactive configuration wherein the main clock sleeps;
- a digital serial bus connected to the main module, the digital serial bus being operable under a communication protocol which is configurable to embed timing information; and
- an external sleep controller being connected to the main module via the digital serial bus to operate the main controller between the active and inactive configurations based on said timing information.

In accordance with another aspect, there is provided a network system comprising a plurality of interconnected end nodes as described above, the network further comprising a coordinator node for communicating with the end nodes, the network being configured to broadcast data and synchronize a time base via a flooding mechanism.

In accordance with another aspect, there is provided a method for operating a node adapted to cooperate within a network of nodes, the node comprising a main module and an external sleep controller connected thereto via a digital serial bus, the main controller having a main clock, the main controller being operable between an active configuration wherein the main clock oscillates and an inactive configuration wherein the main clock sleeps, the method comprising:

- sending from the main controller, timing information embedded in a communication protocol of the digital serial bus, to the external sleep controller, said timing information comprising sleep period data representative of a time period during which the main module is intended to operate in an inactive configuration;
- at the external sleep controller, measuring elapsed time via a clock; and
- when the elapsed time has reached said time period, sending a wake signal from the external sleep controller, over the digital serial bus, to the main module to operate the main module in the active configuration.

In accordance with yet another aspect, there is provided a method for communicating within a network comprising end nodes and a coordinator node, the network being cooperatively synchronized and configured to broadcast data packets during broadcast cycles through a flooding mechanism, each data packet comprising a configuration frame and a data frame, the configuration frame comprising hop data, the method comprising for each broadcast cycle:

a) during an outbound broadcast phase, sending from the coordinator node a coordinator-originating data packet for polling at least one of the nodes, the data frame of the coordinator-originating data packet comprising address data corresponding to the at least one end node to be polled; and b) during an inbound broadcast phase, receiving at the coordinator node a node-originating data packet returned from one of said at least one of the end nodes, the data frame of the node-originating data packet comprising node data from the end node having been polled;

each of said outbound and inbound broadcast phases comprising successive time slots for at least one of said end node to either receive the data packet or rebroadcast the data packet to the network;

the method further comprising:

i) during one of said time slots, receiving at one of the end nodes, one of said data packets; and ii) during another one of said time slots:
   updating the hop data in the data packet;
   rebroadcasting the data packet from the end node; and
   during an inbound broadcast phase, if the end node corresponds to the address contained in the data packet, generating and broadcasting a data packet comprising node data from the end node and corresponding hop data.

In accordance with yet another aspect, there is provided a method for communicating within a network comprising end nodes and a coordinator node, the network being configured to broadcast data packets between said nodes during broadcast cycles through a flooding mechanism, consecutive broadcast cycles being separated by a sleep period wherein the end nodes are deactivated for external communication, the method comprising:

during said sleep period: executing a node-related process, at a main controller of at least one of the end nodes.

In accordance with still another aspect, there is provided a method for communicating within a network of nodes, the network being cooperatively synchronized and configured to broadcast data packets to the network during broadcast phases through a flooding mechanism, each data packet comprising hop data, the method comprising, for each broadcast phase:

a) broadcasting a data packet from a source node during a predetermined time slot;

b) receiving the data packet at one or more destination node during said predetermined time slot; and repeating steps (a) and (b) according to the hop data, at respective predetermined time slots, wherein each destination node of step (b) corresponds to a source node in a next execution of step (a) and the data packet received in step (b) corresponds substantially to the data packet to be broadcasted in the next execution of step (a).

The objects, advantages and features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 1B shows a circuit plan of an end node mesh controller, according to an embodiment.

FIG. 2 is a timeline diagram showing event triggers for a virtual machine (VM), according to an embodiment.

FIG. 3C shows special functions executable by the virtual machine represented in FIGS. 3A and 3B.

FIG. 4 is a diagram showing a packet structure and its configuration frame, as well as other related features, according to an embodiment.

FIG. 5A, 5B, 5C, 5D show a schematic diagram showing a first polling strategy, according to an embodiment.

FIG. 10A, 10B show a flowchart of a RC oscillator-bound sleep controller, according to an embodiment.

FIG. 15A shows a portion of a VM example source code for a simple sensor node (whose main data variables are its own battery state and its radio signal state), according to an embodiment of the VM strategy.

FIG. 16 is a diagram showing a structure of a sub-packets encoding node network state, configuration and data variables, within the data payload of a packet, according to an embodiment.

FIG. 17 is a flowchart of a state machine used on the host device connected to a coordinator node for UDP-style polling the network, according to an embodiment.

FIG. 19 is a diagram showing a node registration mechanism using a mobile GPS-enabled device, as well as the possible database synchronization facilities for static base configuration variables, as well as mesh-synchronized data and configuration variables, according to an embodiment.

FIG. 20 is a table showing an example of a possible higher-level protocol on top of a cooperative mesh protocol (using a 1-to-1 acknowledgment scheme), according to an embodiment.

FIG. 22D shows a legend of the diagram.

DETAILED DESCRIPTION OF PREFERRED EMBODIMENTS

Figure 1A:
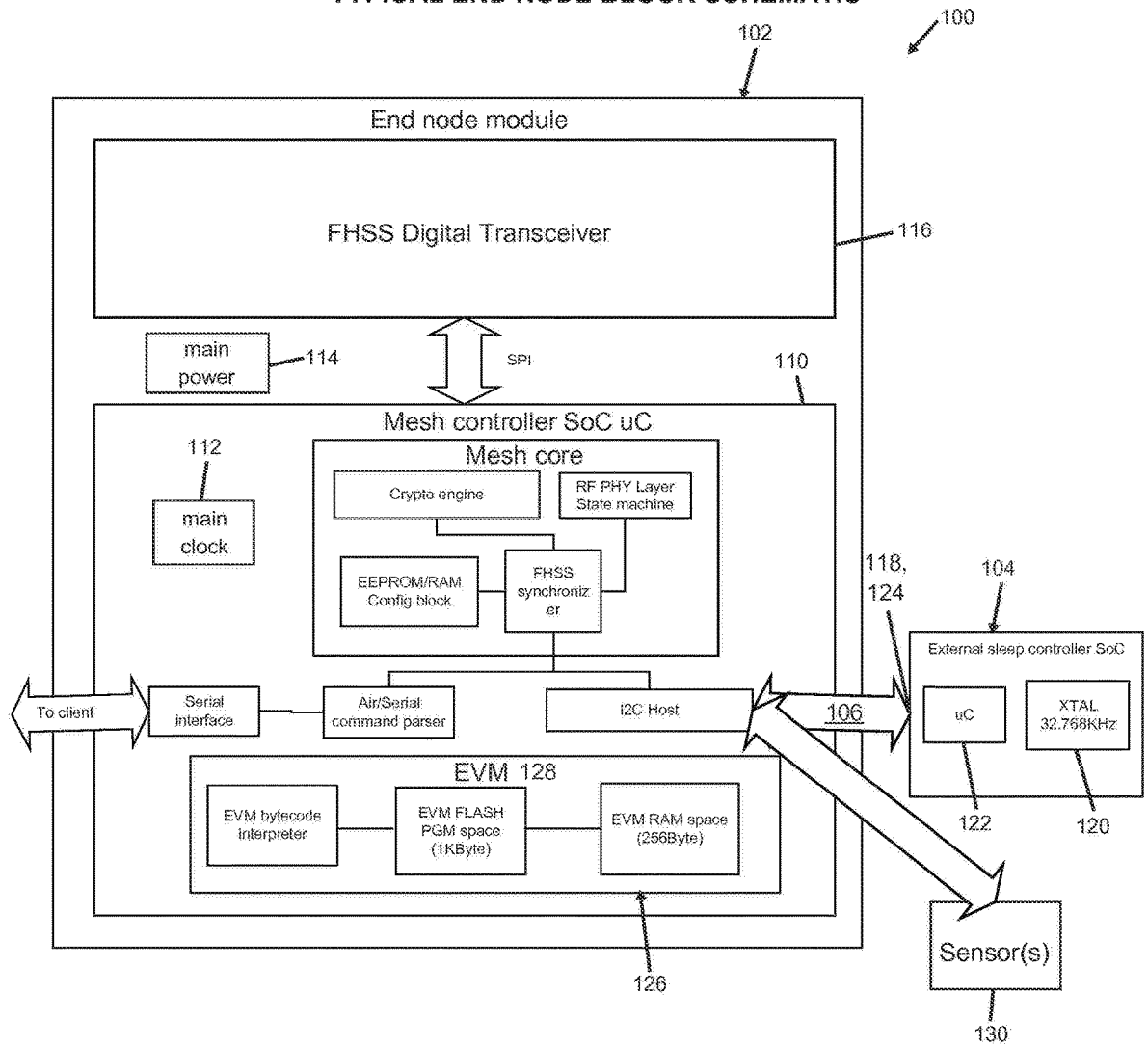
FIG. 1A shows a high level structure of an end node mesh controller, according to an embodiment.
Figure 3A:
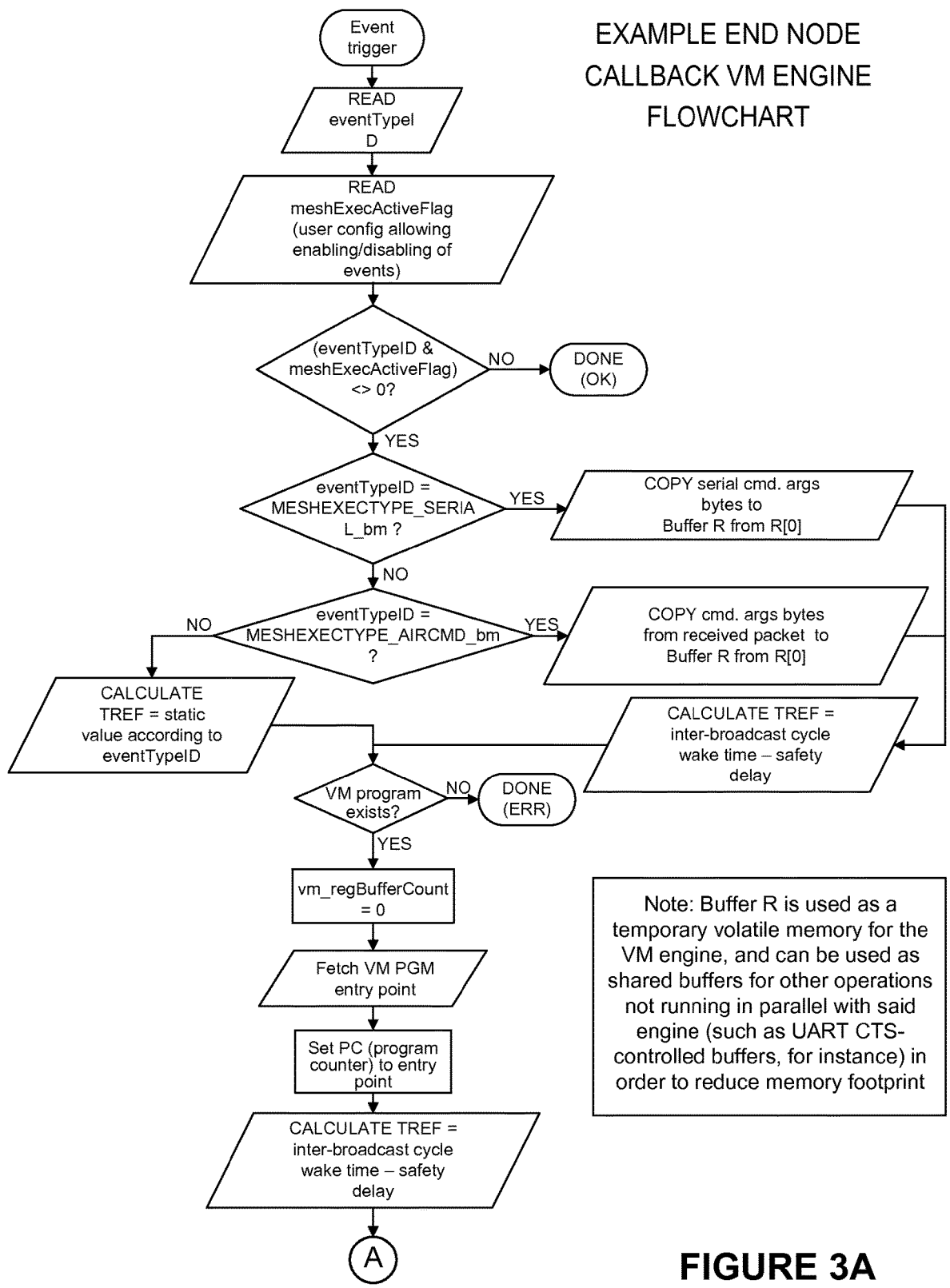
FIGS. 3A and 3B show a flowchart showing an operation of a virtual machine (VM), according to an embodiment.
Figure 3B:
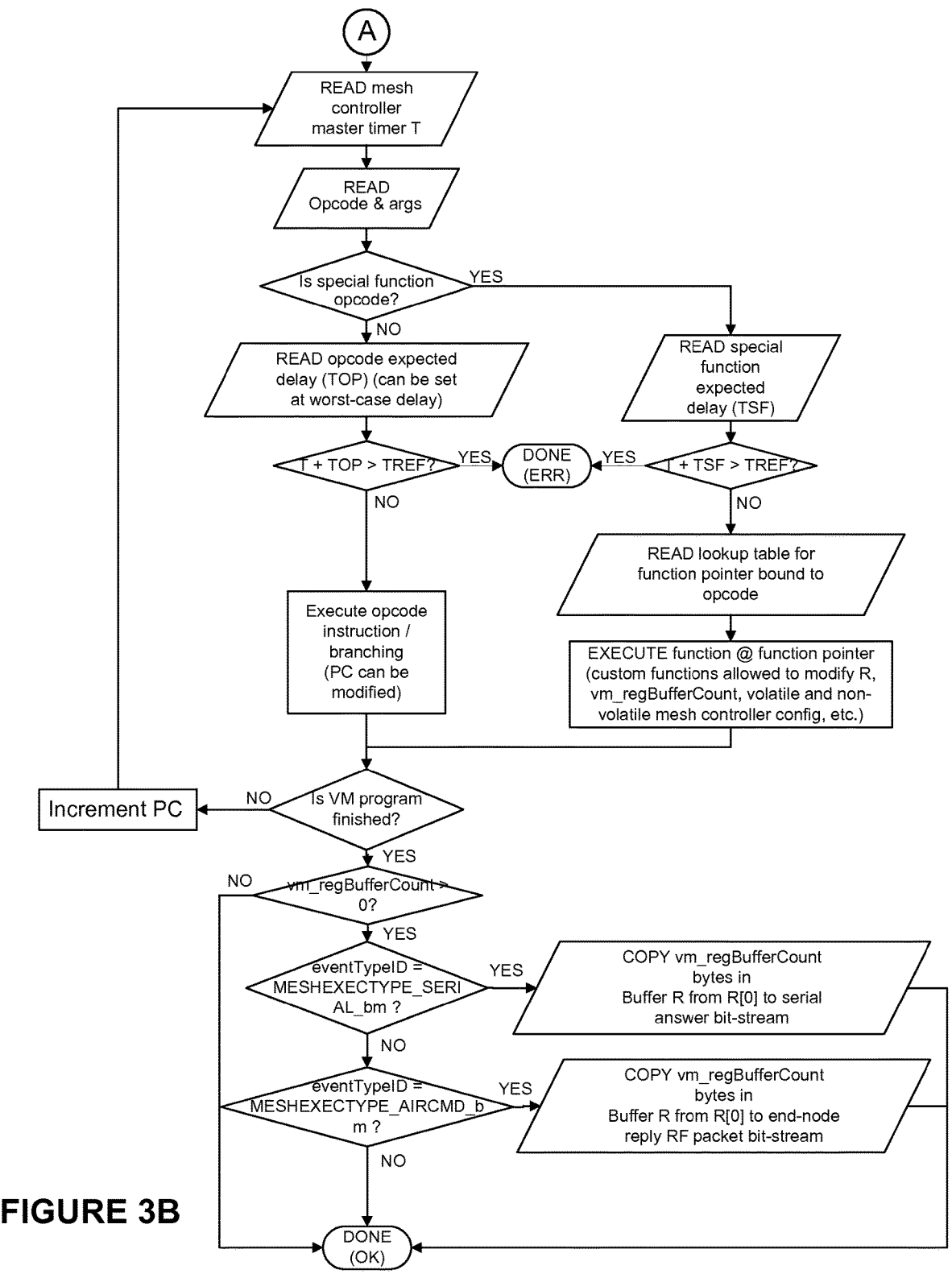
Figure 4A:
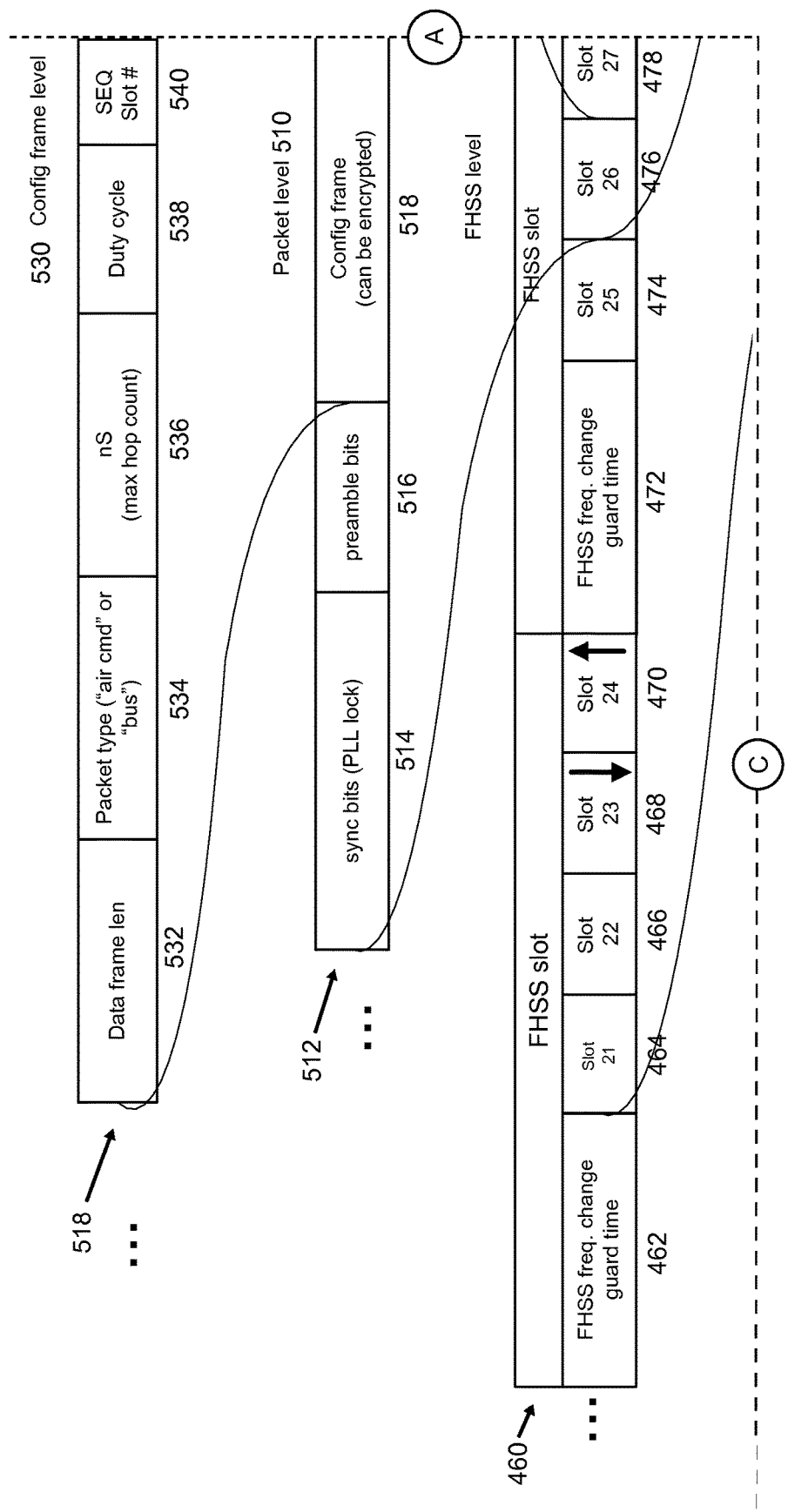
FIG. 4A, 4B, 4C, 4D are enlarged views of portions of the diagram FIG. 4.
Figure 4B:
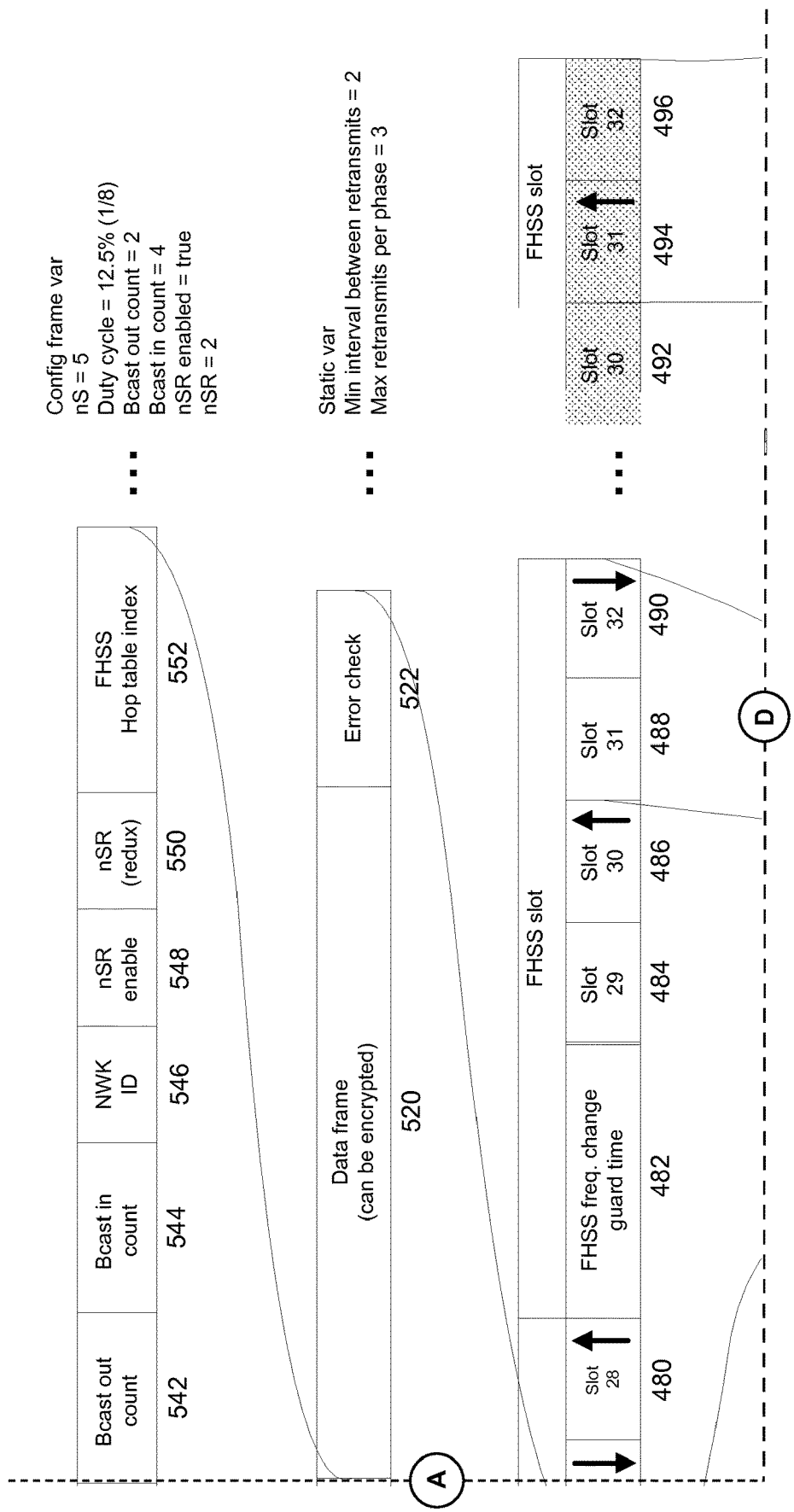
Figure 4C:
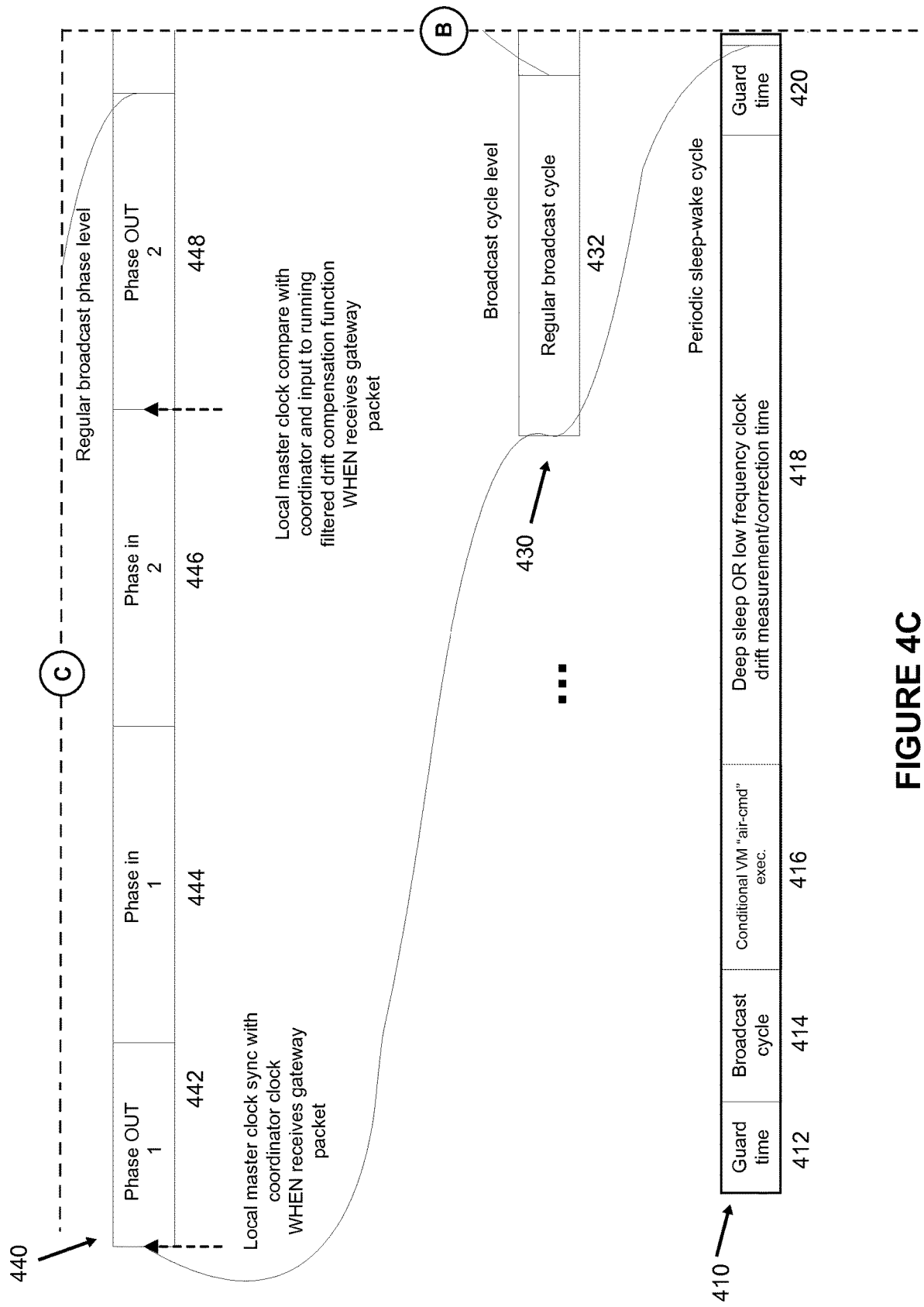
Figure 4D:
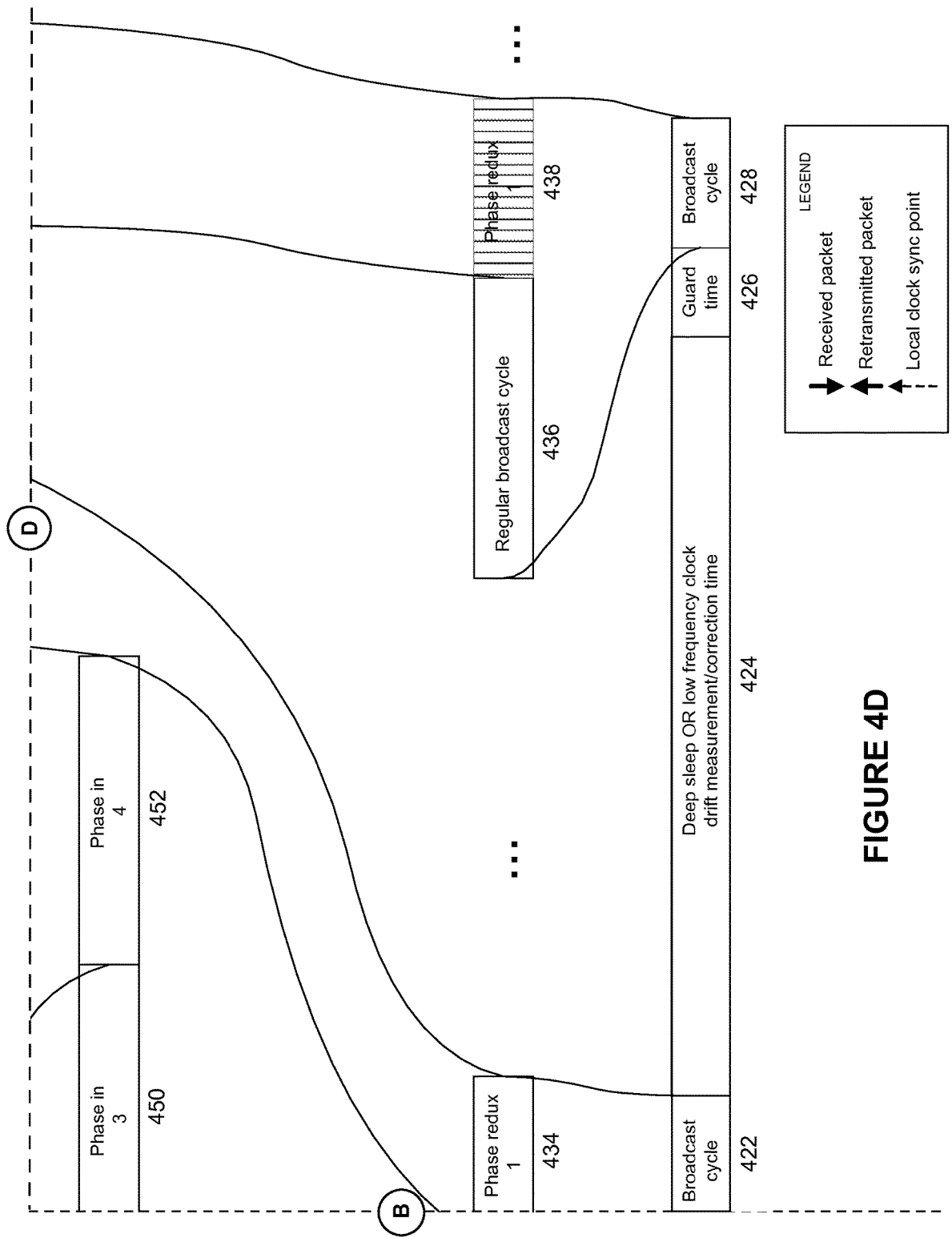
Figure 5A:
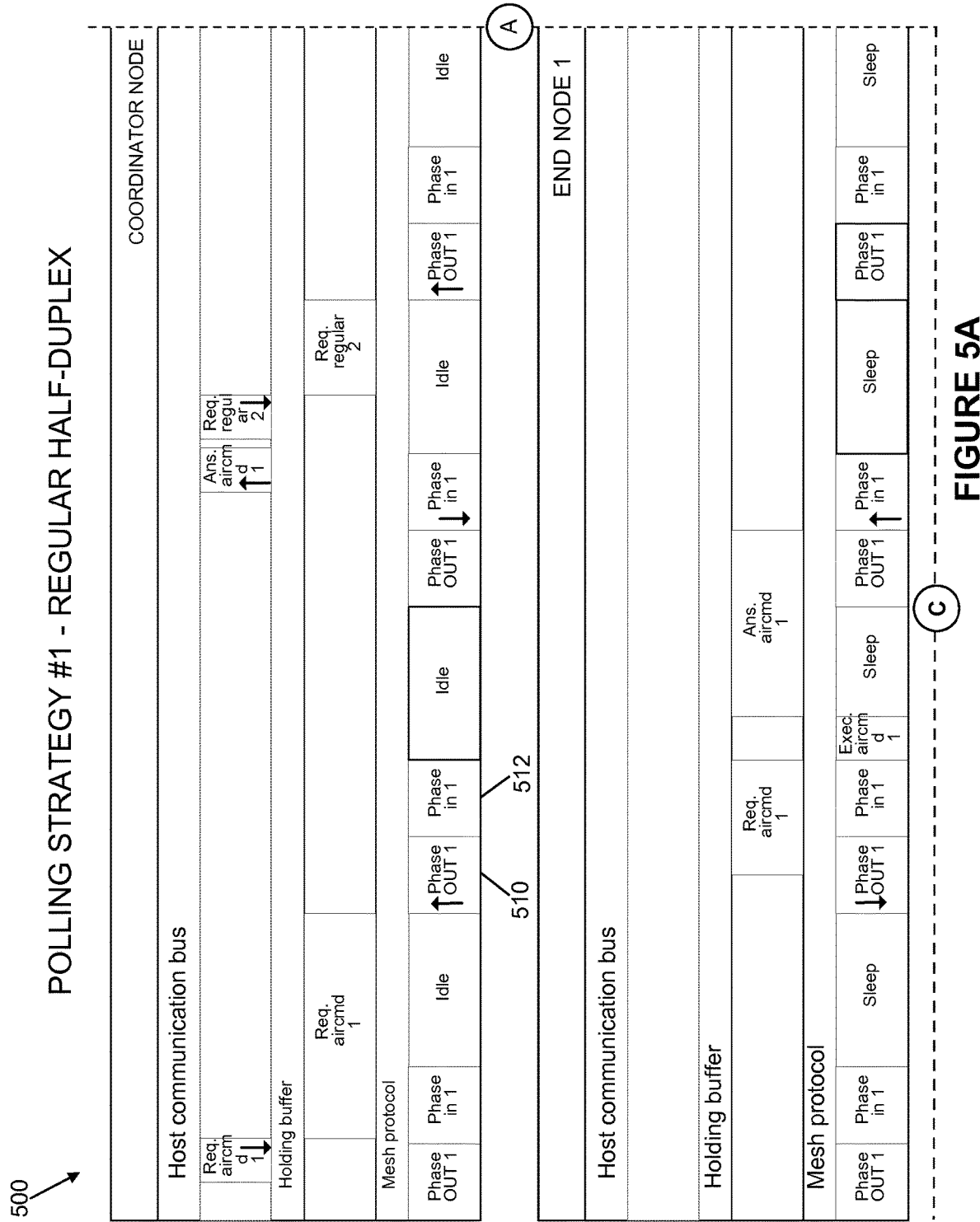
Figure 5C:
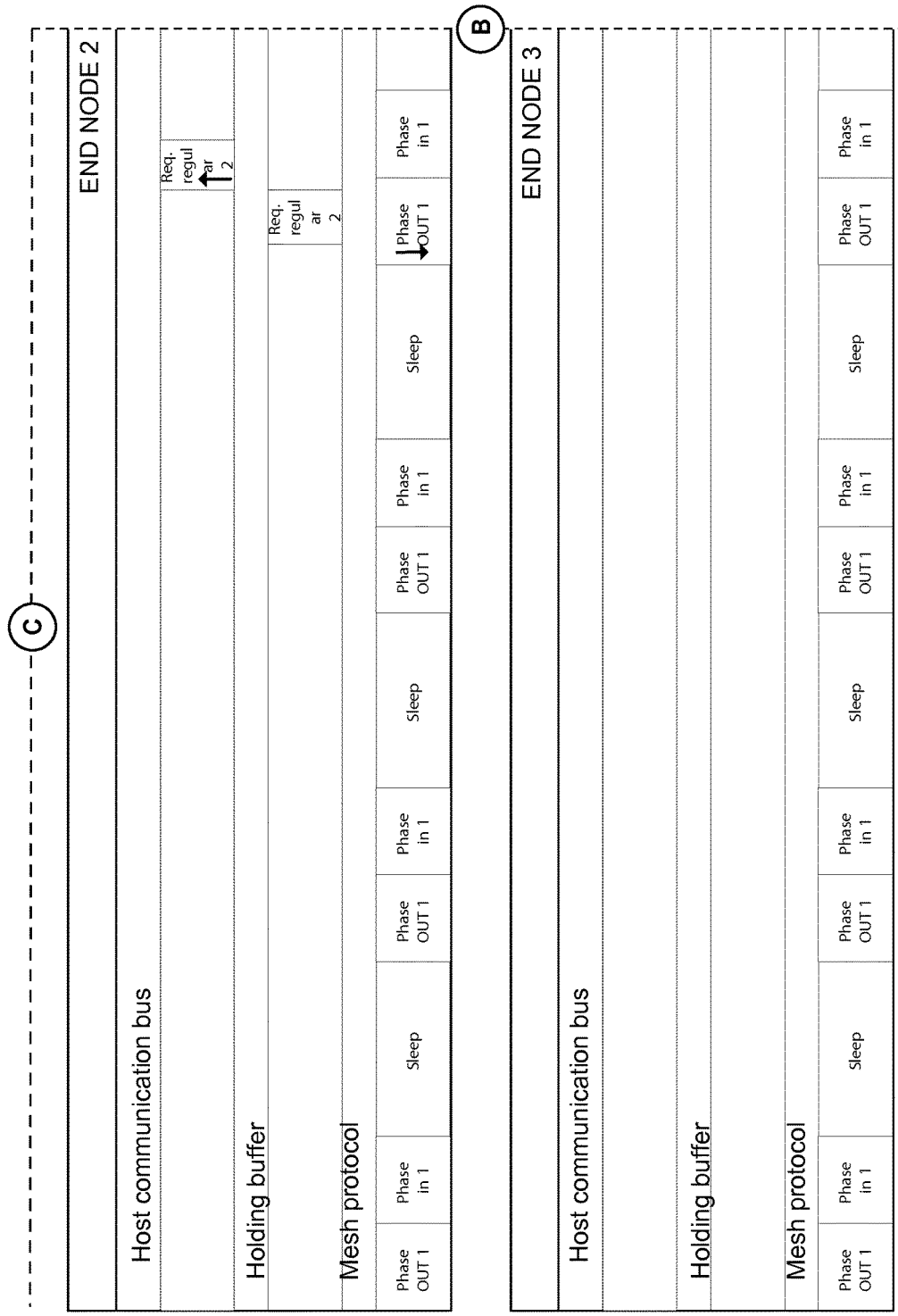
Figure 5D:
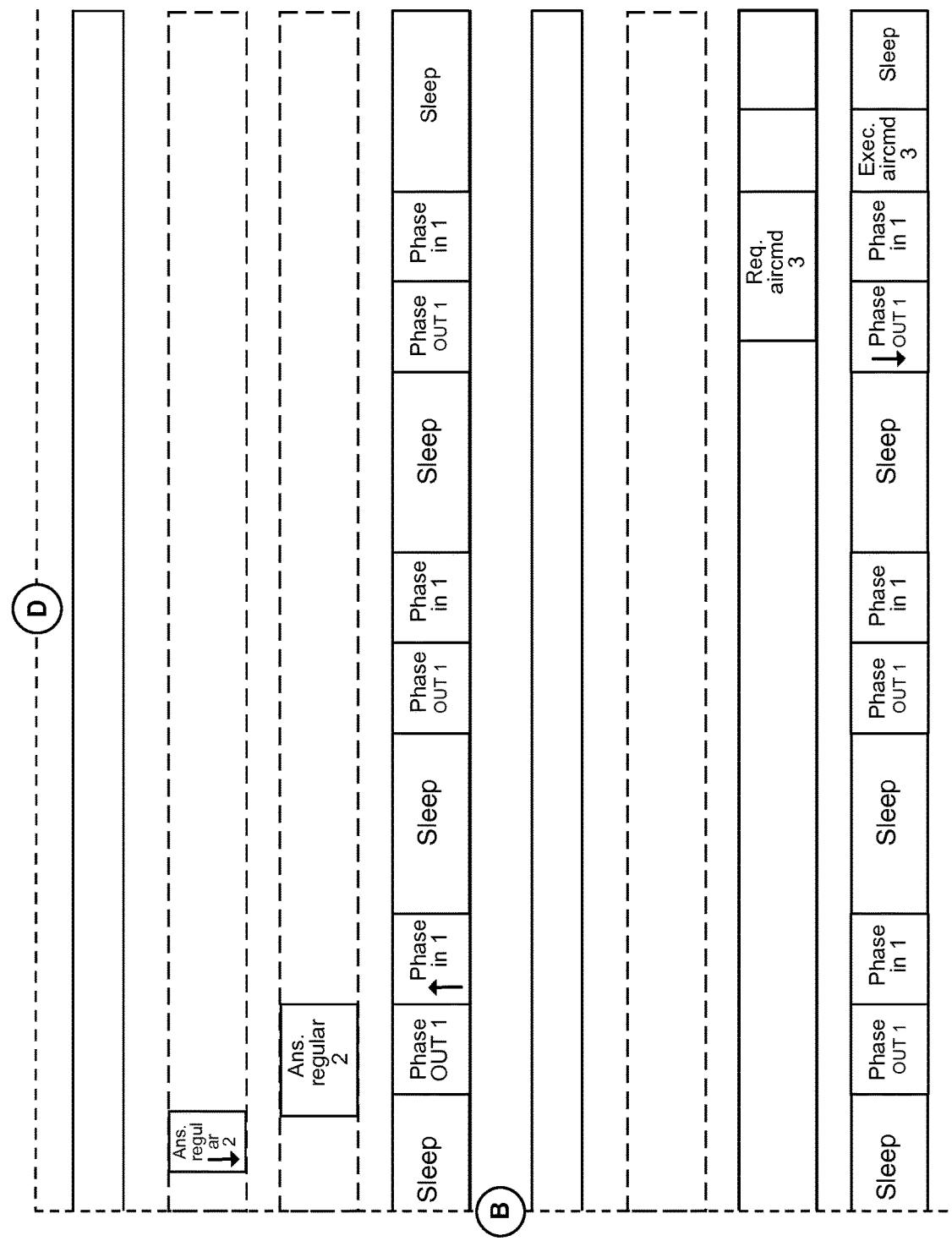
Figure 6A:
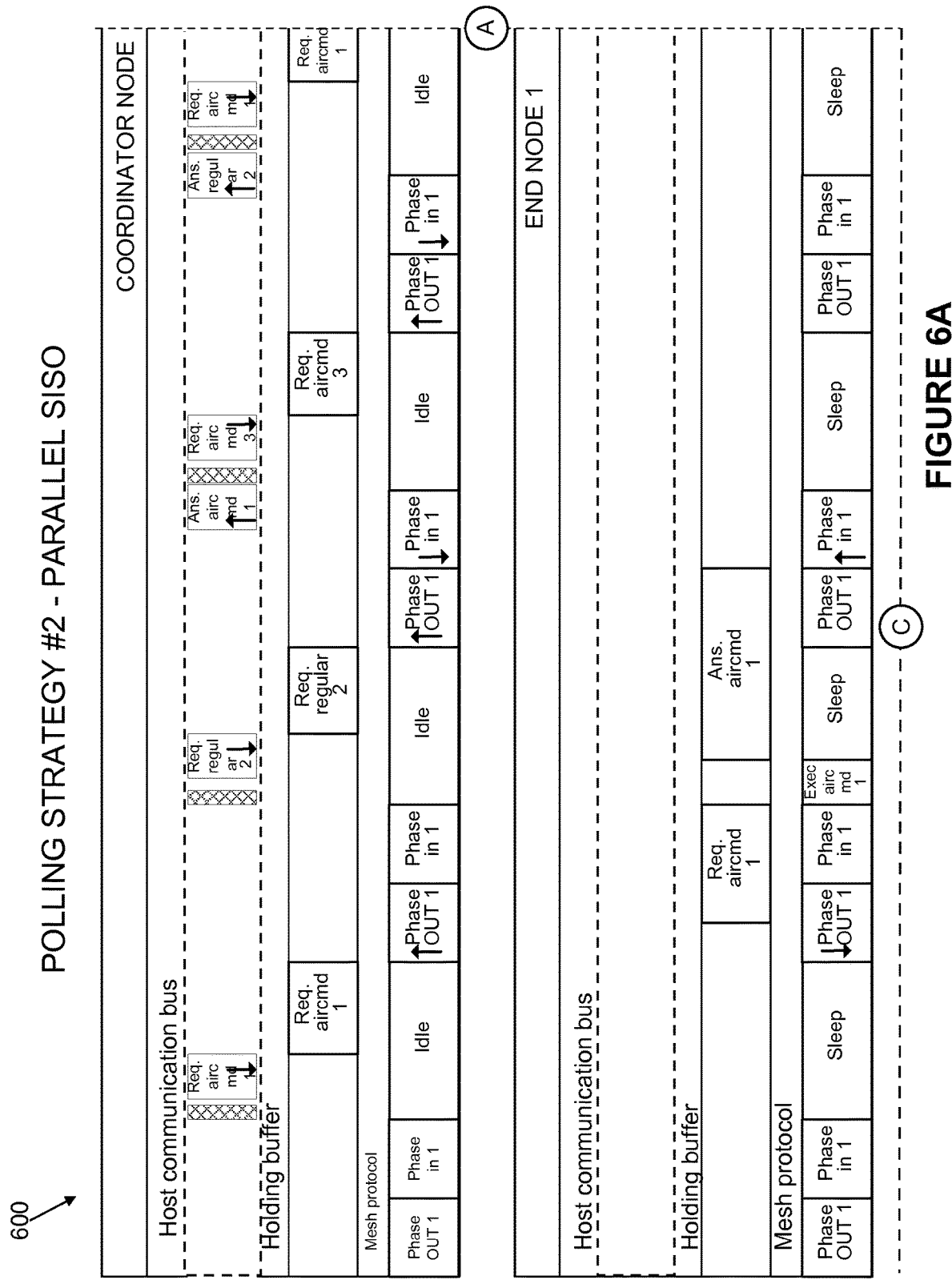
FIG. 6A, 6B, 6C, 6D combined constitute a diagram showing a second polling strategy, according to an embodiment.
Figure 6B:
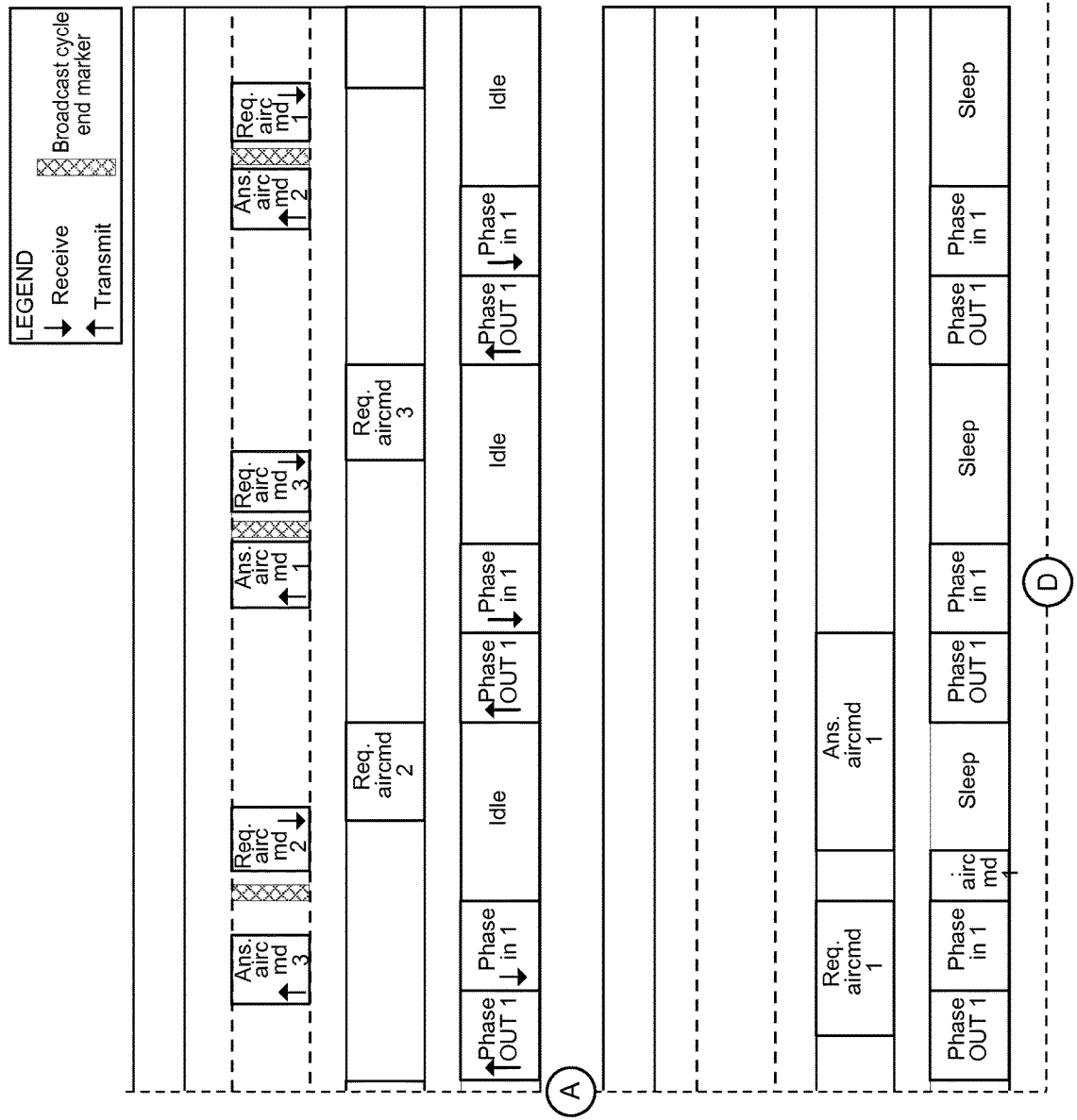
Figure 6C:
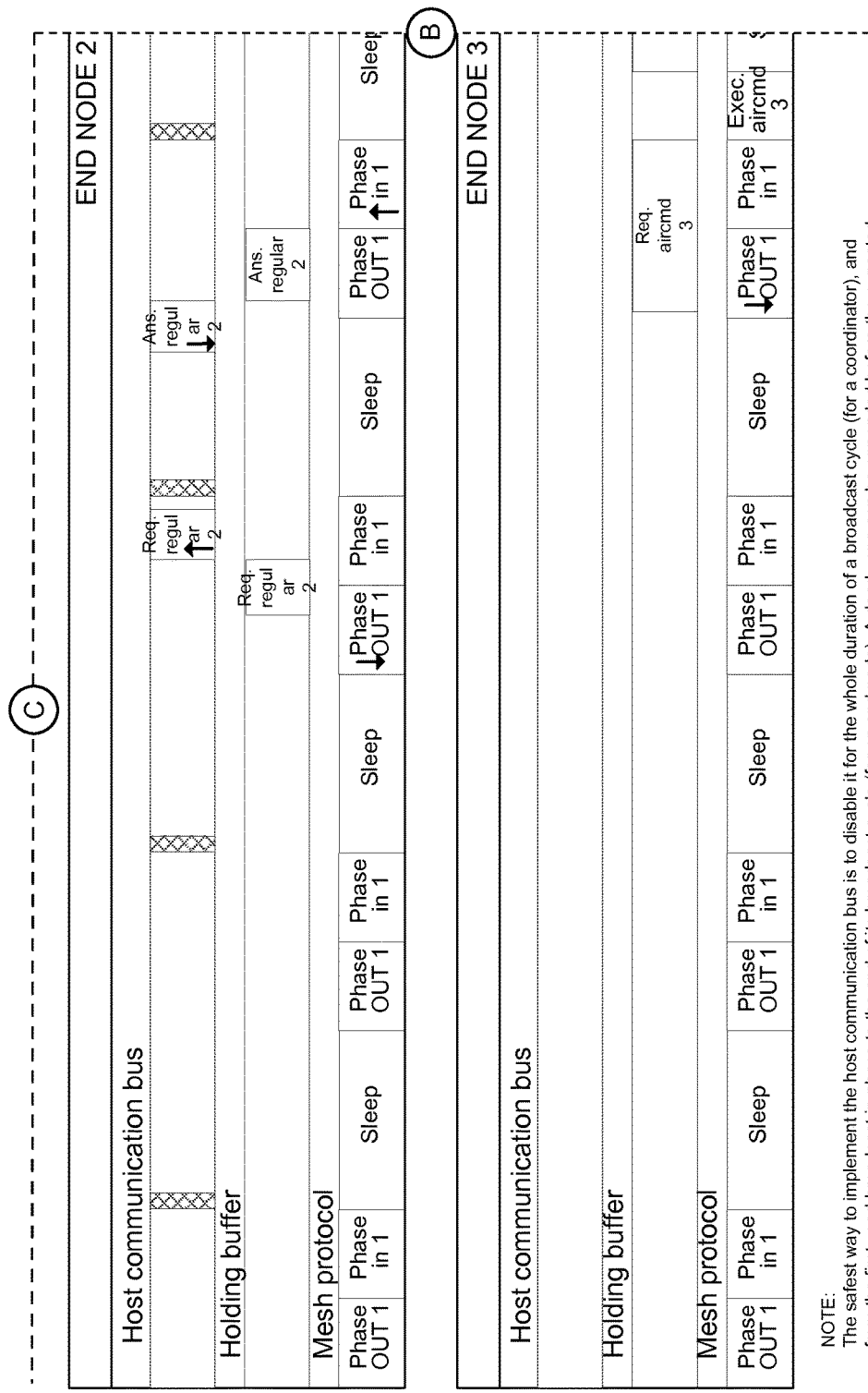
Figure 6D:
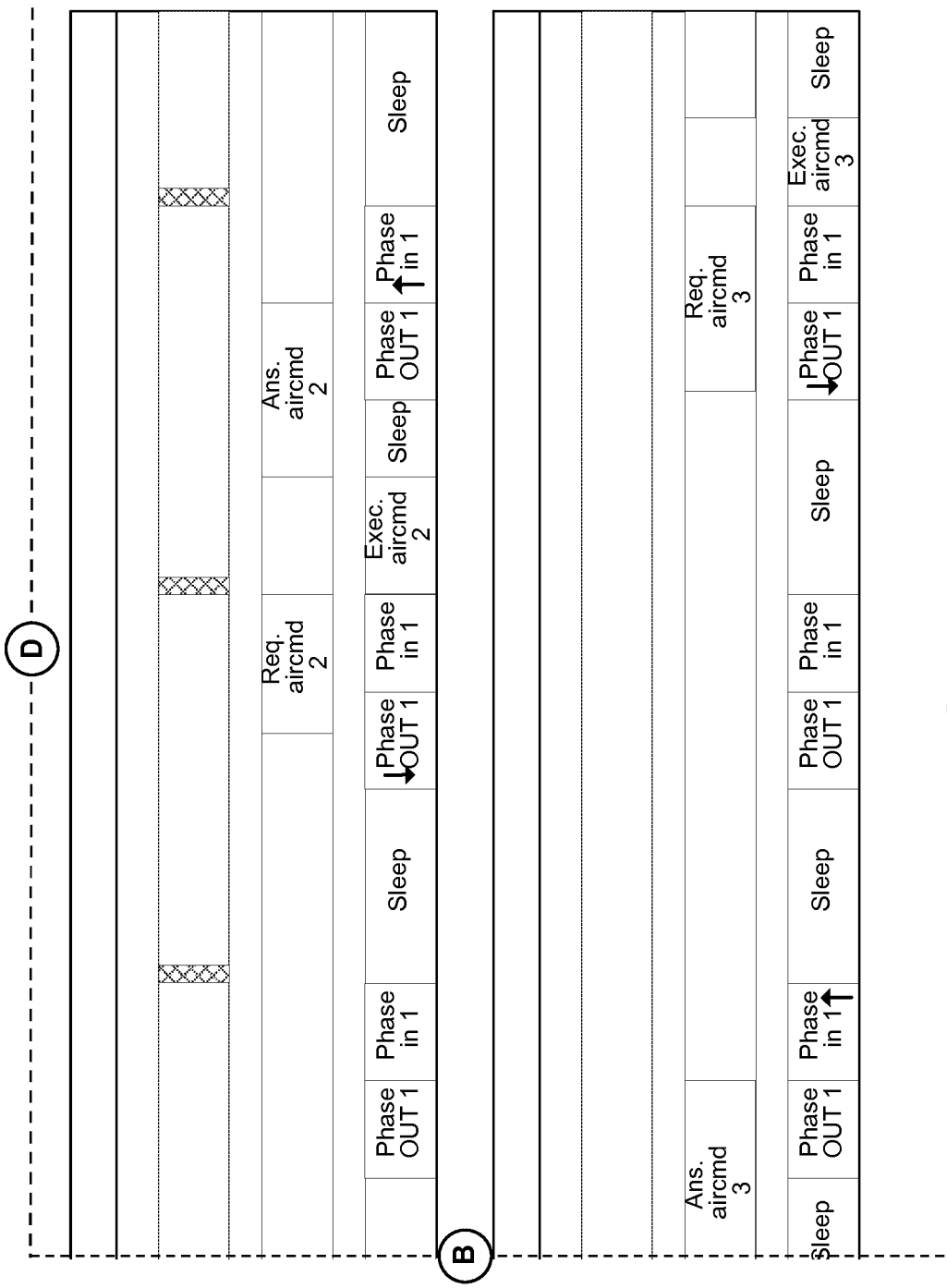
Figure 7A:
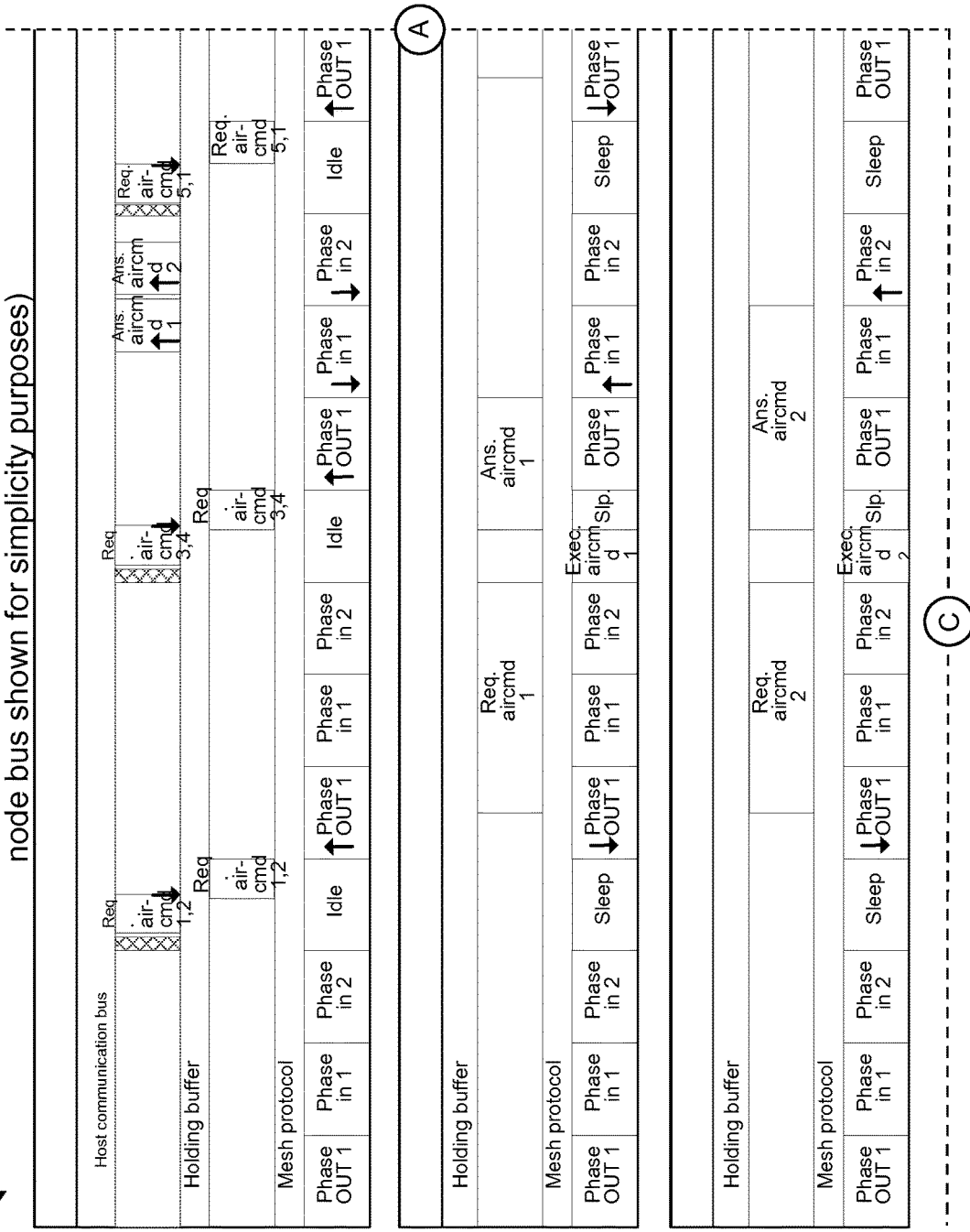
FIG. 7A, 7B, 7C, 7D show a schematic diagram showing a third polling strategy, according to an embodiment.
Figure 7B:
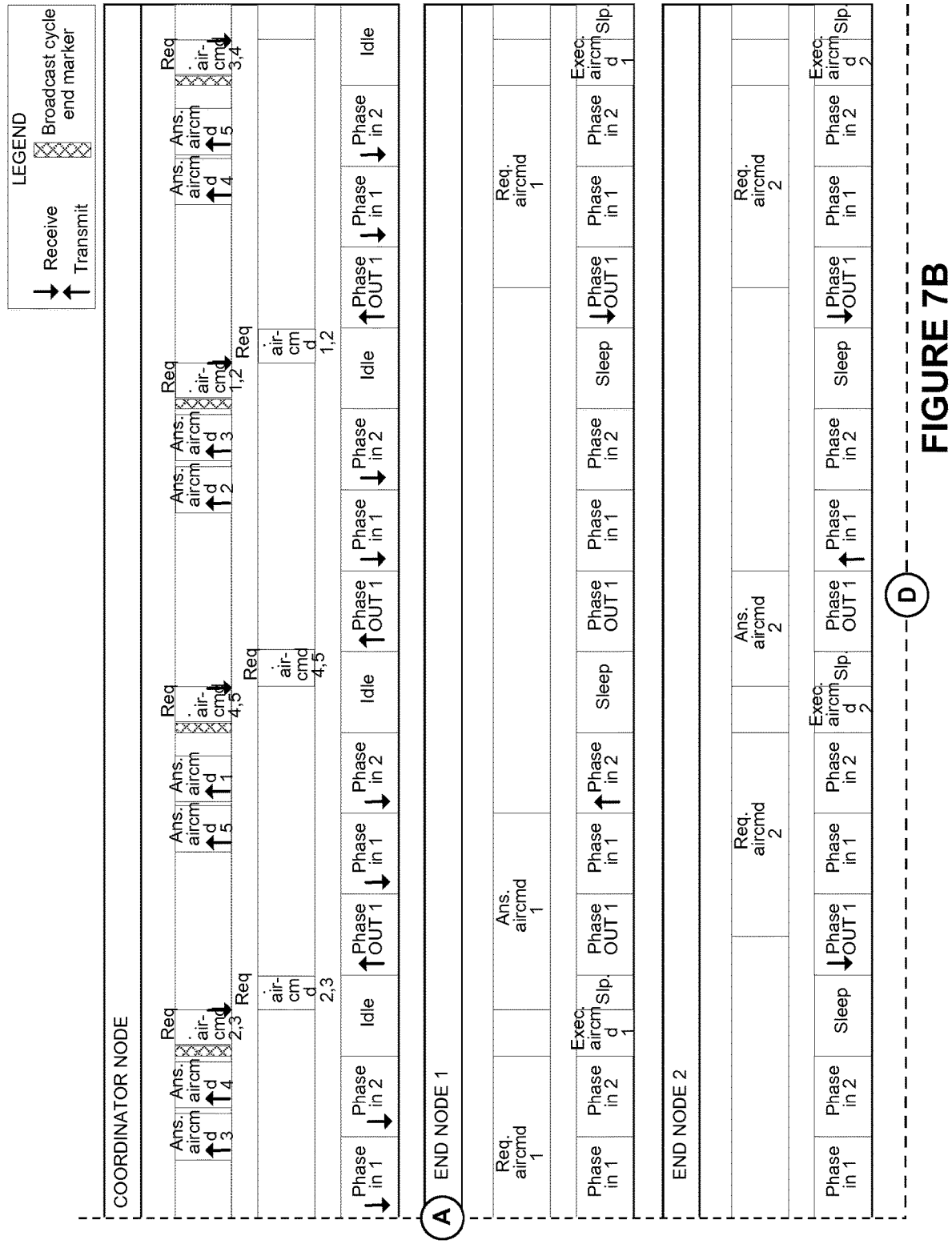
Figure 7C:
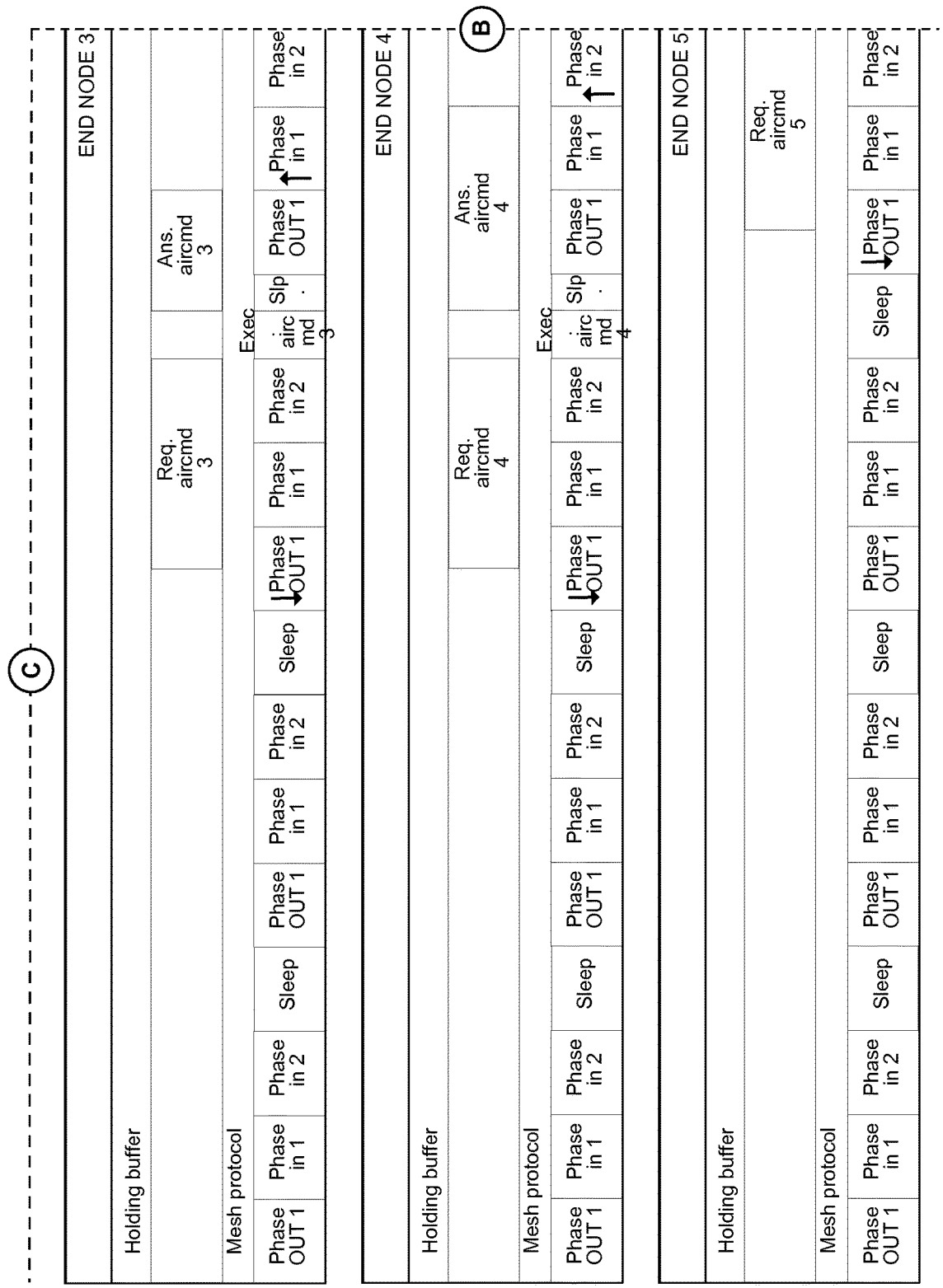
Figure 7D:
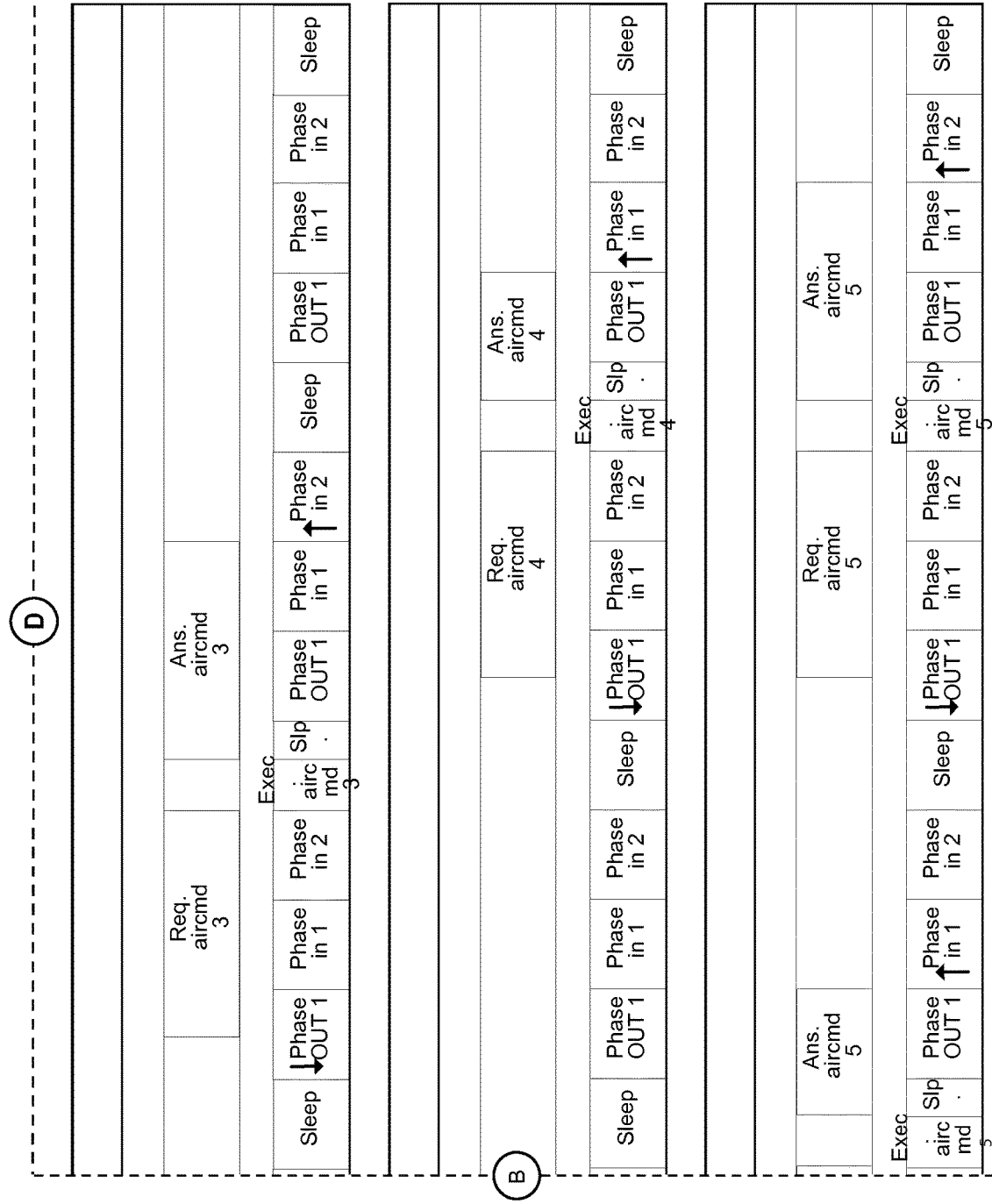
Figure 8A:
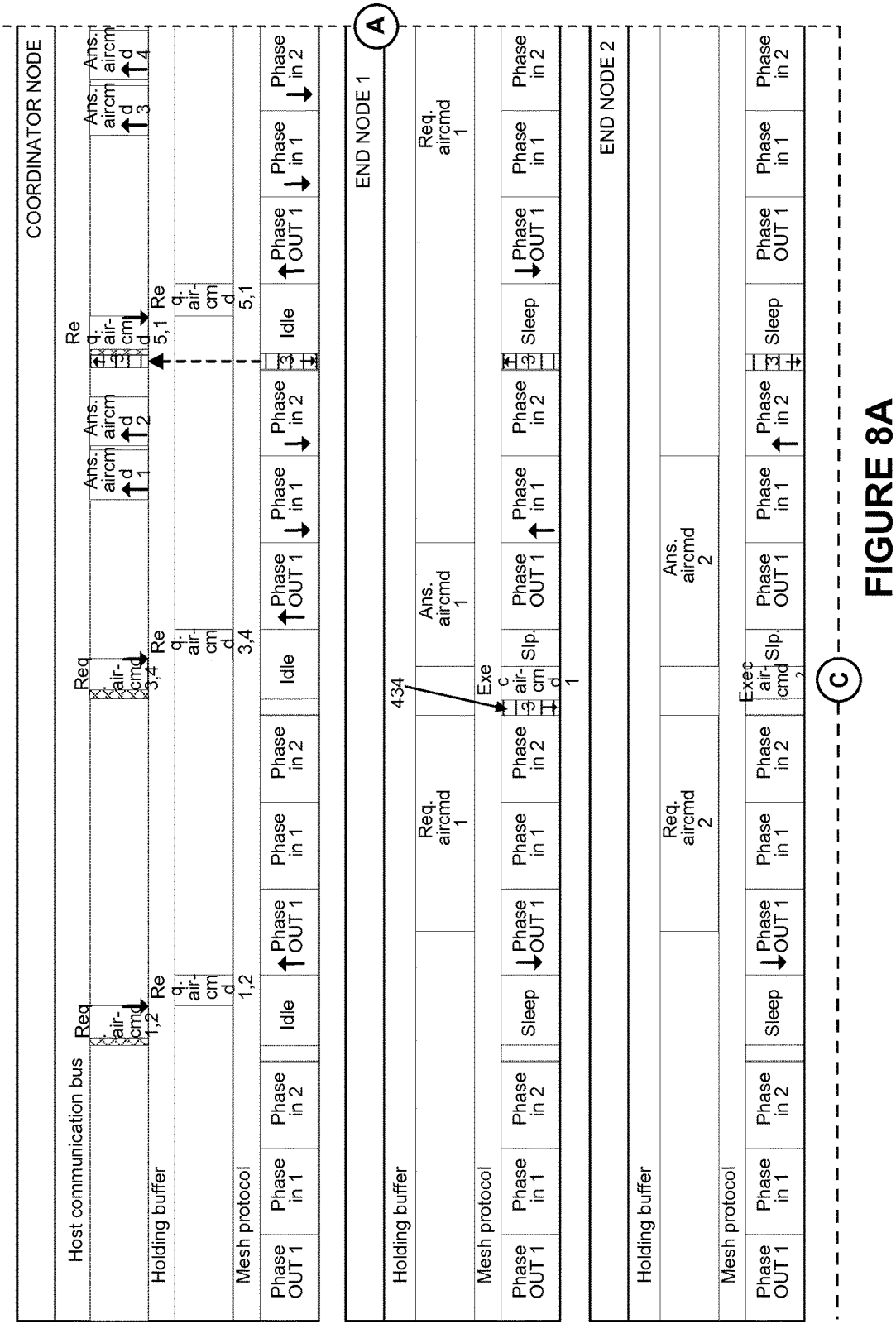
FIG. 8A, 8B, 8C, 8D show a schematic diagram showing a second polling strategy, according to an embodiment.
Figure 8B:
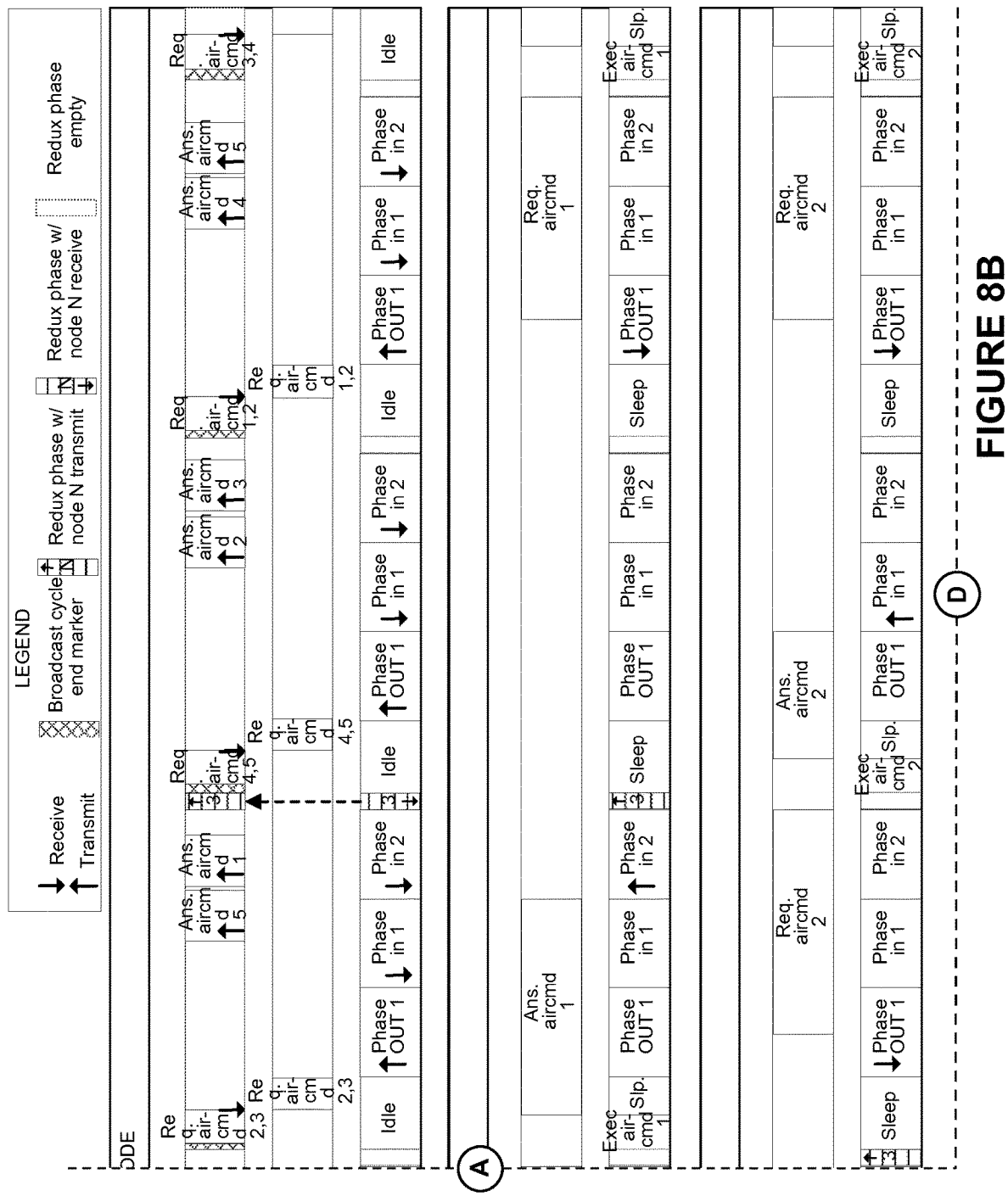
Figure 8C:
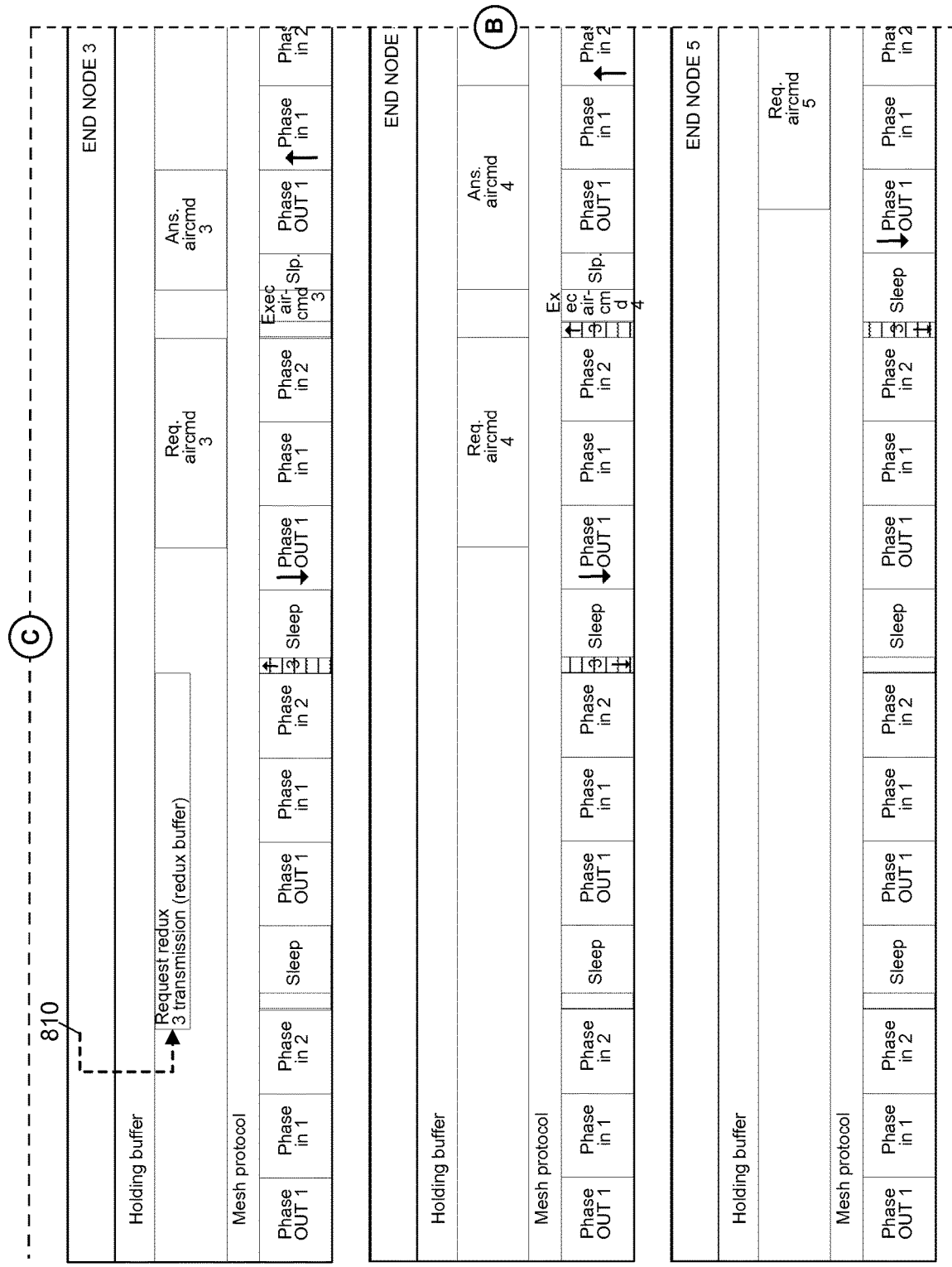
Figure 8D:
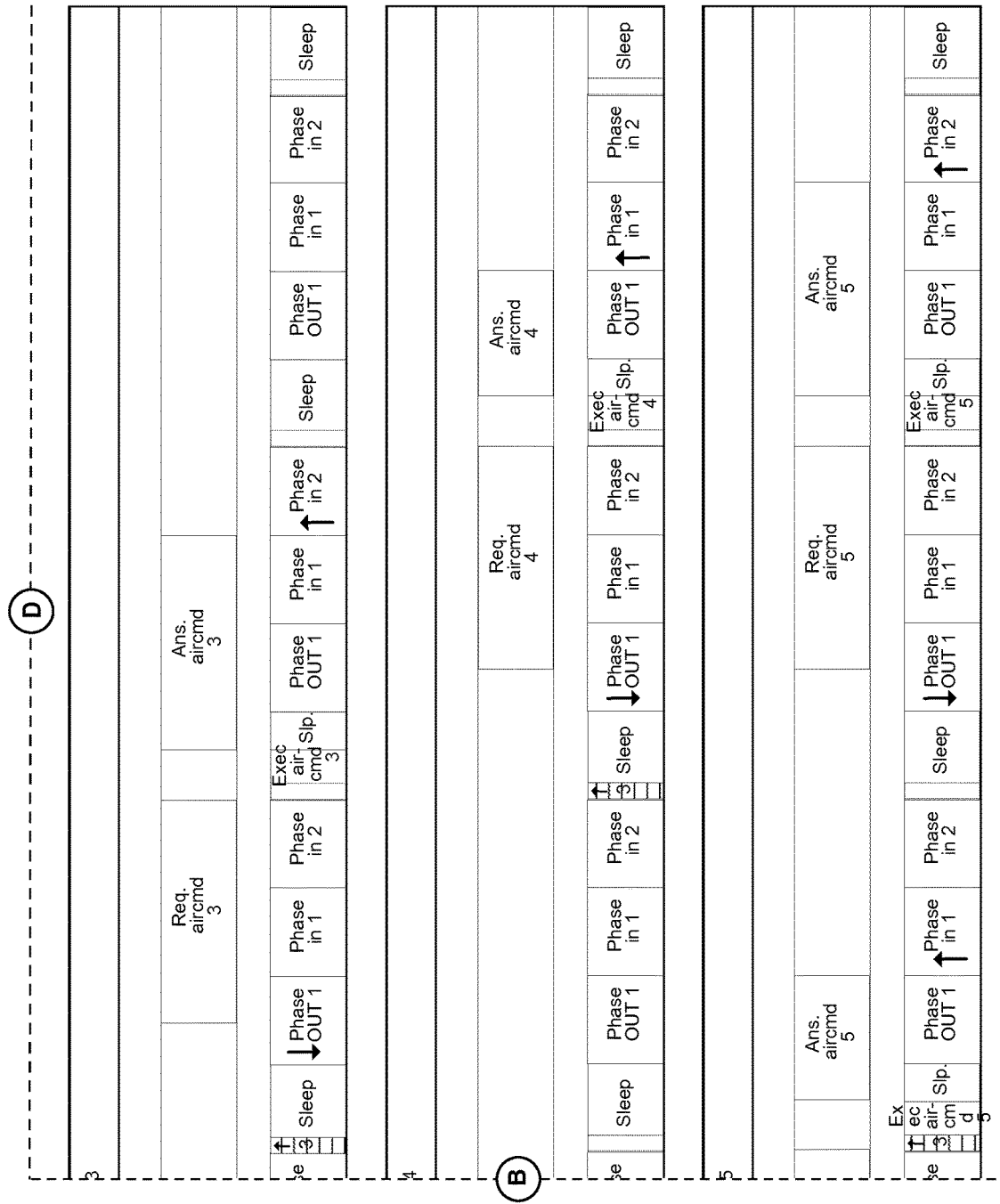

Broadly, in accordance with an embodiment, there is provided a novel application of a bit-synchronized mesh network leveraging the lower theoretical time bound of a mesh network packet broadcast which is not limited by conventional contention effects due to antenna diversity phenomena, as well as leveraging the capture effect inherent of FM radio distributed networks as a fallback transmission method in the case of heavy multi-path, delay-induced and physical occlusion-caused interferences, in order to not only enable a standard master-slave round-robin sensor polling scheme as seen in most distributed sensor networks, but also to enable multiple bandwidth-asymmetric clients that can replicate the data received by said master at no supplementary network bandwidth or speed cost, and thus allows more leeway as for the choice in the optimal power source for each node in terms of cost and maintenance requirements. In addition, standard flooding scheme is hybridized with a slow-flooding method called "redux phase", which allows for priority request signals from end nodes to be flooded back to a coordinator node in a shared, contention-enabled channel, so as to mitigate the time delay between node polling problem. Moreover, a higher-level integration strategy improving on round-robin polling is implemented using standard processor I/O interfaces in order to use the full bandwidth capacity of the network using (but not limited to) a single processor core that can time-share its computing capacity between mesh network synchronization and configuration with ancillary functions such as sensor glue code interfacing, thereby lowering integration costs, and allowing advanced features such as exposing in-band microsecond-level synchronization capabilities for specific application software living either within the mesh controller itself, or in an external processing unit. In addition, a design strategy is devised in order to enable legacy hardware to be bit-synchronized using specialized bus communication strategies in order to interface to an external low-power sleep controller, or even to use low-precision low-power internal clocks in conjunction with a regular high-consumption high-precision base clock in order to achieve low duty cycles at low manufacturing cost. Furthermore, a scheme is devised where direct interaction from user interface dictates the polling order of the sensor nodes, in order to maximize network perceived responsivity by the user in a way that is most intuitive and specially suited for deployment using recent touch-enabled HMI paradigms. Finally, a specific implementation of such a mesh network is used to control a parallel high-bandwidth and high-consumption multi-hop network in situations where power is limited to a finite non-rechargeable onboard supply.

Terminology

Following are some definitions of terminology used in the present description:
- a node, or sometimes "mote" if it includes a specific sensor implementation, is a network unit comprising of a controller processor and a transceiver, which allows to communicate with its peers in a distributed fashion within a mesh network.
- A coordinator node, also called "gateway", or "master", is the node whose task is controlling network-wide sleep cycles and communication slot assignment for other nodes.
- An end node ("slave") is any other node under the control of the coordinator node.
- A broadcast cycle is defined as a cycle, where packets are flooded throughout the whole mesh network from a coordinator node in what is called a broadcast "out" phase (a "phase" being a subsection of a cycle), and a given end-node floods back an answer throughout the mesh network in what is called a broadcast "in" phase. A standard half-duplex master-slave architecture will have two phases per broadcast cycle: one "out", and one "in". Thus, each network-wide flooding event is called a "phase".
- A packet is defined as a whole unit comprised of digital bit-encoded data sent and received from one transceiver to another. A packet is typically comprised of 2 sub-packets that we call "frames". Typically, a dedicated frame, called "config" frame, is used to transmit permanent mesh configuration data and thus is mainly dependent on the coordinator node configuration. Another dedicated frame, called "data", is used to transmit node addressing (typically a MAC address) and higher-level custom data packets, which depends on the implementation of the protocol layer lying over the physical layer, according to the OSI model. Finally, a frame called the "check" frame, is typically comprised of a packet integrity check method such as CRC. Such a packet structure is analogous to what is defined within the IEE802.15.4 standard, the exception being that the "config" frame must also hold a critical flood sequence number in order to time-bound a given bit-synchronous packet flooding cycle.
- Each phase can be further subdivided into "slots", which acts akin to TDMA slotting mechanisms found in current literature, with the major difference being the following: the time division access is not used to grant multiple packet data transmission access to the network by multiple end-nodes within the same phase, but rather is employed as a division unit for network-wide flooding of packets containing the same data frame content.
- A cooperative broadcast flooding is defined as a flooding of a specific data "frame" embedded within packets by multiple simultaneous distributed antennas (i.e. network nodes). In the case of a carrier-synchronized flood, the nodes are synchronized at carrier-level, similar to phased-array schemes. In the case of a bit-synchronized scheme, the jitter tolerance of the synchronization is increased to encompass multiple simultaneous, potentially not carrier-synchronized, transmissions of a packet having the same bit-pattern, by said nodes. The bit-synchronization effectiveness threshold is usually defined, according to performance assessment in prior art literature, as roughly half the time for a bit transmission. Both methods allow synergistic interaction between multiple end nodes, and this synergy is often labelled as "antenna diversity".
- Contention is a synonym for packet "collision". In networks that are not synchronized at the physical level, contention is a major issue affecting power consumption, and measures to mitigate its effect, such as packet acknowledge-retry back-off strategies, is a major ongoing research field.

Acronyms

Following are definitions of acronyms appearing in the present description:
ADC
Analog-Digital Converter
ACK
Acknowledge
ALU
Arithmetic Logic Unit
ASIC
Application-Specific Integrated Circuit
CLI
Command-line Interface
CSMA/CA
Carrier sense multiple access with collision avoidance
CTS
Clear-To-Send
DAC
Digital-Analog Converter
DB
Database
EEPROM
Electronically-Erasable Programmable Read-Only Memory
FCC
Federal Communications Commission
FHSS
Frequency Hopping Spread Spectrum
FM
Frequency Modulation
FSK
Frequency Shift Keying
GPS
Global Positioning System
GUI
Graphical User Interface
HMI
Human-Machine Interface
ID
Identification
IEEE
Institute of Electrical and Electronics Engineers
I2C
Inter-Integrated Circuit
I/O
Input/Output
LPF
Low-Pass Filter
LSBit
Least-Significant Bit
MAC address
Media Access Control address
MCU
Microcontroller
MIMO
Multiple Input Multiple Output MISO
Multiple Input Single Output
NAK
Not Acknowledge
NFC
Near-Field Communication
PC
Program Counter
PCB
Polychlorinated Biphenyl
RAM
Random-Access Memory
RAMBUF
Random-Access Memory Buffer
RC
Resistor-Capacitor
RF
Radio Frequency
RISC
Reduced Instruction Set Computing
RX
Receive
OOP
Object-Oriented Programming
OS
Operating System
OSI model
Open Systems Interconnection model
PDU(s)
Protocol Data Unit(s). Those are the main exchange protocol data units for a given protocol level N in a multi-layered protocol model (such as the OSI model).
PGM
Program
PLL
Phase-Locked Loop
QoS
Quality of Service
SDU(s)
Service Data Unit(s). Are the payload(s) of a PDU, transmitted unchanged to a peer within a given protocol level N. In a multilayered protocol model (such as the OSI model), the next protocol level N+1 encapsulates its protocol within the SDU of level N.
SFR
Special Function Register (usually in the context of microcontroller configuration memory registers)
SIMO
Single Input Multiple Output
SISO
Single Input Single Output
SPI
Serial Peripheral Interface bus
SMBus
System Management Bus
TCP/IP
Transmission Control Protocol/Internet Protocol
TDMA
Time-Division Multiple Access
TRX
Transceiver
TX
Transmit
UART
Universal Asynchronous Receiver/Transmitter
uC
Microcontroller
UDP
User Datagram Protocol
VM
Virtual Machine
WAN
Wide-Area Network In accordance with an embodiment, there is provided a cooperative bit-synchronized flooding scheme, in which a regular broadcast phase is subdivided by a number of non time-overlapping slots corresponding to the maximum number of repeating cycles (a.k.a "hops") that the network allows, in order to time bound packet flooding to strict times. This bounding action is enforced on the end node side via stopping further packet repeating if the packet to be repeated has a current sequence number embedded in the configuration frame which overflows the maximum number of hops set for the whole network. In other terms, the information required to time-bound a packet broadcast flood is embedded as a sequence number in the configuration frame of all packets being broadcasted, and this sequence number can be mapped as an injective function of the number of times a packet has been repeated from the start of the flood, and the end nodes rely on this signal in order to determine when to stop repeating any packet they receive. Every time a packet (which is typically a bit-stream) is repeated, it is so via a variable number of nodes, the number of which depends on network topology, in a bit-synchronized fashion (i.e. with time delay synchronicity better than $1/(2*B)$, where B is the bit-rate.

The number of time a packet is repeated after a given end node receives its original source can vary from as low as 1, to as high as allowable by the time-bound of any broadcast flood, and those can be spaced with inactive slots in between, mainly in order to diminish the risk of multi-path-related interference due to time delays, among other things. This allows for a certain level of supplementary robustness, as long as the flooding time-bound can allow for such packet repeated transmissions. Moreover, in the case where bit-synchronization fails due to multi-path fading, to time delays, etc., this allows a system to fall-back to the capture effect inherent of some radio transceiver systems due to their receiver carrier-locking designs. Note that a measure of variability in bit-synchronization jitter is included in order to increase the number of different possibilities of packet capture from different sources (this can be named "capture effect diversity"), and such sources can include (but are not limited by) the following random and pseudo-random sources.

1) Clock Synchronization Methods

Reference is made to FIGS. 1A, 1B, 10A, 10B, 11A, 11B, 11C, 11D, 12, 13A, 13B, and 14A, 14B). The high level structure of an end node mesh controller can be summarized as displayed in FIG. 1A, and an example circuit plan is shown in FIG. 1B, whereas more details about the operation is shown in the FIGS. 11A to 11D, 12, 13A, 13B and 14A, 14B.

In contrast with the standard clock synchronization method where the mesh controller IC that interfaces to a RF transceiver and its front-end circuitry uses a high-frequency, high-accuracy (and thus with high power consumption levels) in order to serve the processing power needs and microsecond-level interrupt accuracy needed for a cooperative bit-synchronized mesh network protocol, which disallows for low-power consumption sleep mode, and instead of using a very high quality, high accuracy, low power consumption and thus high-cost, second sleep-mode clock in order to increase the asymptotic effective duty cycle achievable by the system by reducing the guard time per broadcast cycle needed, the approach used, among other things, within the preferred embodiment of the invention, is to use a high-precision master clock in combination with (for medium to low duty cycles requiring an effective duty cycle clock synchronization accuracy of 300 ppm or less) low-cost but high-drift oscillators for managing sleep cycles, such as RC oscillators that can be implemented at very low cost in ASIC, and are a standard feature in most modern microcontrollers. As those oscillators have typical accuracy an order of magnitude lower than what is required for lower duty cycles (assuming a ppm accuracy as mentioned above, for instance), a method was devised in order to compensate for the lack of accuracy typically caused by thermal noise, temperature variations, etc., which can be summarized as follows.

A clock drift correction calculation mode is occasionally activated, where the RC clock runs while the master high-frequency clock is active, in order to have a timing assessment of the RC clock current offset with respect to the higher-precision master clock. Those values can then be low-frequency filtered (the simplest method being an averaging filter), and a correction factor applied for a finite number of broadcast cycles, in order to account to external influences on a given clock frequency of operation, after which the correction algorithm is ran again.

A trigger for this correction algorithm can be when a sleep-enabled end-node listens to a broadcast "out" packet from its coordinator node, and monitors the parameters which affect the sleep cycle timing. Note that the number of parameters monitor could be zero, in the case where all timing parameters are hard-coded within each node. It calculates the expected sleep cycle delay according to those parameters.

Another trigger is a periodic re-activation of said correction algorithm, where a sleep-enabled end-node uses a counter in order to monitor the number of broadcast cycles elapsed since the last correction cycle has been run. Typically the count threshold is set so that the ratio between the time between successive activations of said correction algorithm, and the time during which said algorithm is ran, is typically equal or lower to the effective desired corrected clock tolerance, in order to minimize the power consumption impact of the correction cycle on overall effective network duty cycle.

If the duty cycle is set at the special case of 100%, only the primary high-frequency clock is used, and the only power-saving features are using mesh controller processor unit idle mode (for powering down any internal peripherals) when time-sharing is inactive and the mesh controller is awaiting a given interrupt from its radio transceiver peripheral.

Else, immediately after, or alternately before, a broadcast cycle, when a trigger activates the correction algorithm, the latter calculates the number of data points needed in order to increase the correction factor precision so that its tolerance become better than the desired corrected clock tolerance value, said number of data points (assuming an averaging window methodology) depending on the jitter of the interrupt signal that captures the length of the average RC clock tick in terms of master clock ticks, due to the combined jitter of the clocks.

In a higher-complexity alternate embodiment when the target processor used as mesh controller allows for it, the RC clock drift can be further divided into a random component and a non-random component that can be modeled as being dependent on external factors such as temperature and voltage, in order to pre-compensate for this jitter component and thus allow a lower correction time. Furthermore, the result from this model can be fed to a filtering component, and its nth-order derivatives (with a post-filtering component) used, as a trigger for activating the correction algorithm. This would allow to reduce the frequency of the periodic trigger, while maintaining the same effective accuracy.

Another embodiment might use a higher precision low-frequency clock source for managing sleep, either in combination with a high-frequency master clock in the same processor, leveraging the inline clock synchronization facilities used within that processor platform, or in a stand-alone manner, where an internal, PLL-locked higher-frequency clock is periodically activated during wake cycles in order to allow microsecond-level accuracy required for bit-synchronization, while maintaining low power while in sleep mode. This is only possible when one uses a specific hardware platform that have multiple clock interfaces pre-integrated, and do not allow for the mesh controller algorithm to be ported to more generic industry-wide platforms.

In the latter case, when a pre-built radio platform with a in-built processor as well as a high speed clock, and when high clock accuracy during sleep is needed in order to reduce the minimum effective duty cycle of the network, is used as basis for retrofitting bit-synchronization facilities in conjunction with ultra-low power sleep modes in between broadcast cycles, the preferred embodiment of the invention then employs a novel synchronization method that can live within any standard synchronous communication bus between the chosen radio platform processor (typically used as mesh controller), and another dedicated IC used for appending low-power sleep mode capabilities, called "external sleep controller", and thus leverages existing bus capabilities of said hardware platform instead of consuming supplementary dedicated pin. This becomes a favourable design proposition when said communication bus is also tied to external sensors, for instance, as it reduces required PCB complexity and thus design time and cost per node.

For instance, in the case where a SPI style bus is used, with a set of control pins (typically called NSS pins) in conjunction with synchronous clock and data pins, and in the case where said control pin can deactivate SPI bus at whim, then the data pins can be recycled either while bus is inactive, or when the bus is officially communicating with said sleep controller (in which case even the microsecond-timing of the NSS pin or the clock pin signals can also be leveraged) in order to (1) embed microsecond-level clock timing information within the bus in order to clock synchronize the sleep controller with the master clock within the mesh controller, and (2) as an interrupt wake source from the sleep controller back to the mesh controller. As for transmitting known local clock time base of each controller data back and forth, the regular SPI bus can be used in its regular fashion.

Reference is made to the flowcharts of FIGS. 11A to 11D and 12, and diagrams of FIGS. 13A, 13B and 14A, 14B. In the case where a I2C (or SMBus) style bus is used, with the mesh controller being the I2C bus master, then the clock stretching capabilities of the bus can be leveraged in order to transfer precise interrupt in the same fashion as for the SPI bus, while addressing the sleep controller using its own dedicated I2C address. In the same manner, the equivalent of a start and/or stop signal in the I2C bus can be leveraged by a slave sleep controller, which can pull those lines down to local digital bus ground in order to force a precise wake interrupt to the mesh controller, which can then relinquish bus control after a specified time delay. In this manner, the bus properties stays within specification, as seen by other device users sharing the same bus (the only devices straying from typical bus operation modes being the mesh controller and its external sleep controller).

Figure 14A:
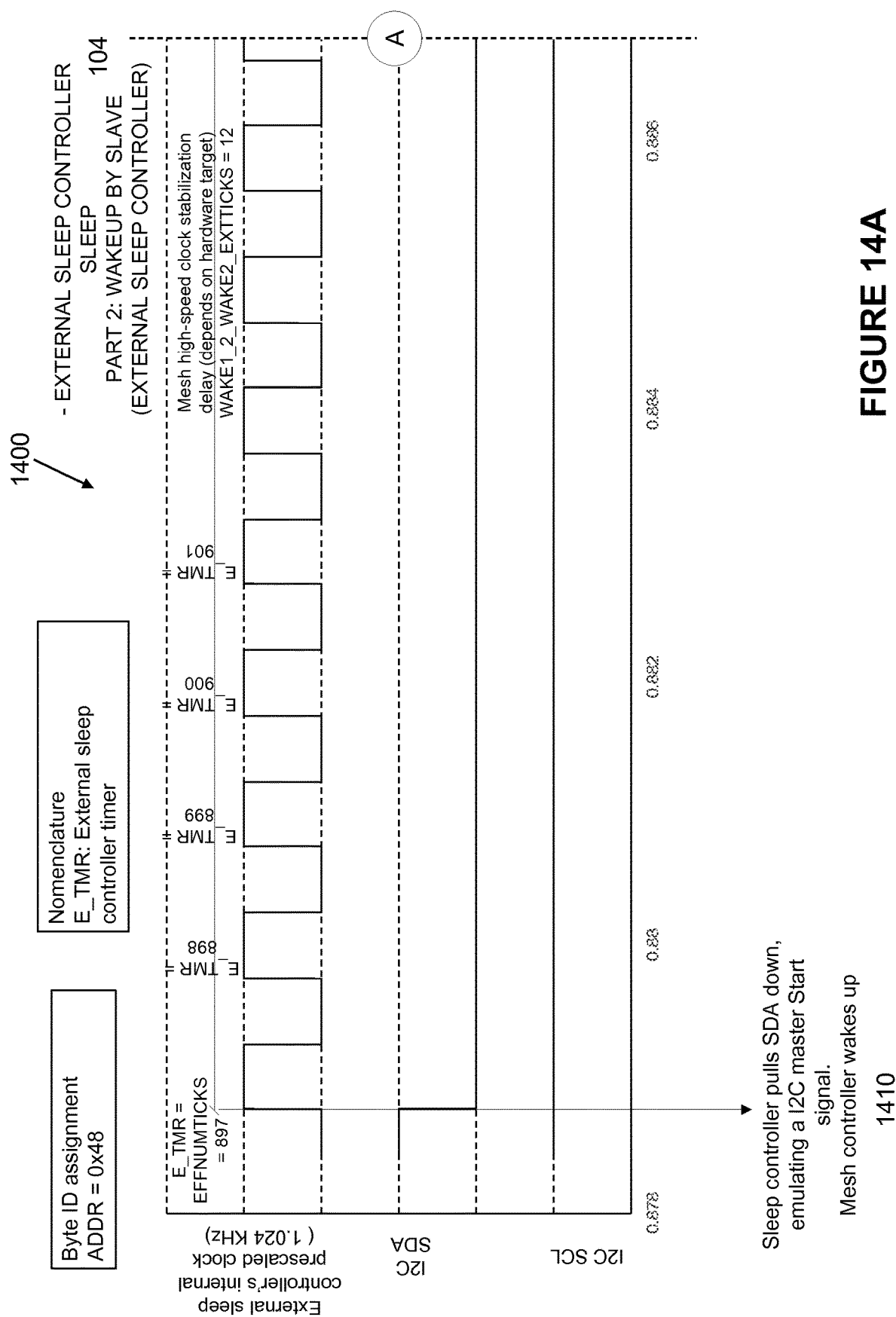
FIG. 14A, 14B show a diagram showing an I2C bus waveform timeline for an external sleep controller communication bus during the wake-up phase, according to an embodiment.
Figure 14B:
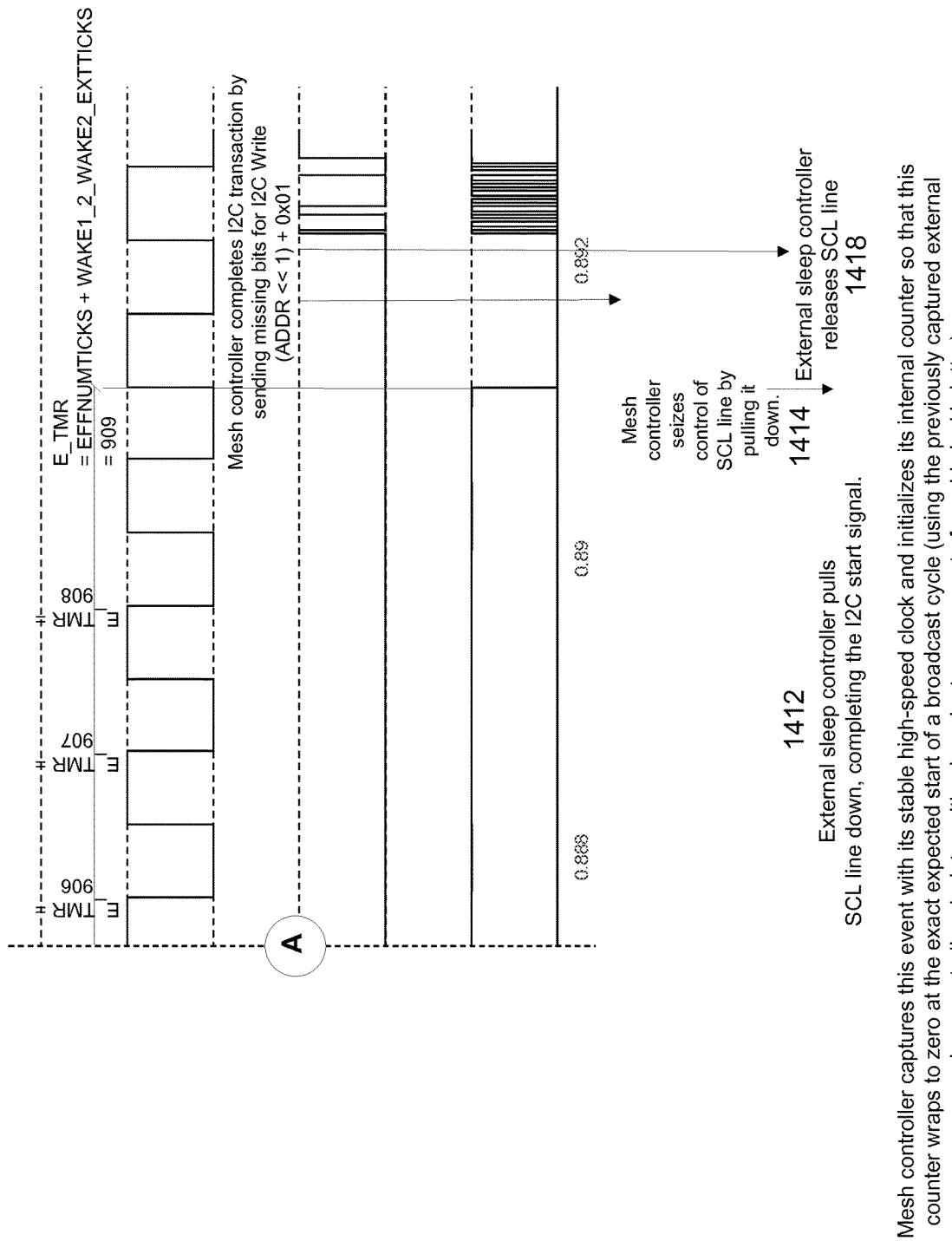

Typically, referring to the diagram 1400 in FIGS. 14A and 14B, at least two successive wake signals must be given, the first 1410 used to wake the mesh controller, and the second 1412 in order for the mesh controller to synchronize its clocks according to its predicted value at wake-up. This is necessary for high-precision microsecond-level synchronization because at mesh controller wake up, there is a variable and high-jitter time delay between the interrupt reception event by said controller, and the moment when its master clock is stable, thus the first interrupt cannot typically be relied on in order to sync the mesh controller clock at wake-up time. It would be possible to disregard this phenomenon and simply use one interrupt, but with an accuracy penalty that would be linked to the accuracy of modeling clock wind-up times for the hardware platform chosen as a mesh controller.

The approach as embodied by both the I2C and SPI approaches above can be generalized to many synchronous bus topologies where signal pins can stray off timing-wise in order to encapsulate clock sync timing information between both controllers, without affecting the main communication bus protocol specifications as understood by any other hardware sharing that bus.

Figure 15B:
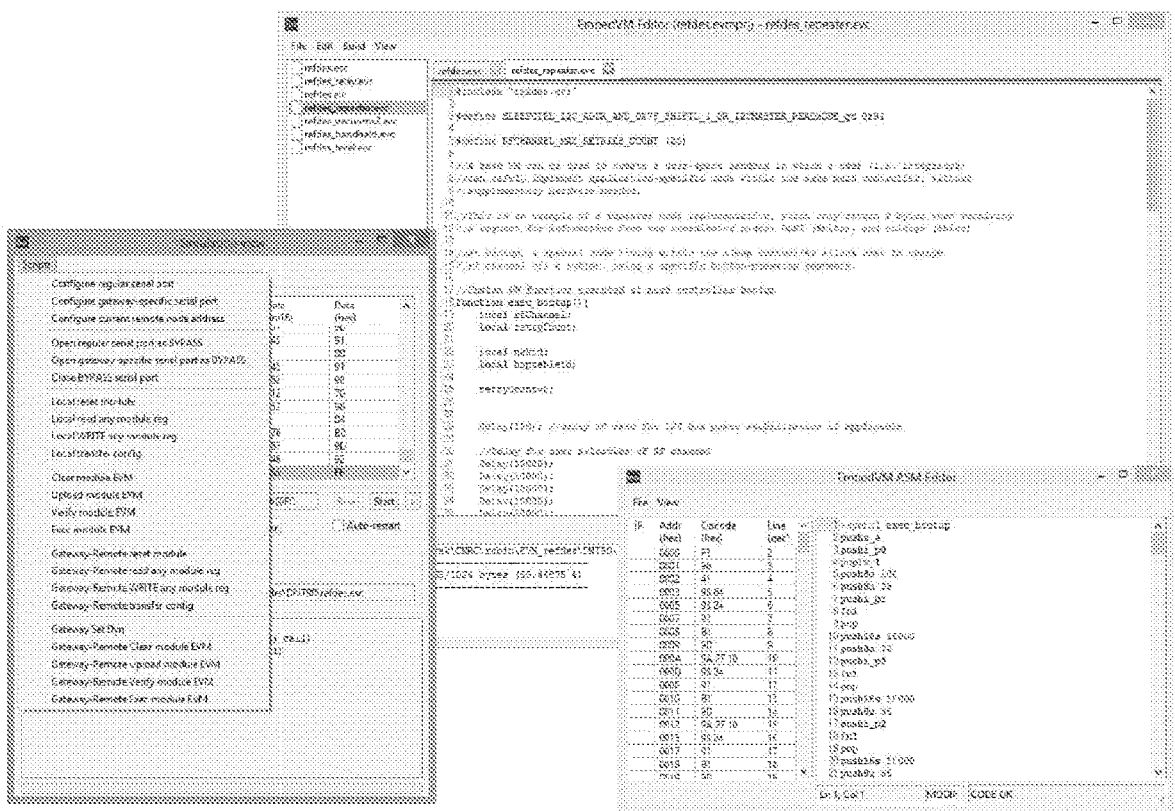
FIG. 15B is a screenshot of a VM tool-chain targeting a mesh controller, according to an embodiment of the VM strategy.

2) Mesh Controller Time-Sharing with Sensor Peripheral Integration Firmware within the Same Processor Core Reference is made to FIGS. 2 and 3A, 3B, 3C, as well as to FIGS. 11A to 11D, 12, 13A, 13B and 14A, 14B. The specific location of event triggers used in the preferred embodiment can be visualized in FIG. 2 (diagram 150), and an example VM flowchart 300 is provided in FIGS. 3A and 3B. An example VM client code leveraging this design strategy is shown in FIG. 15A, 15B.

Regular mesh controller architecture is typically using a low cost, low consumption, single-core processor linked to a transceiver ASIC, with must communicate with another host processor in charge of the glue logic between sensor and control interfaces. This is typically due to the strict timing requirements of such a mesh controller depending on the mesh algorithm used, that disallows use of processor cycles while managing timing-sensitive signals, especially when the mesh controller must also already dedicate processor cycles for local bus communication with another client processor while executing mesh-related operations. Moreover, for standard contention-enabled cost-sensitive mesh networks, which usually must also broadcast a synchronization packet in order to in-band synchronize the node clocks together for sleep mode, the unpredictability in flood times for high density of nodes due to contention, which entails use of acknowledge/retry cycles that consume precious time spent in a high power-consumption mode, the mesh controller processor can typically not afford to run client-side custom parallel firmware for specific sensor integration, unless the time taken by said firmware is small enough so as to not affect and impede the operation of the network at low duty cycles. This can be of course ensured in a case by case basis depending on the selected sensor or control external circuitry that are expected to be interfaced to the mesh controller, in which case custom user sensor glue code is typically designed as being an integral part of the mesh controller firmware itself to ensure well-behavedness, in which case the client portion of the firmware typically be compiled and custom integrated by the IP owners of the mesh controller firmware itself, which doesn't lend well to adoption of such a platform due to a lack of openness. Some specific mesh implementations, such as the popular Digi XBee™ with DigiMesh™ transceiver product line, embed for this purpose a second processor core on the mesh controller PCB dedicated to custom client-side sensor glue-code firmware development.

Because the preferred embodiment of the invention employs a cooperative bit-synchronized network, the broadcast flood process becomes predictable and can be time-bounded according to the optimal theoretical relationship between flooding speed and mesh network size. This means that in the case that a network can be operated at a duty cycle less than 100%, there is always a free guaranteed and completely deterministic time slot corresponding to the expected sleep time between broadcast cycles, where processor cycles are typically only used for main communication bus management. This frees it for executing custom client firmware for longer time periods (a feature essential for long ADC acquisition times inherent of many low-power sensors), which can stay well-behaved as long as it respects the guaranteed time bound. It will also ensure that no parallel code execution operates while the mesh-related operations are pending completion, as this would typically involve using interrupts in order to emulate a multi-tasking environment, which would jeopardize the tight timing tolerances required for some critical operations of the bit-synchronized node (such as for transmit begin trigger signals, for instance).

Thus, one can leverage those free processor cycles during this time period while safeguarding the proper operation of mesh-related firmware within the same processor core, using this the following strategy.

The mesh controller sets up event trigger points related to mesh network operation, such as (but not limited to) the following: (1) controller boot-up 152, (2) entering mesh seek mode 154, when a node stays in receive mode in order to lock itself and its local clock to the mesh network in which it is intended to operated, (3) leaving mesh seek mode 156, (4) entering broadcast cycle 164, (5) leaving broadcast cycle 168; those event triggers can be activated or deactivated according to a stored configuration data structure residing in the controller non-volatile memory 126 (FIG. 1).

In a possible embodiment of the invention, those events can also be captured using on-board processor facilities, at a microsecond or sub-microsecond accuracy, and stored in a dedicated section of memory for later use by client code that might need to use a common in-band time base for time-critical sensor operations, such as acoustic phase arrays, for instance.

An architecture where user code can only sporadically run as time-limited runtime callback functions after specific events is used (in contrast with continuous user code running), said time-limit depending on the nature of the event. For instance, a time limit as long as the sleep time between broadcast cycles can be used for event 5 (leaving broadcast cycle), can be relatively long for event 1 (boot-up), but should be very short for event 4 (entering broadcast cycle), for instance. This ensures that user code execution be compartmentalized out of the mesh network operation broadcast cycle, therefore interfering with the mesh network precise synchronization. Evidently, for single core processors, this implies that user code cannot safely run as natively compiled code, because then there is no guarantee of the well-behavedness of such user code.

Note that another possible embodiment of the invention can discard the use of time-limits, in which case the network can operate, but with possibility of failure mode due to user-code, depending on the degree of engineering safety that one desires to achieve.

To solve this problem, a dedicated non-volatile memory section is also dedicated to user custom firmware in the form of a virtual machine (VM) bytecode optimized for low-speed low-memory-footprint embedded targets, with the VM architecture being set up so as to trigger separate user code sections according to the mesh controller events as listed above. Note that for single-core targets such as low-cost 8-bit microcontrollers running at typical MHz clock speeds, using a VM usually entails a significant loss in processing power, as a single bytecode opcode being executed can take up to milliseconds to complete (depending on the VM architecture chosen, the most common design choice being to use a RISC VM architecture which sacrifices opcode employment efficiency in order to save precious non-volatile memory space dedicated to VM processor implementation), but due to the deterministic nature of the sleep period between broadcast cycles, such an architecture is usually sufficient to even implement low-efficiency bit-banging of a non-standard sensor peripheral, for instance, all within the sleep cycle between broadcast cycles, even for low maximum number of hops per broadcast phase settings (which decrease the sleep time for a given duty cycle setting).

A known failure mode when using time-shared user-code in the same processor core as the mesh controller, consists of user code overflowing past its allotted execution time slot, which would jeopardize mesh controller timing integrity which is so critical for the good operation of a bit-synchronized network, and can also push the mesh behaviour past its operational parameters as allowed by standard regulating bodies such as FCC. This is one of the reasons why a dedicated user-code core is usually employed in a user-customizable mesh controller as a safeguard measure (short of employing dedicated ASICs for the task). However, the use of a VM architecture allows to address this critical concern for bit-synchronized networks by ensuring that each executed VM bytecode opcode, independently of its nature (be it a ALU operation, an I/O operation, timing peripheral operations, etc.) and expected time of execution completion, be bounded to a deterministic timeout using either a low-level interrupt strategy, or a more conventional polling strategy for longer custom operations (such as VM delay functions, for instance). Moreover, between each opcode, the processor can then check whether the operation time since the start of a VM execution overflows its allotted time, and then shuts down the VM engine before a broadcast cycle can begin (and thus operates similarly to a VM watchdog, or a VM hypervisor).

3) Use of Multiple Bandwidth-Asymmetric Clients, i.e. Upgraded "Sniffers"

Assuming that the network mode of operation contains at least 1 broadcast out and 1 broadcast in phase (typically symmetric in terms of time taken, and number of effective data bits carried in each data frame of the packets flooded in both directions), this ensures that there is permanent possibility for two-way communication between each end node and the main coordinator node. However, due to the very nature of a bit-synchronized network, in which every data in transit is flooded to all nodes in order to increase antenna diversity, it is possible to leverage this effect in order to ensure that system-wide database be replicated at different client locations using the same mesh network technology, via sniffing a packet from any location that is connected to the mesh network, instead of synchronizing them via external network such as cellular towers, for instance, and without hefty power consumption penalties.

Consider a typical sensor management architecture, where a centralized database is managed by a processing unit, which also commands the coordinator node, and in which every node is registered with the following information (not all-inclusive):
  Configuration variables, which can be either used only by the database management unit, or by the sensor nodes themselves (can contain sensor control variables, node warning/error thresholds, etc.)
  Data variables (exclusively consists of data send back by end nodes)
  Node network state (ex: online, dead, seeking sync, etc.)
  Node position (this can be neglected if positioning is done for the majority of nodes in an offline fashion, as is the case when someone uses a barcode reading apparatus that contains a GPS unit in order to jot down its position and to register it in database at scan time, in which case dynamic node positioning for specialized sensors or client "sniffer" nodes can be accomplished instead within the data variables above)
  Last good node data reception timestamp In this case, it is desirable to have at least the following sections of the database to be synchronizable via the mesh network at maximum potential speeds, in an UDP fashion (i.e. with no direct acknowledgment mechanisms). This is allowable because sensors are periodically polled, in which case a failure to receive can be corrected after a certain delay corresponding to the time interval between successive polling of the same node address:
  Configuration variables
  Data variables
  Node network state Less critical sections can be instead synchronized using more conventional methods where the coordinator node sends specific data streams to a node with an acknowledgment scheme, which is less bandwidth efficient, but is sufficient because those sections usually don't need to be updated often.

To do so, a strategy, where all coordinator-bound, user-controlled variables, i.e. those typically modifiable via user HMI, or that need to be resilient to end node failure, such as node network state, is broadcasted to the whole mesh network during the broadcast out phase by the coordinator node. In contrast, all data variables are sent from the specific end node that owns them via a broadcast in phase. Because every packet is of the flooding type, the result is that all variables that need to be synchronized in an efficient manner are available at some point via a packet broadcast flood event, no matter which direction this flood occurs. Thus, a client user interface, if it is configured with the same database infrastructure as found within the main processing unit that controls the coordinator node, as well as the same software decoding facilities, and is linked via a communication bus to an end node that acts as its network bridge, can then reconstruct the database time-sensitive variables by simply "sniffing", or listening without necessary interaction with the coordinator node or their neighbours, thus allowing for unlimited number of listeners that do not impact mesh performance.

In the case that such a client node needs to send control commands back to the coordinator node (for instance, if a user in the field interacts with an HMI bound to it, such as a smartphone), the default method is for it to wait until a specific outbound request from the coordinator node attempts to access its end node data, in which case it can send a request for priority polling. Then, the coordinator node knows that this specific client need to send database modification requests back to the main coordinator location, and polls the client end node periodically, using a higher-level acknowledgement-based protocol in order to ensure delivery of those updates, until it stops receiving those priority polling requests, in which case it reverts to UDP-style regular sensor node polling. Note that details related to this priority polling scheme will be described in more detail in the following sections.

This is why this strategy is referred to as "asymmetric clients" strategy, because the response time is widely asymmetric (near real-time when a client is listening to broadcast packets from other nodes, and at the whim of the current coordinator node polling strategy if it needs to send back data to the mesh network). This strategy can be furthermore improved using what is named as the "redux" broadcast phase, which will be explained in the next sections.

Thus, the simplest embodiment of such a synchronization scheme between asymmetric clients and a node coordinator is a system in which the software and hardware design of the processing units of both clients and main database manager linked to the coordinator node, be nearly of the exact same flavour. Thus, in the preferred embodiment of this invention, a smartphone/tablet platform is chosen for the following reasons:

- Cost-effectiveness with respect to competing platforms with similar processing power;
- Possesses sufficient storage capacity for logging as well as database management, so that it can acts seamlessly as client or main database manager;
- If a generic wireless standard is used to bridge this computing platform to a mesh controller is used, such as with Bluetooth™, then the same communication method can be used for all devices notwithstanding their nature as a client or database manager;
- Same applies with software: as long as the same version of a software is used, which typically includes low-level mesh control facilities for error checking, database management, and can also leverage the smartphone/tablet natural HMI interface, bit-stream depending on node type decoding is insured to be the same notwithstanding their nature as a client or database manager;
- A smartphone/tablet usually possesses localization functionalities (typically GPS), which can be used for out-band registration of node position at deployment time, therefore avoiding the need of dedicated positioning hardware in each node if such a functionality is desired for its intended application, therefore lowering costs;
- A smartphone/tablet usually possesses a natural registration mechanism via camera vision system (that can be leveraged for barcode reading), which can be leveraged at node deployment time in order to facilitate node address and type registration while in the field, assuming that the required identifier be included with each sensor hardware (typically a barcode);
- A smartphone/tablet possesses all required functionality to sync the databases together, via NFC, wi-fi, via the web, etc. So that database variables that are not synced via network flooding can be ensured to be the same from device to device in the most simplest embodiment for database synchronization possible.
- Possible upgrades to asymmetric client "sniffers" can also be: the implementation of a sensor-type answer mechanism for those client end nodes, so that a coordinator node can consider them as regular sensors, with useful data such as "sniffer" positional data, and "sniffer" battery state. This allows an operator at the coordinator site to monitor the activity of end users employing those "sniffers", such as for instance an employer monitoring his/her employee activity within a forest plantation such as a sugar bush, for instance.

Note that any HMI does not need to be necessarily on premise with the main coordinator node mesh controller processor: a device could bridge the hardware so that control is done via the cloud using standard web-server technologies. One possible embodiment leverages generic cloud-based file storage systems in order to enable smartphone/tablet platforms to sync themselves via the cloud, without using application-specific cloud server solutions for this purpose. Again, this leverages the strength of the smartphone/tablet platform, and enables full user mobility, whether it is while roaming within the mesh network, or within access to WAN facilities.

Listed below are example implementations of sensor nodes and their corresponding data/configuration variables in compliance with the strategy mentioned above in order to enable full synchronization of said variables during regular end node polling between a coordinator node and any asymmetric "sniffers". The following examples will be detailed: vacuum sensor, fluid level sensor, and relay multifunction controller.

In order to clarify the context and use case typical of those examples, application of those sensors in the realm of agricultural industries such as sugar making is described as follows: mesh-enabled vacuum and/or temperature sensors are deployed in the maple orchard, and typically monitors the vacuum level at the end of the collector lines (also known as "master lines"). Those sensors can also be monitoring the vacuum and the positive pressure at the tap locations per tree. This allows to find leaks and to target them in order to raise global vacuum tubing network efficiency, and thus crop yields. Wireless mesh-enabled sensor nodes can also be used to monitor tank levels, to check and control equipment such as reverse-osmosis machines, monitor their electrical status, etc.

For such an application, the environment is relatively hostile to regular energy harvesting strategies such as solar panels. Although those strategies can be used, the high energy-efficiency of the mesh network, for the maximum power output per node, allows use of low-cost primary batteries such as industrial-grade alkaline batteries, and this allows seasonal use for many years in a row, even for a large deployment in the range of hundred of nodes.

VM machines can be implemented for the following sensor examples with the following data/configuration variables:

Vacuum Sensor
Data Variables (for N Pressure Ports, Implemented for 1 to 3 Sensor Ports):
Vacuum (16 bit)×N
Temperature (16 bit)
RSSI (8 bit)
Voltage (8 bit)
Configuration Variables:
Low vacuum error threshold (16 bit)×N
Low vacuum warning threshold (16 bit)×N (optional)
Zero calibration (16 bit)×N
Low temperature warning threshold (16 bit)
High temperature warning threshold (16 bit)
Level Sensor
Data Variables RSSI (8 bit)
Type code (4-8 bit)
Raw level measurement (8-12 bit)
Error code (8 bit)
Voltage (8 bit) (optional, for battery operated devices only)
Configuration Variables:
Zero calibration (16 bit)
Level range (16 bit)
Warning high threshold (16 bit)
Priority polling threshold (16 bit)
Warning low threshold (16 bit)
Relay/Current Sensor
Data Variables (for L Switch Inputs, M Control Channels, N Current Sensors)
RSSI (8 bit)
Control channel current state (1 bit)×M
Mechanical switch state (1 bit)×L
Local control force database update detection flag (1 bit)
Local bypass detection flag (1 bit)
Current sensor channel (16 bit)×N
Current change counter (24 bit)×N
Mechanical counter (24 bit)×L
Configuration Variables (for L Switch Inputs, M Control Channels, N Current sensors)
Expected (requested) control channel state flag (1 bit)×M
Reset current counter flag (1 bit)×N
Reset mechanical counter flag (1 bit)×L
Current transition hysteresis high threshold (16 bit)×N
Current transition hysteresis low ratiometric threshold (8 bit)×N
Current error threshold high (8 bit)×N
Current error threshold low (8 bit)×N
Feature enable bits For all three sensors, a common set of network states can be used, the currently selected state for a given node being always sent out via broadcast out from the coordinator node as mentioned before. A typical set of network states can be as follows:

OK;
Dead node (indicates that a given end node has failed to respond to a coordinator node request after a few retries);
Network Glitch (indicates a recoverable network error caused by the communication bus between host computer and the mesh controller of a given coordinator or "sniffer" node);
Network Critical (indicates a critical error);
Seek Mode (indicates that a "sniffer" is currently seeking synchronization of a network and is thus not connected to said operating network yet);
Connected But Silent (indicates that a coordinator is currently synchronizing sleep of a network of nodes, but no request for data transaction between said coordinator and end nodes is being broadcasted out);
Network Contention (used to indicate when an overloaded network results in data older than a certain critical time threshold);
Buffer Overflow (used for gateway or "sniffer" with buffer overflow issues).

Note that the relay controller example above needs a data variable called "local control force database update detection flag" in order to ensure that any change in the local state of the end node, such as a change in the "Control channel current state" variable due to local user interaction is not overridden when the corresponding end node receives the current configuration variable "Expected (requested) control channel state flag", which is broadcasted out by the coordinator node every time the end node is polled and its data variables requested. To do so, the method is as follows:

The default state is this: anytime the "Expected Control Channel State Flag" is received by the end node, it transfers this variable to "Control Channel Current State" and activates its digital outputs accordingly;
If local modification of those digital outputs (typically via control switches) is detected, then the node goes in "lock" mode: any configuration variable subsequently sent by the coordinator node is ignored by the end node by default, and the "Local Control Force Database Update Detection Flag" data variable is set and sent back to the coordinator in order to notify the host device controlling that coordinator and holding the main node database that it must update its own configuration variables within its database in order to reflect the changes that was made locally to the end node;
When the host connected to the coordinator node detects this condition, it updates its configuration variable in its database accordingly;
The next time the coordinator polls that end node, the "Control channel current state" data variable as stored internally in that end node will match the "Expected (requested) control channel state flag" variable it receives from the coordinator node. It then knows that the database at the coordinator site has correctly updated itself, and thus releases its "lock" and goes back to normal mode.

The locking mechanism described above can be used in a similar fashion for any end node that is controlled by configuration variables and whose state can change locally by some mechanism, such as user interaction.

Figure 18:
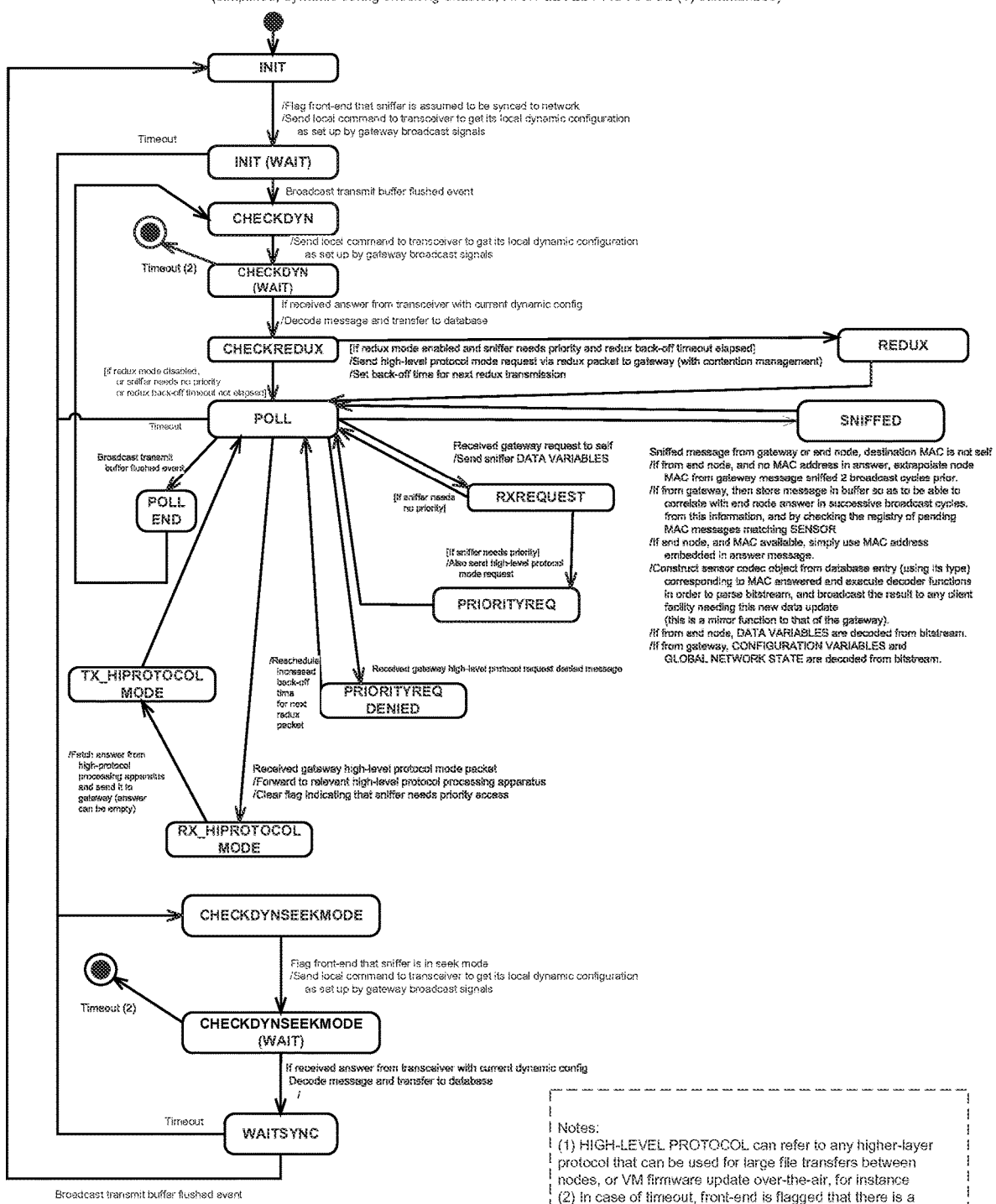
FIG. 18 is a flowchart of a state machine used on the host device connected to an asymmetric "sniffer" node, according to an embodiment.
Figure 21A:
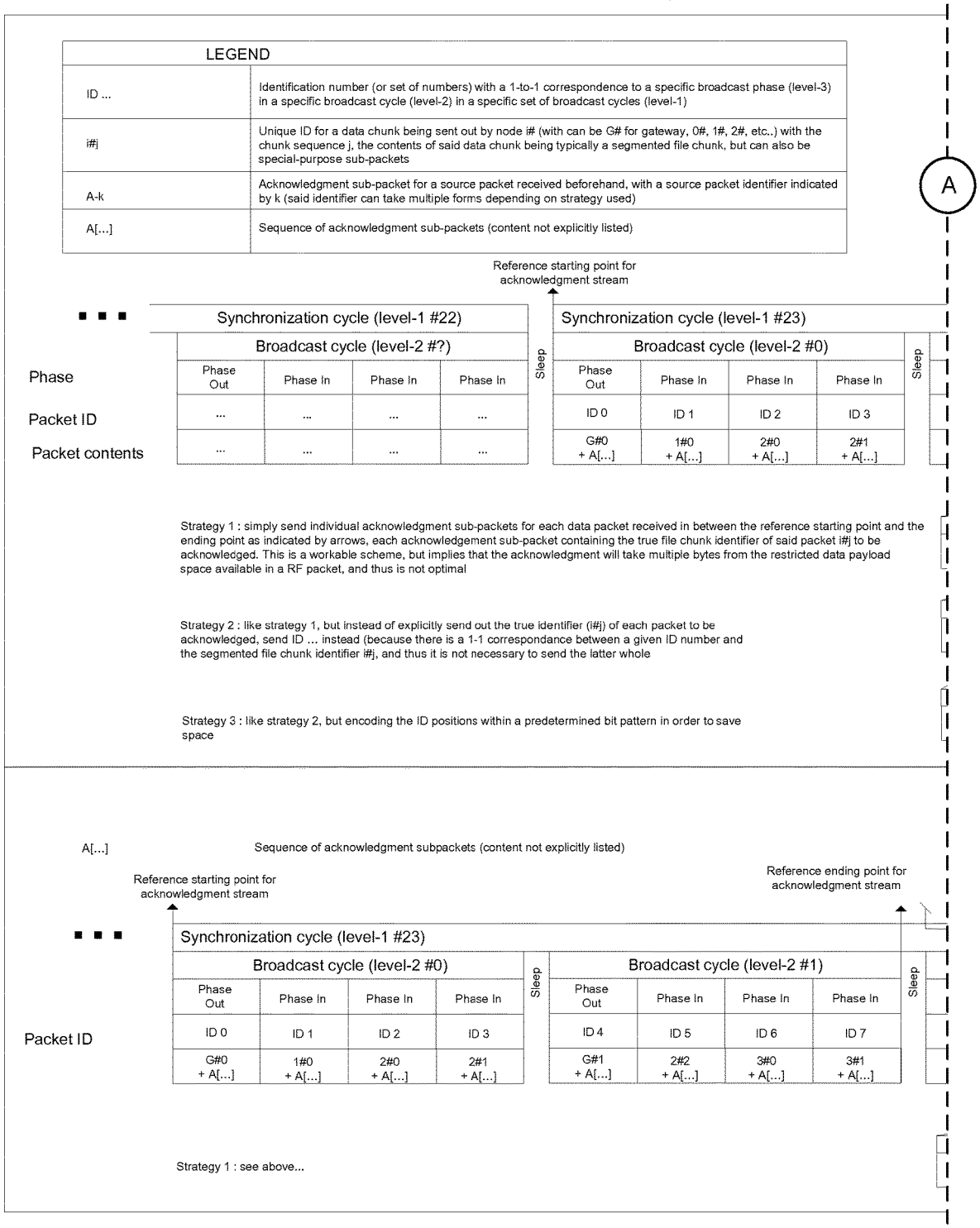
FIG. 21A, 21B show a diagram showing a general principle of acknowledging multiple packets via a single coordinator or end node transmission, according to an embodiment.
Figure 21B:
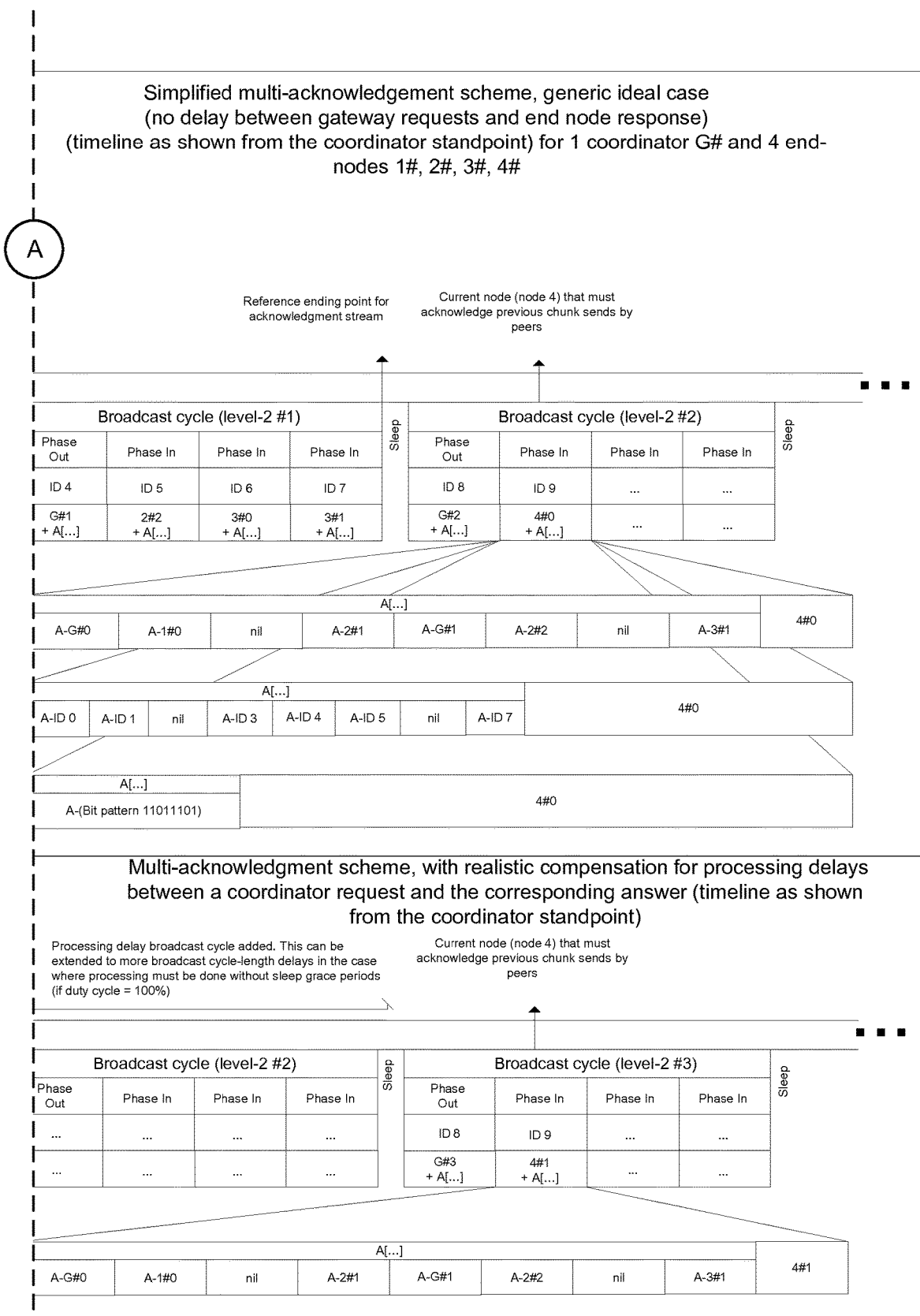
Figure 22A:
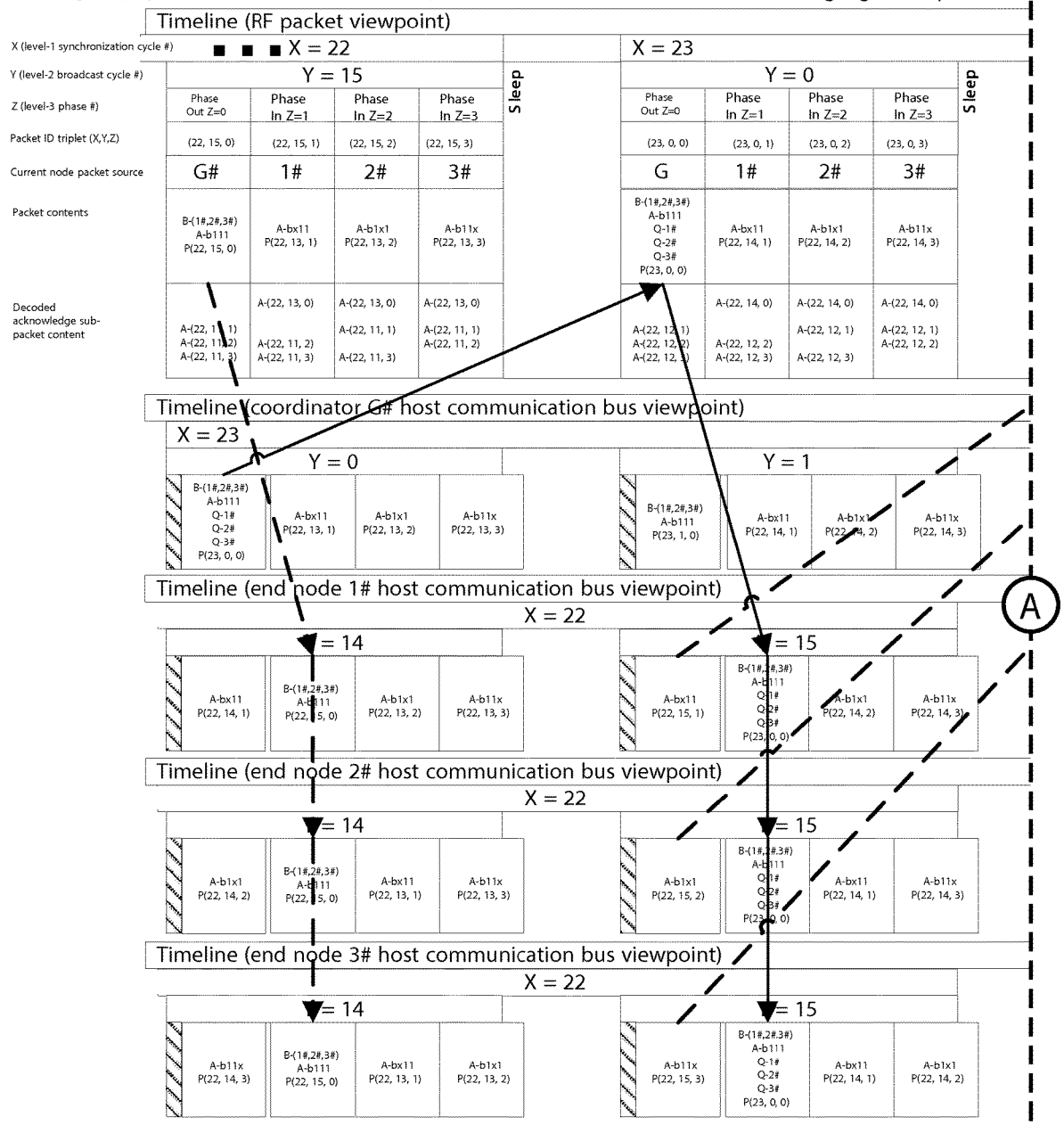
FIG. 22A, 22B, 22C show a diagram showing a specific case of the multiple acknowledgment strategy which accounts for host-to-main controller communication bus delays, and how it can be used to implement point-to-multipoint handshaking and data transfers for higher-level protocol data chunks segmented from arbitrary data "file" simultaneously between multiple nodes, according to an embodiment.
Figure 22B:
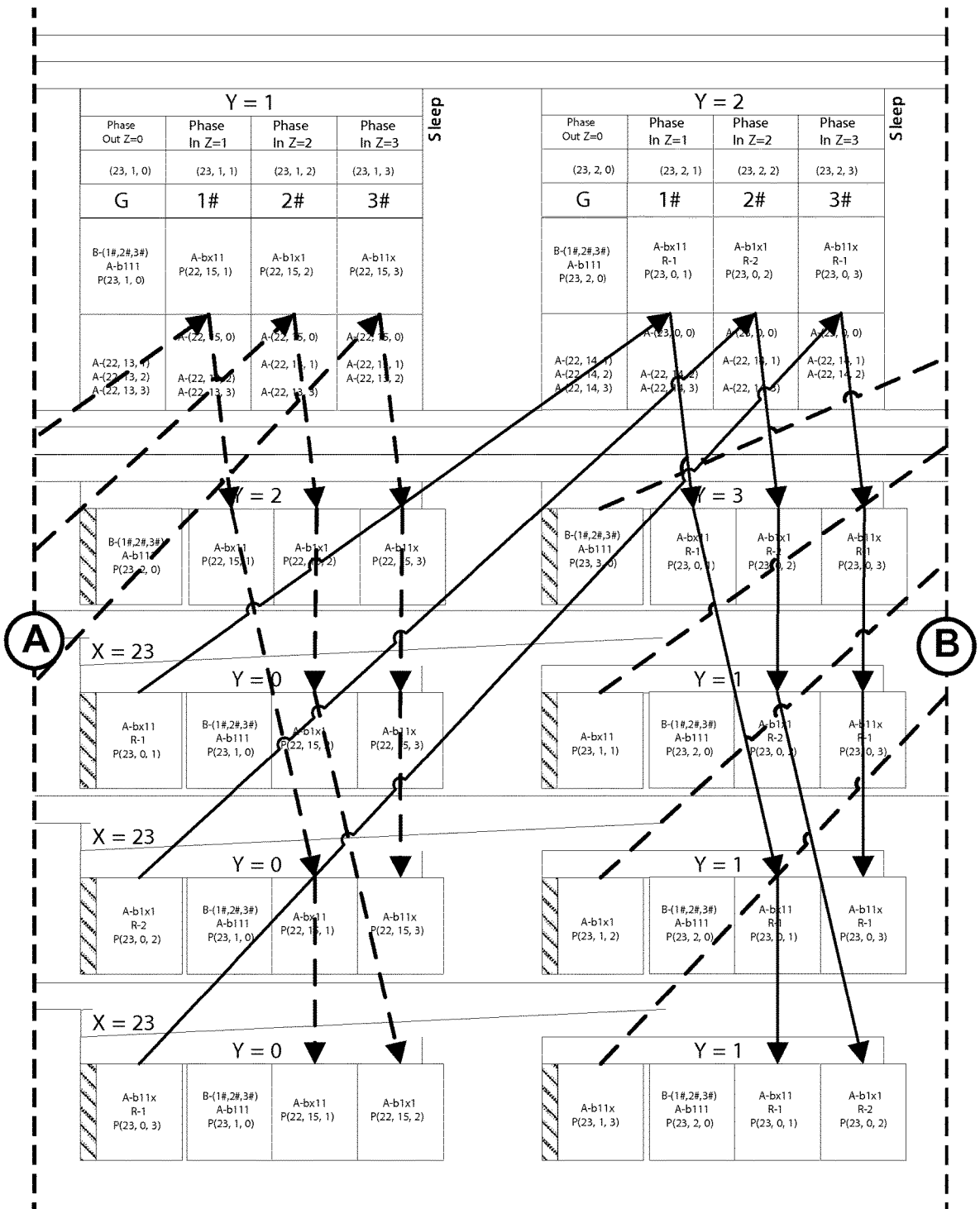
Figure 22C:
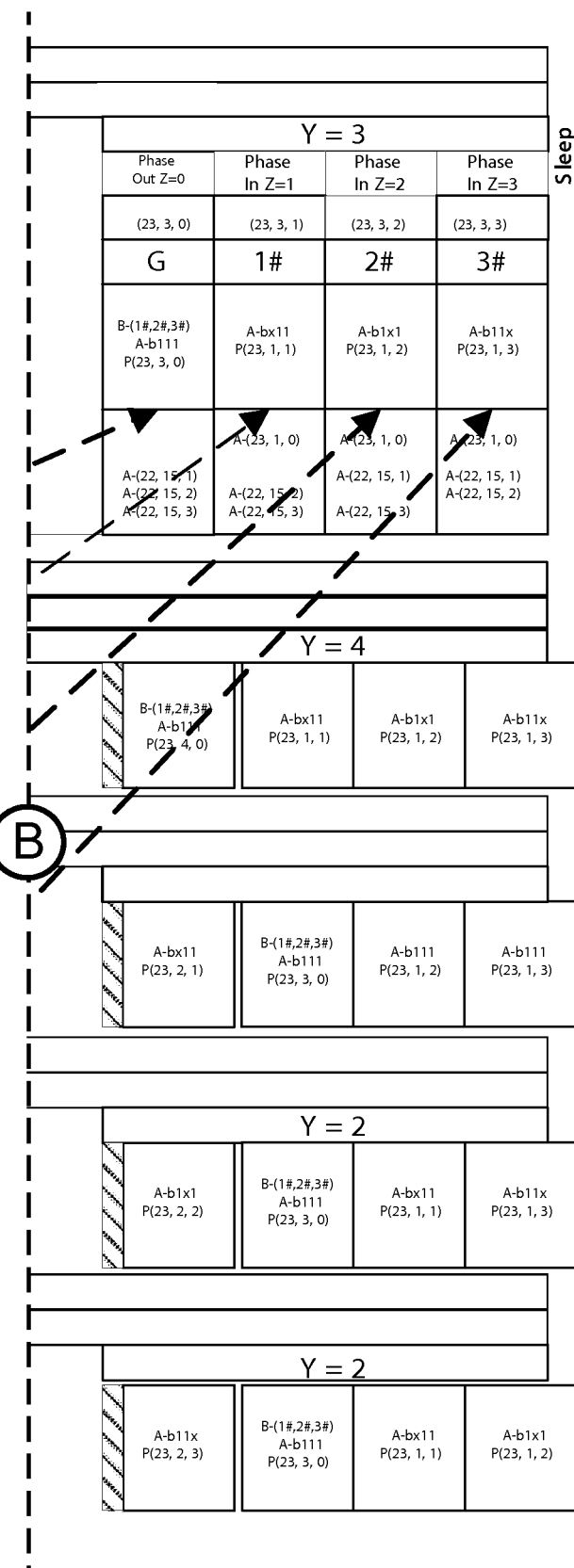

FIG. 16 shows the packet subdivision for the data/configuration variable paradigm as described above. Reference is made to FIG. 17 and FIG. 18 for the state machine details related to the implementation of such a strategy. FIG. 19 shows the high-level details of such a strategy deployed on said Android™ platform.

4) HMI Retroaction to Mesh Poll Scheduling by Coordinator Node

In contrast with regular sleep-enabled low-power contention-enabled mesh network architectures which usually attempts to poll multiple sensors in a dedicated time interval after a long period of sleep (for high density of sensors), using a bit-synchronized cooperative architecture allows individual periodic polling of sensors registered in a given database at much closer interval for the same equivalent power consumption. Moreover, said intervals are guaranteed to be of an exact length defined by the bit-synchronized network global configuration parameters such as the maximum hop count, the number of broadcast phases, etc. Therefore, it is possible to emulate near real-time like responsivity of a sensor if needed, by prioritizing its polling time with respect to certain triggers. A possible implementation is as follows:

Maintain a priority column in the sensor node database, with allows database sorting according to the priority queue number.
The polling order is determined by the order in which entries results are listed after a query where the primary sort key is the priority queue number.
When a node is being polled actively, its corresponding priority queue number is reset to the default value.
Then, the following triggers are set up so that they increment the priority level queue number by a certain magnitude according to the severity ordering of said trigger (depending on specific application requirements):

Sensor last known data age above a certain threshold that depends on sensor sensitivity to polling speed. For instance, in a specific application where a level sensor monitors a water column that can spill within minutes, this threshold can be set lower in order to ensure that the sensor data be refreshed in a closer fashion than lower-priority sensors such as weather station sensors, for instance.

User HMI interaction with a specific sensor. For instance, if a smartphone interface is used, the main database management processing unit can detect whether the user has pressed a button in order to see detailed data for a specific sensor, and/or for controlling said sensor or changing its configuration parameters. In this case, the priority queue number is again incremented typically by a higher value than for the trigger above, which results in the network effectively priority polling that sensor in particular. This allows user to interact with that particular sensor as if it was in near-real-time conditions (the responsivity lag being at most 2*X, where X is the time interval between 2 successive broadcast cycles.

Moreover, multiple duty cycle network settings can be held by the processor in charge of database management, so that it can switch to higher duty cycle according to specific sensor warning or error conditions, and according to their severity ranking, as well as switch to higher duty cycle if it detect sensor-specific HMI interaction as above. This operates in synergy with the database priority ranking scheme as explained earlier in order to ensure that X be at the lowest allowable setting during sensor-specific user interaction.

An example is as follows: consider a database management unit that holds 2 duty cycles, one labelled "slow", and the other labelled "fast". The default duty cycle setting is "slow". Say a level sensor monitors a water column and detect that water level is at 75% of full capacity, and sends a warning signal. Then, the duty cycle can be switched to "fast" and will only scale down to "slow" when this signal disappear (to avoid noise-triggering, standard hysteresis methods in the configuration parameters can be used).

5) Multi-Phase Broadcast Modes, Hot-Configurability, and Polling Speed Optimizations Reference is made to FIGS. 4, 5A-5D, 6A-6D and 7A-7D.

For a bit-synchronized network, the bare minimum requirement to synchronize the node local clocks to the coordinator node reference clock is for said coordinator to send a minimum of one packet broadcast out per broadcast cycle (one can call this a "beacon'), which minimally could contain no information other than what is required for the end nodes for time-bounding the packet flooding throughout the network (i.e. at least a sequence number). In such a case, no information can flow back from an end-node to the coordinator node, and thus is of limited utility for sensor polling However, it is a possible mode of operation that, if there is a method to activate or deactivate it, can allow for the system to stay in "beacon standby", in order to maintain node sync with the network while reducing global power consumption by a factor of 2 when node polling is not needed by user.

In order for this to become useful, a supplementary bit sequence must be included within each "config" frame of each packet broadcasted out and in (both directions are desired so that a node can seek network sync independently of the latter current broadcast phase), encoding the current configuration of the number of broadcast phases desired, among with other dynamic configuration parameters if more configuration malleability is required, including (but not limited to) the number of hops, for instance, and in the case where a FHSS system is used, a mandatory bit sequence encoding the current frequency hop status of the network, the simplest way being to encode the current hop table index of the network within each packet. This allows the whole mesh network to be hot-configurable as soon as a coordinator node packet is broadcasted out and received by all recipients in the network. The packet structure and its configuration frame is shown in FIG. 4 (along with the features that will be explained below).

This principle can be further extended so that the "config" sub-frame of any packet encodes the number of phases out, as well as the number of phases in, therefore allowing asymmetric bandwidth capacity according to flood direction. Implemented naively as conventional contention-enabled multi-hop networks might be, this runs the risk, if the number of phases per broadcast is sufficiently high, of bit-synchronization failure due to the local master clock tolerances which varies from node to node. This is the reason why prior art implementations of bit-synchronized networks do not attempt more than transmission of small packet sizes within a maximum of 2 broadcast phases (one for each direction). However this bit-synchronization potential loss of accuracy as the number of phases grows can be alleviated in the following way within each end node.

Because the main time base onto which the whole network latches to is that of the coordinator node, there is an opportunity for using each broadcast phase originating from said coordinator node in order to readjust the local clock of each end-node, but not if the broadcast phase originates from an end-node (because in such case, path delays and accumulated clock drifts.

In the case where the accumulated expected drift within a broadcast cycle due to successive broadcast in phases (which do not allow for clock sync reassessment), a maximum bound for the number of such successive broadcast in phases NI is set according to the expected worst case effective relative clock frequency drift C (defined as absolute frequency drift/frequency), the RF bit-rate B and the time per broadcast phase TP: $2*B*TP*(NI+1)<1/C$.

In the case where higher number of broadcast in phases per broadcast cycle is needed, then there must be a broadcast cycle out interwoven between broadcast cycle in, at a maximum phase spacing corresponding to NI.

For a specific embodiment, if there are more than 1 broadcast out phase used, then for any given measurement index i, the time $T_{IBO}[i]$ between successive broadcast out sync events can be measured, then a correction factor $F[i]$ for the end node clock with respect to its coordinator clock can be approximated as follows: $F[i]=Ipf(T_{IBO}[i]/(N_1[i]+1))$ value at the time of measurement, where Ipf is an implementation-specific low-pass filtering function. Measurements can be free-running between broadcast cycles, with the Ipf time constant chosen accordingly, in order to get a noise-reduced assessment of the clock correction factor needed locally for each end node. The standard deviation SF of this correction factor can be either be qualified offline, or measured in line simultaneously with its actual value, and (assuming the correction factor is applied continuously to the node local clock) its inverse $1/S_F$ value can be used to replace the 1/C factor mentioned above, which would allow an increase in $N_1$ before bit-synchronization actually fails.

In the preferred embodiment of the invention, which uses a FHSS transceiver, the following parameters can be included in the "config" frame in order to enable hot-configurability (as either a table index for saving bit space, or directly as an integer):
network ID
sequence number
max sequence number (hop count)
frequency hop index
broadcast in count
broadcast out count
"redux" phase enable/disable
"redux" phase slot count Note that the last 2 items will be explained further below. The high-speed master clock error alleviation strategy is shown on FIG. 4, at the "regular broadcast level", and all those features are listed in said FIG. 4.

Each broadcast phase out 442, 448 is dedicated to a coordinator node transmission, and each broadcast phase in 444, 446, 450, 452 can be used in a TDMA fashion, where a single end-node sends back a packet for its assigned broadcast phase. A standard way of operating in this manner would be to interweave successive broadcast out and broadcast in phases together in order to keep a regular half-duplex architecture, in which one end-node request from the coordinator is sent along with ancillary information (using remaining data bits within the data frame of the packet), and a requested end-node scheduled for reply sends back data in a half-duplex manner.

It is also possible to use a standard SIMO, MISO or MIMO strategy, where a single broadcast out packet from the coordinator contains multiple requests to multiple end node addresses (packet data frame segmentation into independent data a sub-frames, in other terms). However, because bit-synchronized networks involves small maximum packet size in order to minimize possible interference due to bit-synchronization jitter between network nodes, this is often not possible unless the number of data bits used per request is small enough.

For instance, for a MISO setting of 1 broadcast out for 4 broadcast in phases, each broadcast in being assigned to a specific node, with a maximum of 20 data bytes in a data frame, and with node addressing taking 4 bytes (a 32.bit MAC address), then there will only be a maximum of 1 byte available sent to a specific end-node, which is often not enough if more than basic requesting is used (as is usually the case for sensor nodes that must also control devices, for instance. Moreover, supplementary information destined not for one particular node, but system-wide (used for upgraded "sniffers") also requires data frame space.

To solve this data frame space problem, a possible embodiment (assuming to be of the MISO type for explanatory purposes) might use the following strategy, in the case where a coordinator node request packet also contains configuration data to destination end nodes (for instance, error thresholds, output states, etc.).

In preparation for a coordinator node request packet broadcast out phase, assuming that NI broadcast in phases are used, the coordinator scrolls its node configuration database, with typically consists of node addresses, node sensor type, and individual node sensor configuration parameters. The coordinator fetches the first NI number of nodes whose node sensor type and configuration parameters match exactly. This ensures that exactly the same configuration data bit stream be generated for all those nodes. In the case where insufficient nodes results from this query, the coordinator can simply leave unused scheduled broadcast in phases empty (by assigning an invalid address node to that phase).

The coordinator node fetches any system-wide data (usually for broadcasting network state to all nodes) that also must be sent, and encodes it in the proper bit-stream format.

The coordinator node encodes the request node addresses, and binds them to specific byte positions within the data frame of the request packet, the exact position of the address bit stream determining which broadcast in reply phase is to be used (this is akin to a TDMA strategy) by the end node possessing that address.

The coordinator node then concatenates the address bit-stream with the common node configuration bit-stream, and then calculates the remaining number of bits available in the data frame.

In a possible embodiment, where the system-wide data bit-stream has variable length, it must also append a length integer to said bit stream, as well as a sequence identifier, so that such data can be segmented and sent via multiple packet transmissions, within the free remaining bits of the data frame of each packet sent (only if the data stream is too wide for the data frame size of a single packet).

In an alternate embodiment, the delimitation of the system-wide data bit-stream can be done using a specific set of reserved bit markers, and the rest of the bit-stream data be encoded in such a way as to not overlap with those reserved bit markers (an example of this would be using BASE64 encoding, with an end-of-line marker, for instance).

Using the aforementioned strategy, in the case where the variability between node sensor types within a deployed mesh network is low enough (which is usually the case for the vast majority of mesh network applications), this allows for a maximum speed-up in sensor polling of a factor equal to NI, with respect to a conventional polling scheme, and allows simultaneous system-wide data transmission from the coordinator node in conjunction with specific end node requests within the same transmitted data frame. See FIG. 7A to 7D for supplementary information concerning this strategy 700 (note that it assumes that the half-duplex issue is solved, using what is also shown on FIG. 6A to 6D for the simple case where multi-phase mode is not used).

Another issue is that between a request from a coordinator node via a broadcast out phase to a specific end node address, and said end node answer in a broadcast in phase, one has to plan for a non-zero time delay interval between both because in practice all the following events take non-zero time to complete:
packet reception event in an end-node (this can occur anywhere during a coordinator node broadcast out phase, worst-case will occur at the end of said phase);
packet information transmission to processing engine (be it an external processor, a communication bus such as UART, or a VM engine);
processing engine request to sensor hardware delay (due to chosen communication bus, say a I2C bus, or simple digital I/O control pins or analog DAC/ADC interfaces;
hardware measurement and control delay (for a typical digital sensor, this is related to ADC frequency response and additional processing within the sensor itself);
data send back from sensor hardware to processing engine;
processing engine processing and send back to mesh controller for answer packet construction delay.

With reference to FIG. 5A to 5D, the usual solution 500 for a bit-synchronized network is usually to simply discard the possibility for multi-phase broadcast cycles and restrict to the standard 1 out 510/1 in phase 512 (SISO), so that any variable and unpredictable delay caused from any item listed above, do not cause bit-synchronization failures due to contention caused by an end-node that attempts to flood the network at inappropriate times (i.e. when another is legitimately attempt to flood the RF network). This is usually combined with an approach where a gateway continues to send clock synchronization beacons, but without a data frame payload, while waiting for official receipt of an end node answer, before attempting to send another request to another node, or after a timeout delay. However, using such an approach, the maximum potential polling speed for a given chosen duty cycle is literally halved.

To solve this data frame space problem as well as the reaction delay problem, a polling strategy is via a delayed MISO strategy, meaning that the coordinator node does not receive an expected end node answer in the same broadcast cycle as that in which the corresponding request has been sent. One might naively assume that this delay corresponds to one sleep interval between broadcast cycles, as seen from the coordinator node standpoint. However, in practice, the delay due to communication between the host processor that manages the sensor database (such as a computer) and the actual mesh controller used as coordinator node also has to be taken into account, in order to make sure that it does not cause similar contention issues as for end nodes. Thus, the minimal interval between a request, and the corresponding expected answer, as seen from the coordinator node standpoint, is 2 sleep intervals between broadcast cycles, and this interval can be increased if needed, depending on the speed of the host processor in charge of database management.

The strategy 600 can be listed step-by-step as follows, with reference to FIG. 6A to 6D.

Every time a broadcast cycle ends, send a marker indicating such event through the communication bus between the controller and the processor in charge of database management (if both are the same processor, then this marker is a software marker) to the latter. As an example, the preferred embodiment uses a default UART with CTS interface using a higher-level command and reply encapsulation of variable type (it can be a bit-stream frame with a start-of-stream marker, length bits, possibly error correction codes, but also ASCII frames, or possibly BASE64 coding, for instance). In such a case, a dedicated bit-stream marker is used to denote the end of broadcast cycle event, and the host processor linked to the controller via UART is thus notified within milliseconds of such an event.

The host database manager processor constructs the request data frame that is to be sent to the coordinator node mesh controller. Note that this also causes additional time delays that can be caused by typical computer OS multi-task scheduling, for instance, as well as the query and frame encoding time.

The delays above are accounted for and nullified using the following strategy: when the mesh controller receives the host database encoded data frame, it stores this, and waits for the next broadcast cycle begin event, thus removing the timing uncertainty.

During that event, the stored data frame is encapsulated in a coordinator packet, in the manner described in the aforementioned sections, and sent out. Thus when the broadcast cycle end event occurs, it is guaranteed that the request packet has been broadcasted throughout the whole network. At this time, assuming packet reception is successful, the end node receives the packet and decodes its data frame. It then sends out this data to the processor in charge of controlling and fetching data from the actual sensor circuitry (be it an external processor, or a VM engine, as used by the preferred embodiment), the latter accomplishes its task, and the resulting answers are sent back to the mesh controller, all accumulated delays incurred by this process being accounted for and nullified by ensuring that it runs within the sleep delay between broadcast cycles (in the case where a multi-core processor or external processor is used as the glue logic interface, then it is possible to spread the sensor processing delays over more than 1 sleep interval between successive broadcast cycles, but in the case of a single-core callback-based VM engine, this is often not possible, unless the user is in charge of manually and tediously managing this delay process).

At the next broadcast cycle event trigger, the end node broadcasts its answer packet back to the coordinator node. Assuming that packet reception by coordinator node is successful, the data is then transmitted upstream back to the processor in charge of database management for updating (this is not time critical because it is a receive only operation that occurs while the broadcast end marker strategy runs in parallel in order to construct successive requests.

Assuming that all parties involved in a successful polling action (host processor that maintains database, mesh controller used at node coordinator, and end nodes, including all communication buses), as enforced using the above methodology, the sensor polling rate is no more halved with respect to a given duty cycle setting. Thus, effective throughput is increased by a factor of 2.

As for error handling (such as when an end node fails to answer), due to tight restrictions on the timing of the bit-synchronized mesh protocol, its onus thereby lies on the higher-level protocol according to the OSI model. In other terms, the processor in charge of database management (the application-specific host processor) is expected to retry querying a sensor flagged as unresponsive using the same methodology as listed above for a number of times, and then register a sensor node error after the number of retries have unsuccessfully been carried out. In other terms, the strategy is optimal in the case where packet delivery does not have to be assured, and is akin to a UDP communication scheme.

6) "Redux" Phase(s)

Figure 9:
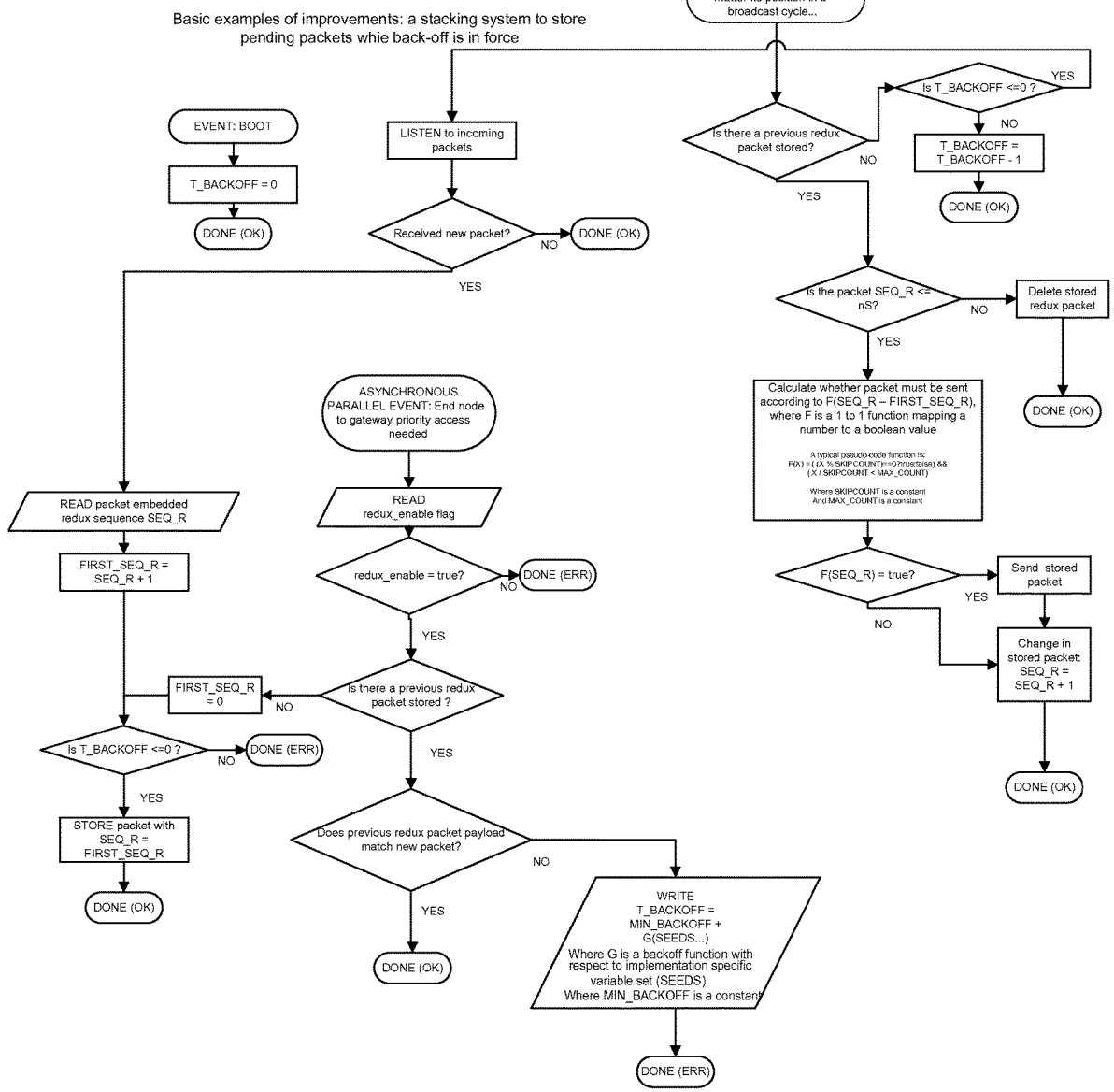
FIG. 9 is a flowchart of an exemplary collision management scheme, according to an embodiment.
Figure 9A:
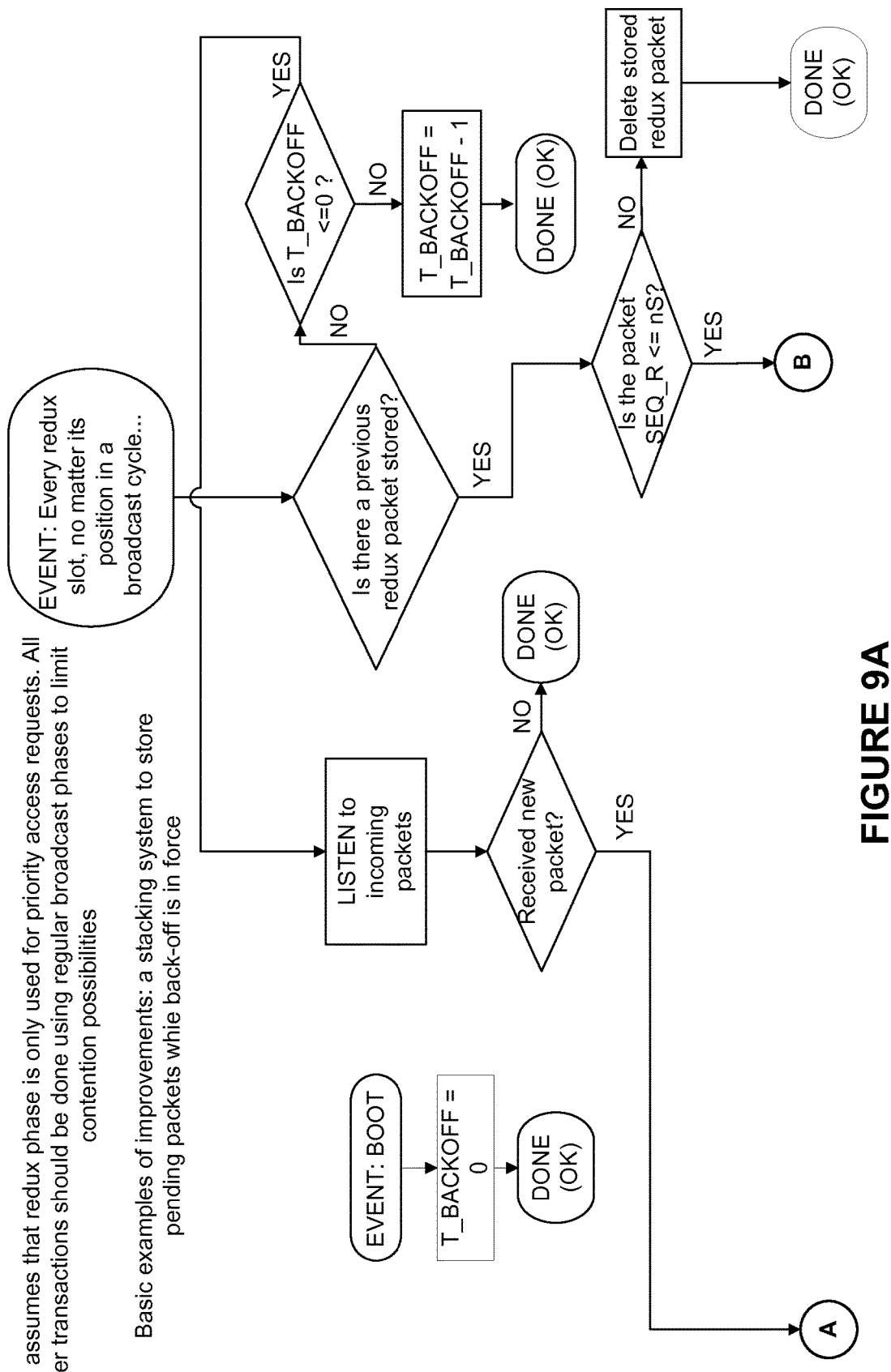
FIG. 9A, 9B are enlarged views of portions of FIG. 9.
Figure 9B:
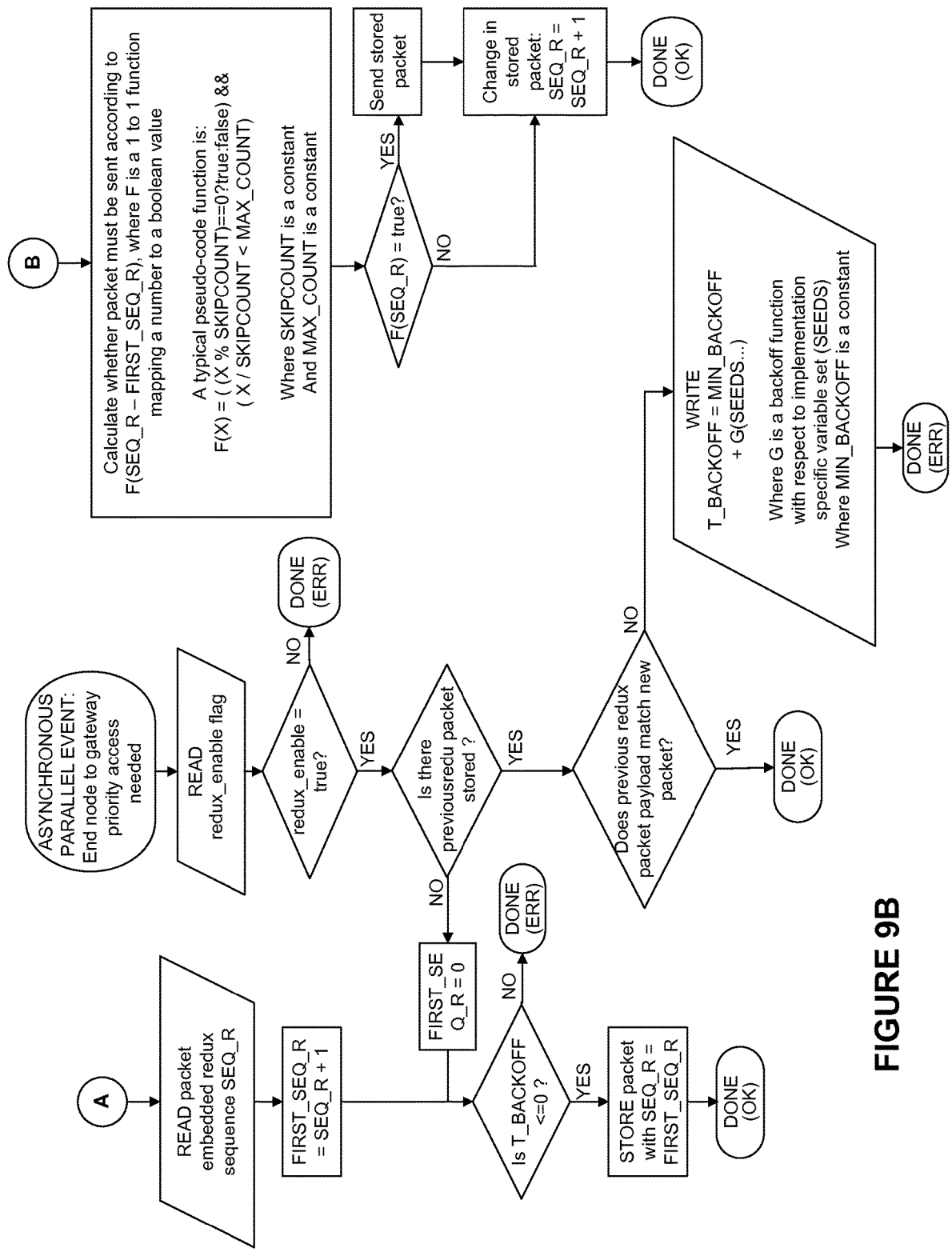
Figure 10B:
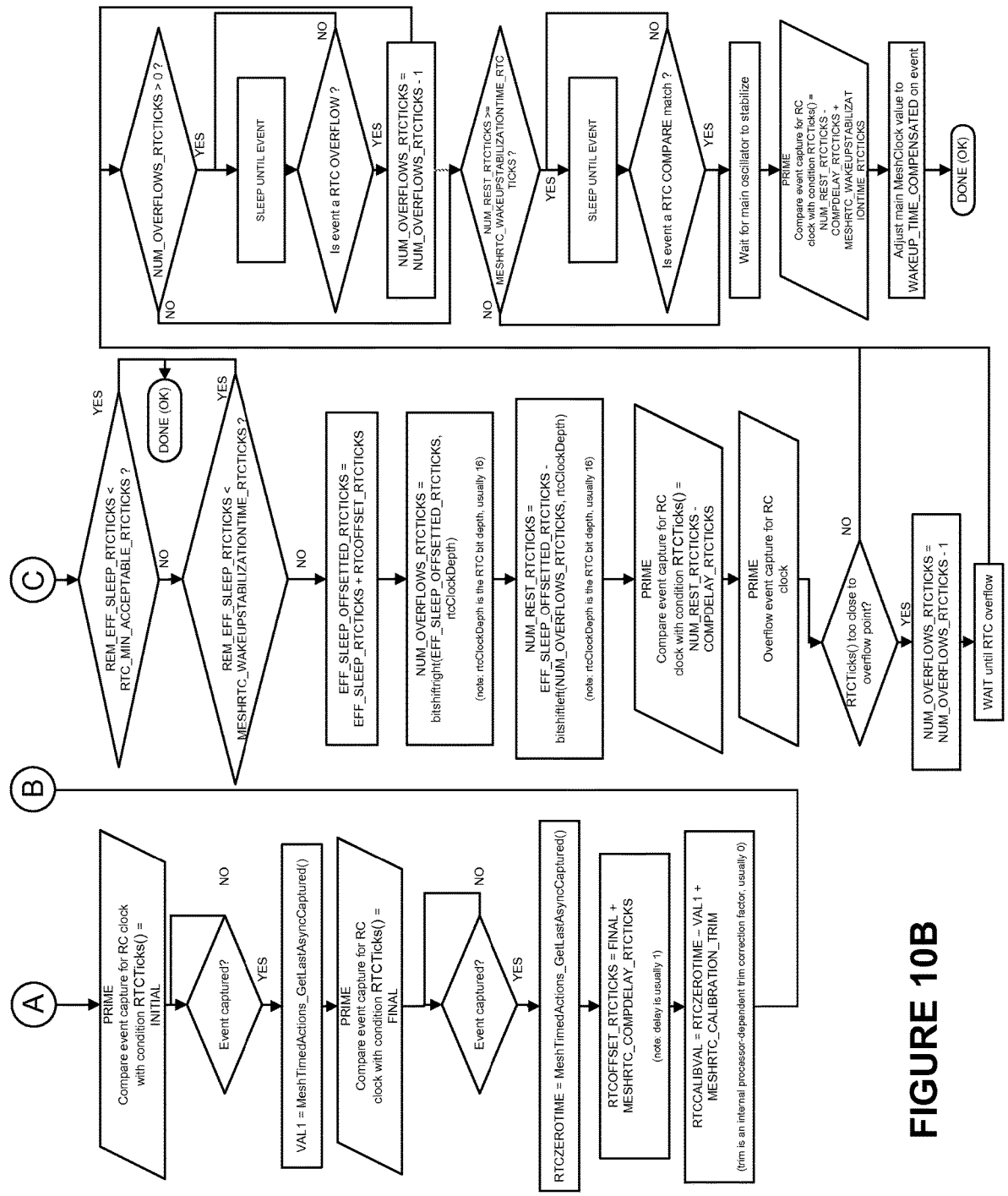
Figure 11A:
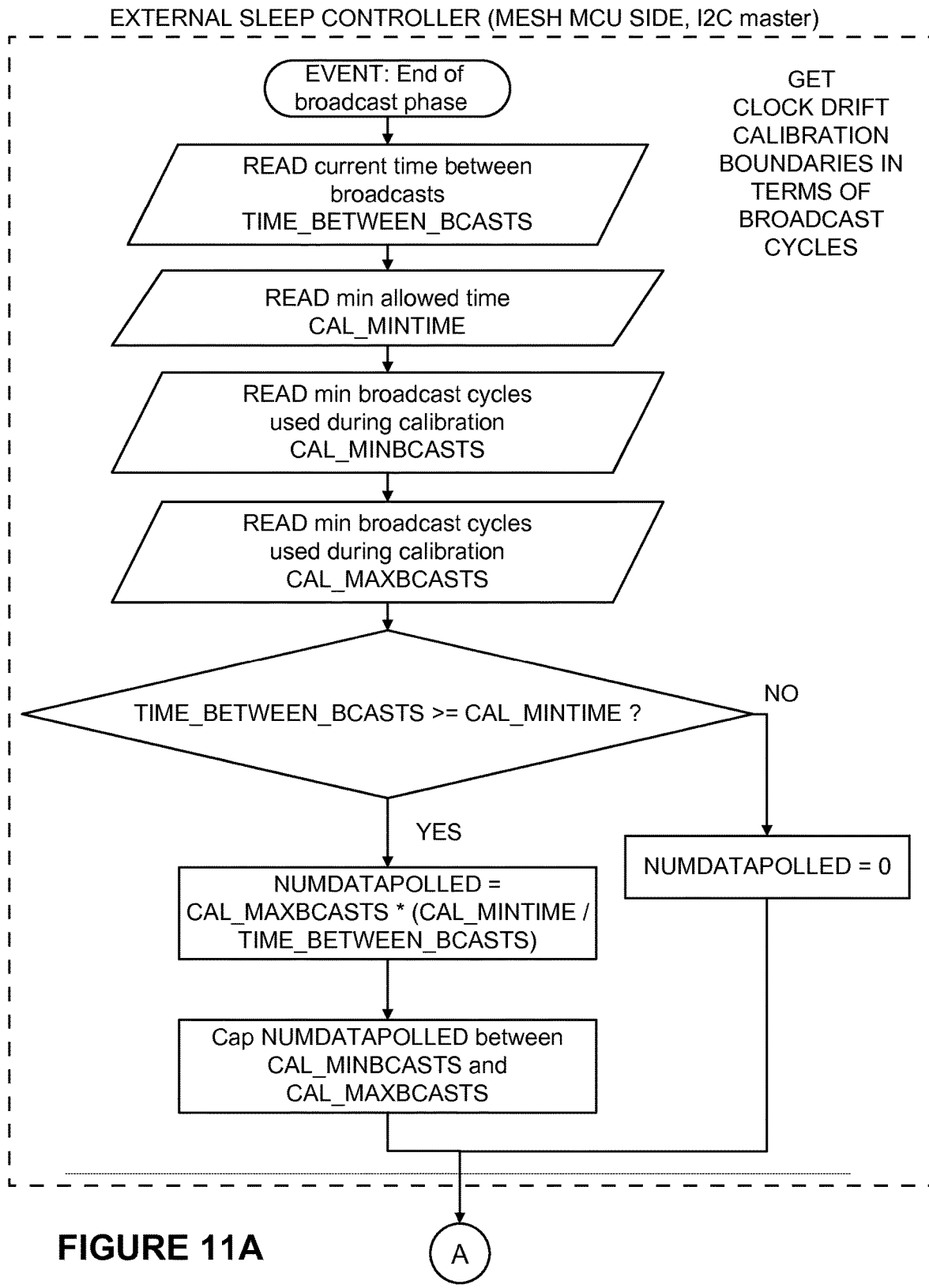
FIG. 11A, 11B, 11C, 11D show a flowchart detailing the main controller (I2C master) side that is connected via I2C bus to an external sleep controller for managing sleep mode, according to an embodiment.
Figure 11B:
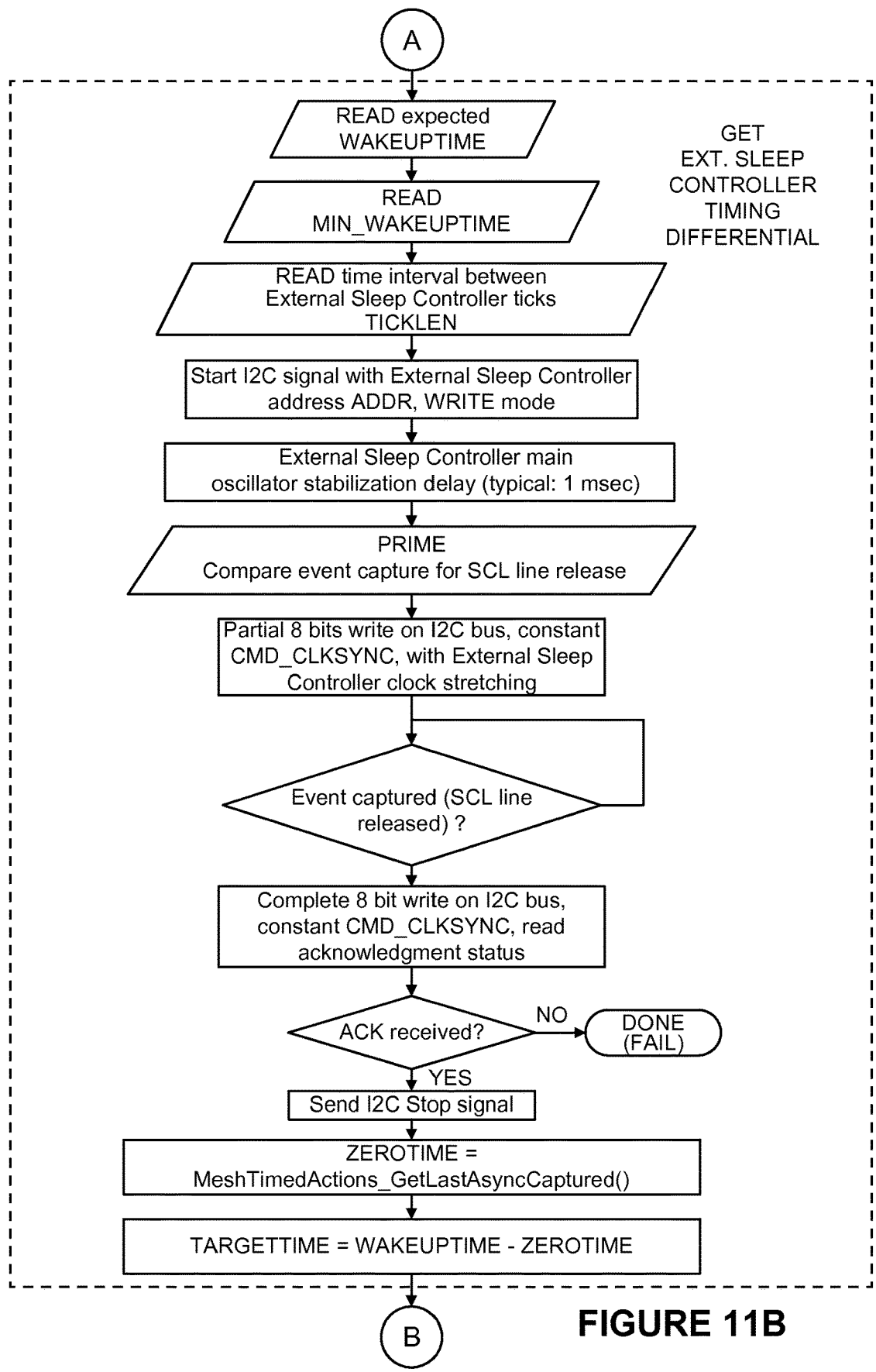
Figure 11C:
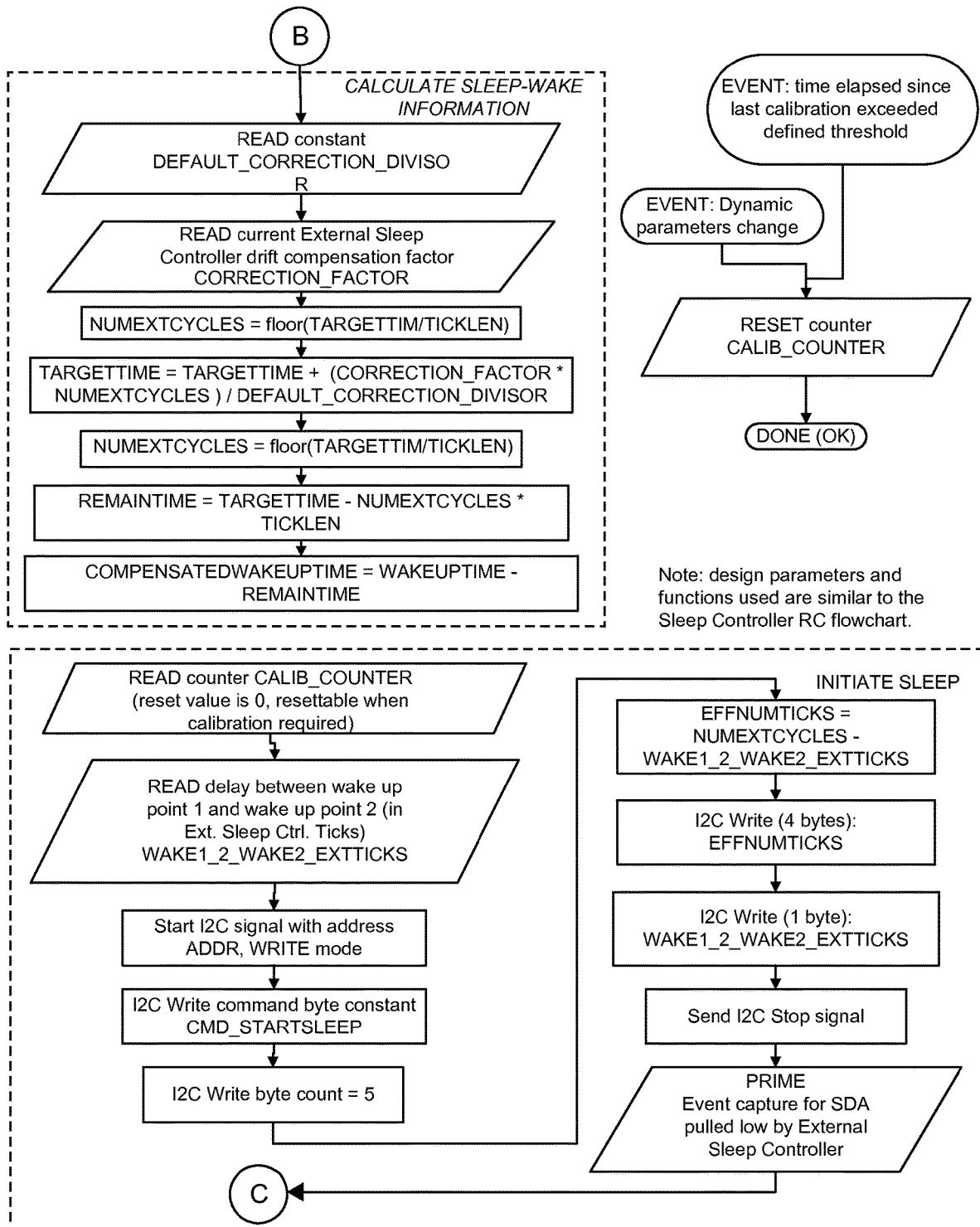
Figure 11D:
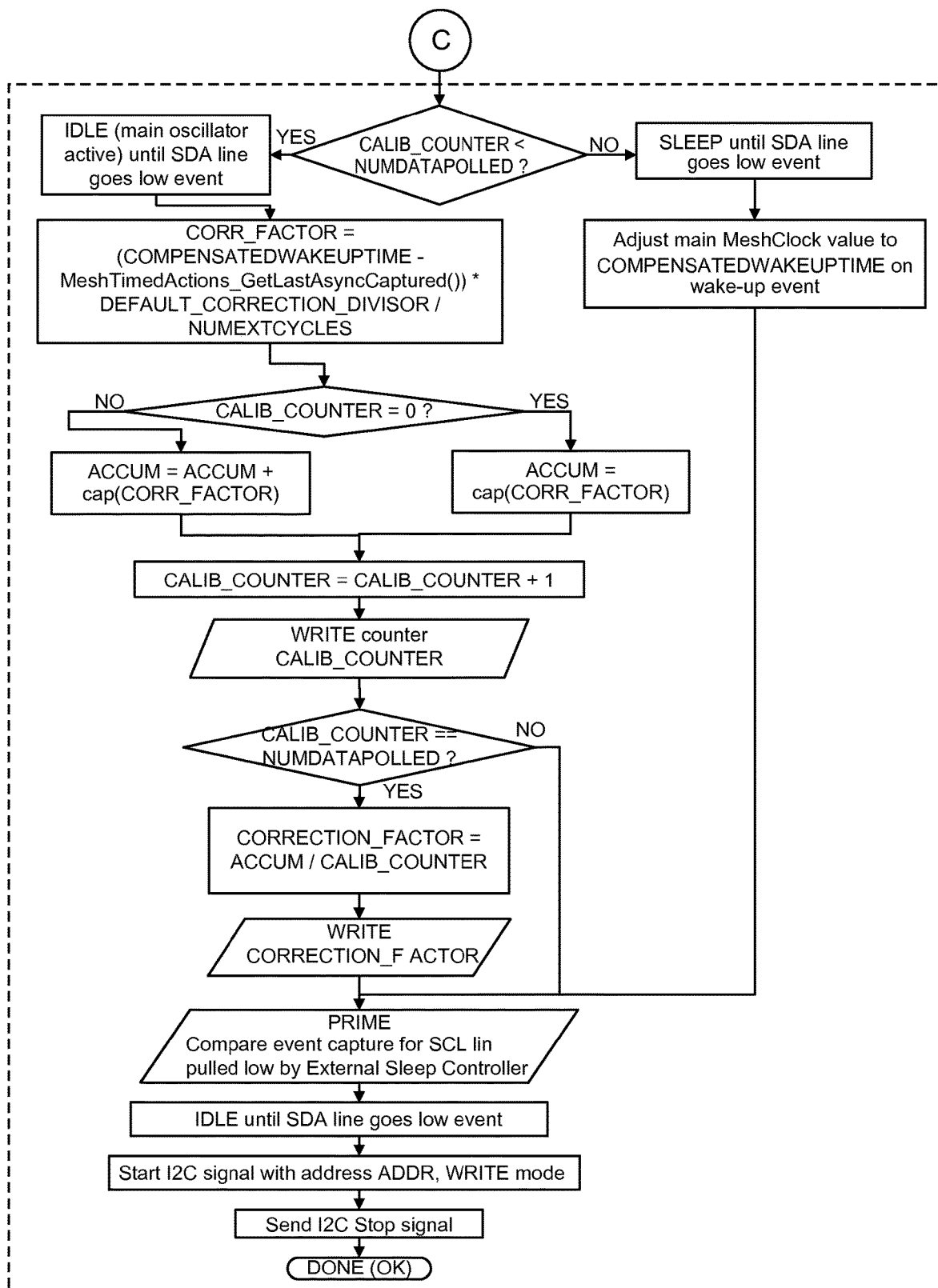

Reference is made to FIGS. 8A to 8D and 9, with further reference to FIG. 4. The "redux" strategy is summarized in FIG. 8A to 8D, and an example of a possible collision management scheme is shown in FIG. 9.

In contrast with the asymmetric client communication scheme as described earlier, the "redux" broadcast phase strategy 800 addresses the inherent limitations of having clients only being able to request for priority polling by the coordinator node after the latter has polled them at least once. To do so, a number of dedicated broadcast phases are set up. Usually 1 single supplementary broadcast in phase, due to the aforementioned reasons, and the following description will assume this for conciseness purposes, although what applies to that single phase can easily be generalized to multi-phase schemes.

Unlike a regular broadcast phase in a broadcast cycle, which are subdivided by the number of slots corresponding to the maximum number of repeating cycles $N_H$ (a.k.a hops) that the network allows in order to time bound packet flooding to strict times, the main innovation behind redux phase 434, 438 (see FIG. 4), to its core, lies in a simple idea: allow for a setting where the number of redux slots $N_{HR}$ is: $N_{HR} < N_H$ during the redux phase, and ensure completion of a flood within this phase within the currently configured spec $N_H$ by partially flooding within the number of slots in the redux phase, and continue this flooding action during the next, and then the following broadcast cycles, as required, until the total number of redux slots $SUM(N_{HR}[i]) >= N_H$, again this novel flooding mechanism being also bounded using a sequence number (called "redux sequence number") which is again an injective function of the number of times a packet in this phase has been repeated. This is therefore a flooding mechanism distributed between broadcast cycles, over a span of multiple sleep intervals, and is henceforth also referred to as the "slow flooding" mechanism, versus the regular "flash flooding" mechanism.

Note that repeated packet repeating strategies as mentioned for regular broadcast phases can also apply, and a redux phase segmentation, in order to minimize the risk of an end node attempting simultaneous redux phase access while a packet is being flooded within this phase, can be firstly applied via a grace period that any end node having just received a redux packet, is forbidden to send another one of its own, and secondly via a contention-mitigation mechanism similar to those used by contention-enabled networks (known and popular examples of which include CSMA/CA often used in IEEE802.15.4 distributed networks, and exponential back-off, often used in high-level networking protocols) for the same purposes. In the preferred embodiment, the grace period is typically simple enough that it can be implemented directly on a mesh controller processor target, if volatile or non-volatile storage space in order to buffer incoming redux message requests is high enough, or if a mechanism to feedback request denial to a host processor communicating with that mesh controller is implemented. As for contention management back-off mechanisms the preferred embodiment assumes that it is to be implemented by the higher-level protocol using the mesh controller protocol, i.e. by the host (mainly for saving processor time and memory in case of tightly limited embedded targets typically used as mesh controllers), as exemplified in FIG. 9.

Considering a typical application with the use of $N_{HR}=1$, which is the minimum redux phase slot count. In this case, a network can reserve this redux phase as a special priority access request channel, which stays unused and free until an asymmetric client end node (a.k.a. "sniffer") desires to request immediate communication with its coordinator node, in which case any node can rely on this special access phase. This allows faster responsivity in asymmetric clients, with a consumption (or bandwidth) penalty that is exactly known and bound, equal (in an ideal implementation) to $Y_{REG}/T_{REDUX}$, where Y is the time for a regular broadcast cycle, and $T_{REDUX}$ is the supplementary time for the redux phase. In the special case that the slot length $T_{SLOT}$ is similar between all phases, and $T_{SLOT}=T_{REDUX}$, perhaps due to guard times inherent to FHSS or other implementation details being already included in $T_{SLOT}$ (for instance, if there is a 1-on-1 correspondence between a frequency channel FHSS hop and a slot, which is a subset of the general case where multiple slots can be assigned to a specific frequency channel FHSS hop), for $N_I$ broadcast in phases and $N_O$ broadcast out phases, then the idealized power consumption penalty is $N_H*(N_I+N_O)/N_{HR}$, and thus can be potentially an order of magnitude lower than if a regular broadcast phase was assigned to the same task.

Potential applications whose performance within mesh network can be dramatically improved using this strategy include (but are not limited to): control using asymmetric client end nodes, 2-way communication schemes using the mesh (such as text chat, for instance), emergency signal flood-back to coordinator node, etc.

7) Parallel High Speed Network Communication and Control

For applications off the grid that leverages a distributed mesh network in order to send larger data payload that can be fit within a single mesh network packet (those will be considered for the purpose of this discussion as being "files") than typical sensor information, such as for instance sending camera still shots over the mesh, the bandwidths required can be low enough to even be feasible using a cooperative bit-synchronized mesh network in which typical data frame maximum length is severely limited in order to enforce bit-synchronization despite timing jitter limitations. In such a case, a basic strategy can be implemented where those files can be split, with a unique sequence number encoding the file chunk ID, as well as a supplementary transmission order sequence number if packet ordering is critical, are appended to each chunk so that the resulting combination of bits can be fit within a data frame, and then sent over the network, after a file transfer request packet is sent and acknowledged for. On the receiving end of the transmission, acknowledgment signals can be encoded with the corresponding file chunk ID and transmission order sequence number so that the transmitter knows which chunk has to be sent again. Note that multiple acknowledgements signals can be sent within the same data frame in the case where multi-phase communication is used, in which $N_I<>N_O$. Note that in a regular communication scheme, the acknowledgment packet is sent back to the sender before the latter attempts further communication, and timeouts are used to determine acknowledgment failure.

However, due to the time deterministic nature of a bit-synchronized cooperative mesh network, such a strategy becomes quite inefficient. Instead, one can leverage the deterministic nature of such a network, and assume that any acknowledgement signal can be encoded by the very presence of an answer packet from the destination node, in the exact broadcast cycle and broadcast phase that such destination node is expected to answer. Therefore, packet timeout cycles can be eliminated from the equation. It is even not necessary to send supplementary acknowledgment information such as the file chunk ID and/or the sequence order number, because the sender knows exactly for which requested packet sent out the acknowledgment caters for by virtue of the number of broadcast cycles elapsed between the two signals (although this can be optionally kept for redundancy purposes in case host-side time synchronization with the mesh controller fails). In the case of transferring a relatively large file, an error checking mechanism can be appended, not to each packet (because this is pre-included as a base reliability mechanism in the packet construction of the mesh network itself), but rather to the file itself, so that file integrity can be checked at reconstruction on the destination side.

Note that, as shown previously when discussing end node sensor polling strategies with a VM, the actual broadcast cycle interval between packet request from coordinator node, and expected signal answer from queried end-node back at the coordinator node location is at least 2, in the case of a single core mesh controller (but this limitation can be improved by using parallel processing enable hardware). Again, as before, a coordinator node requesting a file from an end node can send requests during each broadcast cycle, and do not need to wait for an acknowledgment signal before sending the next requests in its send pipe, and this is valid notwithstanding the number of nodes being queried (i.e. a single node can be queried multiple times in this fashion).

In the case where such higher bandwidth reliable communication scheme is required not only between a given end node and its gateway, but reliability is also desired for asymmetric client "sniffer" end nodes, then a scheme where those client end nodes are able to send acknowledgment packets for any file, be it from a coordinator node, or from any single other end-node, is needed. In this case, the following optimization strategies can be employed.

Each packet data frame can be separated into sub-frames, and each sub-frame corresponds to a higher-level protocol message (also called "sub-packet" in the code base used for the preferred embodiment), complete with a message ID, therefore allowing multiple message types to live within a single mesh packet. Some message IDs can be control messages, some can be used as the UDP-like sensor polling protocol as explained previously, some are used to control "file" transfers.

Each packet originating from the coordinator node has at least (for the preferred embodiment, exactly) 1 meta-sub-frame, containing the broadcast phase assignment for each end node that must reply, as explained previously (if multi-phase mode is used), as well as a mandatory level-1 sequence number, and a level-2 sequence number. The level-1 sequence number is used to identify and encompass a whole data synchronization cycle between all involved parties (for instance, if there are a fixed number of end node clients and 1 coordinator, each of which has a particular "file" to be broadcasted to all parties ("file" being defined in the most generic way possible as any size-limited bit stream). The level-2 sequence number is typically monotonically incremented from a base value for the first broadcast cycle within a level-1 data synchronization cycle, in order to uniquely identify any broadcast cycle that occurs within that data synchronization cycle (so the level-2 sequence is also called the "broadcast cycle ID").

Note that for multi-phase broadcasting, the TDMA-like scheme as previously explained has an overhead where addresses are assigned broadcast phase IDs according to their address position in a request packet from a coordinator node. This overhead can be optimized in the case where asymmetric client "sniffer" communication is needed, because typically there are order of magnitudes less "sniffer" end nodes than sensor end nodes. In that case, each asymmetric client can be assigned an ID, either in an out-band fashion, or in-band using specialized higher-level messaging with unique identifiers segregating the type of packet.

There are a special subset of messages dedicated to acknowledgment signalling. Those are always prioritized over regular message types. Note that acknowledgment signals need only be sent for the following cases: coordinator to end node, and end node to end node, and for coordinator packets in a broadcast out phase other than the first (or last, depending on chosen implementation) broadcast out phase, the reason being that the mere fact that an end node replied to a coordinator in its assigned broadcast phase is an implicit acknowledgement of receipt of at least 1 outbound packet from a coordinator node, for bit-synchronized cooperative networks.

All acknowledgement signals leverage the deterministic nature of the bit-synchronized mesh network in order to minimize the number of acknowledgments being sent: instead of acknowledging a node address (or its corresponding reduced-size address, if such a strategy is used, such as the short-addressing vs. 32-bit MAC address scheme used in IEEE802.15.4) each acknowledgment packet contains a level-2 sequence ID corresponding to the first broadcast cycle that it is attempting to acknowledge, as well as a serialized bit mask, each bit corresponding to a specific broadcast phase. Because specific nodes are bound to a broadcast phase for each broadcast cycle, this allows to acknowledge multiple packets simultaneously, because there is a 1-to-1 mapping for each broadcast phase to a specific node address, as assigned within each packet of a coordinator node, and also allows to broadcast this multi-packet, multiple-destination acknowledgement signal network-wide at all times. Note that the most obvious case would be to have a bit sequence with the exact same length as $(N_O+N_I-1)$, but in fact this bit sequence can be made longer in order to span multiple broadcast cycles (the level-2 sequence ID allowing any recipient to infer from which starting broadcast cycle one should interpret the acknowledgment bit stream).

Note that the use of a bit mask is not a necessary constraint of such a design, albeit it is highly bandwidth-efficient. In fact, any acknowledgment signalling scheme that does not rely on direct node addressing, but rather by broadcast phase, due to a 1-to-1 relationship between a phase and a specific end node, is under the umbrella of the present invention.

An example embodiment of such a scheme can be as follows:

At the beginning of a level-1 cycle, the coordinator requests the number of bits that each end node client needs to complete this cycle. This is so that the coordinator can schedule the required length of the level-1 cycle.

The coordinator monitors and saves every single packet within a level-1 cycle. This is because it is the only device allowed to reschedule a request for a packet resend operation from a specific end node in case of an acknowledgement failure from said end node, and even if an end node did send an acknowledgment network-wide, there is still the possibility that such a flood does not reach the coordinator itself due to network failure. Thus, at the end of a level-1 cycle, when everything else has been sent, the coordinator checks for all missed acknowledgment packets, and explicitly requests the originator packets corresponding to those acknowledgment packets (the coordinator knows which node and with level-2 ID this corresponds to because it keeps a trace of every transaction within the level-1 cycle).

It schedules packet sends from all end node clients in an interlaced way. The simplest methodology is to simply swap from one client end node to the other at each consecutive assigned broadcast in phase. Even if the length of the file that each end node client must send back to the whole network varies, it does not matter in a practical way: when an end node finishes sending its data, it simply uses its assigned phase to send required acknowledgements to data still transiting within the level-1 cycle throughout the network, nothing more.

Note that it is also possible to use more than 1 consecutive broadcast phase per client. This has the benefit of allowing end nodes to know whether they can span their acknowledgment bit mask over more than 1 broadcast cycle, with potential data frame space saving, and thus bandwidth increase (although another possible simpler scheme would be to simply hardcode the consecutive number of broadcast phases per node).

An ideal example application of such a scheme is for inter-base communication using a bit-synchronized mesh network. Say one has multiple coordinator nodes managing separate mesh networks on different radio channels (either true RF frequency band channels, or FHSS hop tables, or possibly segregation via a network ID, or possible via an encryption or data whitening scheme, or all possible combinations of the above), and want to join those sub-networks using another mesh network, called the "inter-base" network. Then the "files" that need to be sent are simply the whole database of each of those separate networks, to insure that they be synced at all locations in a distributed way, and those "files" could also include high-bandwidth streams such as low-speed camera streaming, 2-way texting, etc.

Note that such a scheme can also be included within a single mesh network, if strict separation of the data frames of each packet into separate containers employed for both purposes is enforced (the first purpose being the regular UDP-like polling action, the second purpose being "file" streaming to multiple asymmetric client end nodes and/or the coordinator itself). Such a separation can be, at its simplest embodiment, using static bit length containers (due to a packet having a fixed maximum size for a given bit-synchronized cooperative mesh network), or can use more complex variable-size container schemes, in which case the expected container length needed for UDP-like polling action can be predicted by the coordinator node by simply verifying the sensor node type of all sensor nodes deployed, assuming that the container size is fixed for a specific sensor node, a constraint that is easily enforced at a sensor node design level, as a mesh network core feature, as is done in the preferred embodiment of the invention.

Another interesting application of such a scheme (in its simple node to coordinator, without acknowledgement from "sniffers", embodiment, as well as its extended embodiment with "sniffers" included) could also be for network control of a higher bandwidth, lower power efficiency wireless network such as a 802.11 device, for instance. Say one wants to operate a low power sensor network, with the option of activating high-speed camera streaming on demand, without having to rely on rechargeable or costly and potentially maintenance-heavy energy harvesting strategies. In this case, one could link the power pack of the 802.11 device linked to the high-bandwidth requirement equipment to a separate bit-synchronized mesh network whose purpose is to activate, deactivate and configure said 802.11 device (in the preferred embodiment, it is a Linux router running a console-configurable interface, for instance, connected via an adapter to the UART port of the mesh controller). This is possible because the scheme explained above allows for any higher-level protocol to leverage it, including order-sensitive protocols. As such, one can use a "file" as a console command, for instance, and in that case, the mesh network can retrofit configuration-heavy equipment such as 802.11s routers so that their assigned ad-hoc peer address be automatically configured via the alternate, low-power, long lasting cooperative bit-synchronized mesh network, without needing any user interaction whatsoever, making for very easily deployable high-bandwidth mesh networks. Said cooperative bit-synchronized parallel mesh network could also change the assigned RF configuration of those routers depending on how much the router frequency band is crowded, for example.

Reference is made to FIG. 21A, 21B and FIG. 22A to 22D for possible implementations showing the multi-acknowledgment data sub-frames in action, and to FIG. 20 detailing the possible structure of a basic high-level protocol that allows the implementation of console control of a WIFI802.11s enabled router (based on OpenWRT).

Features of the above-described embodiments may be defined as follows.

(1) An embodiment of the present, uses the FM capture effect as a fallback packet network flooding propagation in case bit-synchronization is in peril due to effects including (but not limited to) path delay, multi-path fading, etc.

(2) Further provided are variations in bit-synchronization timing in order to introduce variability akin to "genetic diversity" between potentially contentious packets out of bit-synchronization, said variations being (but not limited to) of the following natures: random, pseudo-random, etc.

(3) There may also be provided variations in packet RF strength in order to introduce variability akin to "genetic diversity" between potentially contentious packets out of bit-synchronization, said variations being (but not limited to) the following natures: random, pseudo-random, etc.

(4) Item (1) may be combined with item (2) and (3)

(5) In addition to item (3), there is further provided random or pseudo-random source induced from antenna and RF front-end circuitry variable frequency response combined with a FHSS frequency hopping scheme.

(6) In addition to item (2), there is further provided random source induced from mesh controller processor timing jitter, RF front-end timing jitter.

(7) In addition to item (2), there is further provided pseudo-random source induced by the inherent non-linearity of interrupt propagation between the mesh controller processor and the RF front-end circuitry, each of which is operating using clock frequencies with a non-integer ratio.

(8) In addition to item (2), there is further provided leveraging the unpredictability of manufactured clock drifts of the mesh controller and/or the RF front-end circuitry, and its relationship with local variable environmental parameters such as temperature, humidity, etc.

(9) In addition to item (2), there is further provided using permutations of combinations of items (6), (7), (8) variability generating schemes.

(10) There may be provided a system using a node that sends multiple redundant packets in different time slots in a broadcast phase, all packets carrying the same information except for the required bits that are used to carry slot-dependent information such as a flooding sequence number and any supplementary information that varies according to the current time slot in a flooding broadcast phase (for instance, error correction codes).

(11) In addition to item (10), there is further provided regularly spaced redundant packets sends for each node.

(12) In addition to item (10), there is further provided redundant packets spaced according to a random or pseudo-random scheme.

(13) In addition to item (10), there is further provided redundant packets spacing according to a feedback loop that monitors the success or failure of delivery according to implementation of higher-level protocol used by the network to poll sensors (as a form of inter-communication between different OSI layers, in other terms)

(14) There is further provided a system according to item (13) combined with sensor positional information taken using real-time out-band local methods such as an onboard GPS

(15) There is further provided a system according to item (13) combined with sensor positional information taken using locally stored out-band positional information, such as GPS information configuration data being entered into the node at node deployment time by an enabling device that has an onboard position sensor such as (but not limited to) a smartphone

(16) There is further provided a system according to item (13) combined with remotely stored sensor positional information sent from the coordinator node linked to a processing unit with access to sensor database, said positional information being sourced via methods such as (but not limited to) GPS storage in centralized or distributed database at deployment, via a parallel mesh protocol optimized for radio triangulation and neighbour mapping methods, via acoustic phased array deployment synchronized on the mesh network time base, etc.

Other Examples and Implementations

Various examples of the above-described systems, methods and features for network communication techniques will be described below. It should be understood that the examples described below may be combined with other aspects of the network communication system, method and components as described hereinabove in accordance with various embodiments of the present.

Clock Synchronization—Node and Network

In an embodiment, as better illustrated in FIG. 1A, there is provided a node 100 to be integrated in a network 200 (see FIG. 19) of wirelessly connected nodes 100. The node 100 comprises a main module 102, external sleep controller 104 and a digital serial bus 106 connected between the main module 102 and the external sleep controller 104. The main module 102 comprises a main controller 110 (for example, the above-described "mesh controller") having a main clock 112 (for example, the above-described mesh clock). The main controller 110 is operable between an active configuration wherein the main clock 112 oscillates and an inactive configuration wherein the main clock 112 sleeps, in order to minimize consumption from the main power source 114. The digital serial bus 106 is operable under a communication protocol which is configurable to embed timing information. The external sleep controller 104 is operable under a lower power consumption than the main module 102 and operates the main controller 110 between the active and inactive configurations based on the timing information. The main module 102 comprises a communication means 116 connected to the main controller 110 for communicating with other nodes 100 of the network 200 (FIG. 19); and a main power source 114 connected to the communication means 116 and the main controller for supplying power thereto. The main module 102 is further connected to a sensor 130.

The timing information embedded in the communication protocol of the digital serial bus 106 comprises sleep period data representative of a time period during which the main module 102 is intended to operate in an inactive configuration. The external sleep controller 104 comprises: an input port 118 connected to the digital serial bus 106, for receiving the sleep period data; a low frequency clock 120 for measuring elapsed time; a timer 122 connected to the low powered clock 120 for determining when the elapsed time has reached said time period; an output port 124 connected to the digital serial bus 106 to send a signal to the main module 102 to operate the main module 102 in the active configuration.

It is to be understood that the input port 118 and output port 124 may be the same port.

The digital serial bus 106 may be an Inter-Integrated Circuit (I2C) or a Serial Peripheral Interface (SPI) bus, for example.

Network of Nodes

With reference to FIG. 19, a plurality of the above-described end nodes 100 may be interconnected in a network system 200, the network 200 further comprising a coordinator node 210 for communicating with the end nodes 100, the network 200 being configured to broadcast data and synchronize a time base via a flooding mechanism. The nodes 100 may be connected in a mesh configuration. Moreover, the network may have a cooperatively synchronized time base, between the end nodes 100 and the coordinator node 210.

Sniffer

In the described embodiment, with reference to FIG. 19, the coordinator node 210 comprises a system database 212. Further, an asymmetric client 220 (or "sniffer") is in communication with one or more of the end nodes 100. The asymmetric client 220 comprises a database 222 which replicates at least a portion of the information found in the system database 212. The asymmetric client 220 is configured to update the replicated database 222 upon receiving data through said flooding mechanism.

Thus, it is to be understood that a client device 250 may be operatively connected to at least one of the end nodes 100.

Parallel Network Communication and Control

The above-described network may be further combined with a secondary network of nodes, connected via the coordinator node. The nodes of the secondary network may be routers which are connected over a high bandwidth network. Further, a computer may be connected to at least one of the nodes of the secondary network.

In addition or alternatively, the secondary network may be another network similar to the previously described one (such as another mesh network, for example). It is to be understood that any suitable number of additional networks (mesh, wifi or other) may be further connected to the first network. It is to be understood that each network may have on or more coordinator node, which may in turn be connected directly or indirectly to the coordinator node(s) of the other networks.

Clock Synchronization—Method

In accordance with an embodiment, with reference to FIG. 1A, there is provided a method for operating a node 100 adapted to cooperate within a network 200 of nodes. The node 100 comprises a main module 102 and an external sleep controller 104 connected thereto via a digital serial bus 106, the main module 102 comprises a main controller 110 having a main clock 112, the main controller 110 being operable between an active configuration wherein the main clock 112 oscillates and an inactive configuration wherein the main clock 112 sleeps. The method comprises:

sending from the main controller 110, timing information embedded in a communication protocol of the digital serial bus 106, to the external sleep controller 104, said timing information comprising sleep period data representative of a time period during which the main module 102 is intended to operate in an inactive configuration;

at the external sleep controller 104, measuring elapsed time via a low frequency clock 120; and when the elapsed time has reached said time period, sending a wake signal (1st wake signal) from the external sleep controller 104, over the digital serial bus 106, to the main module 102 to operate the main module 102 in the active configuration.

Figure 13A:
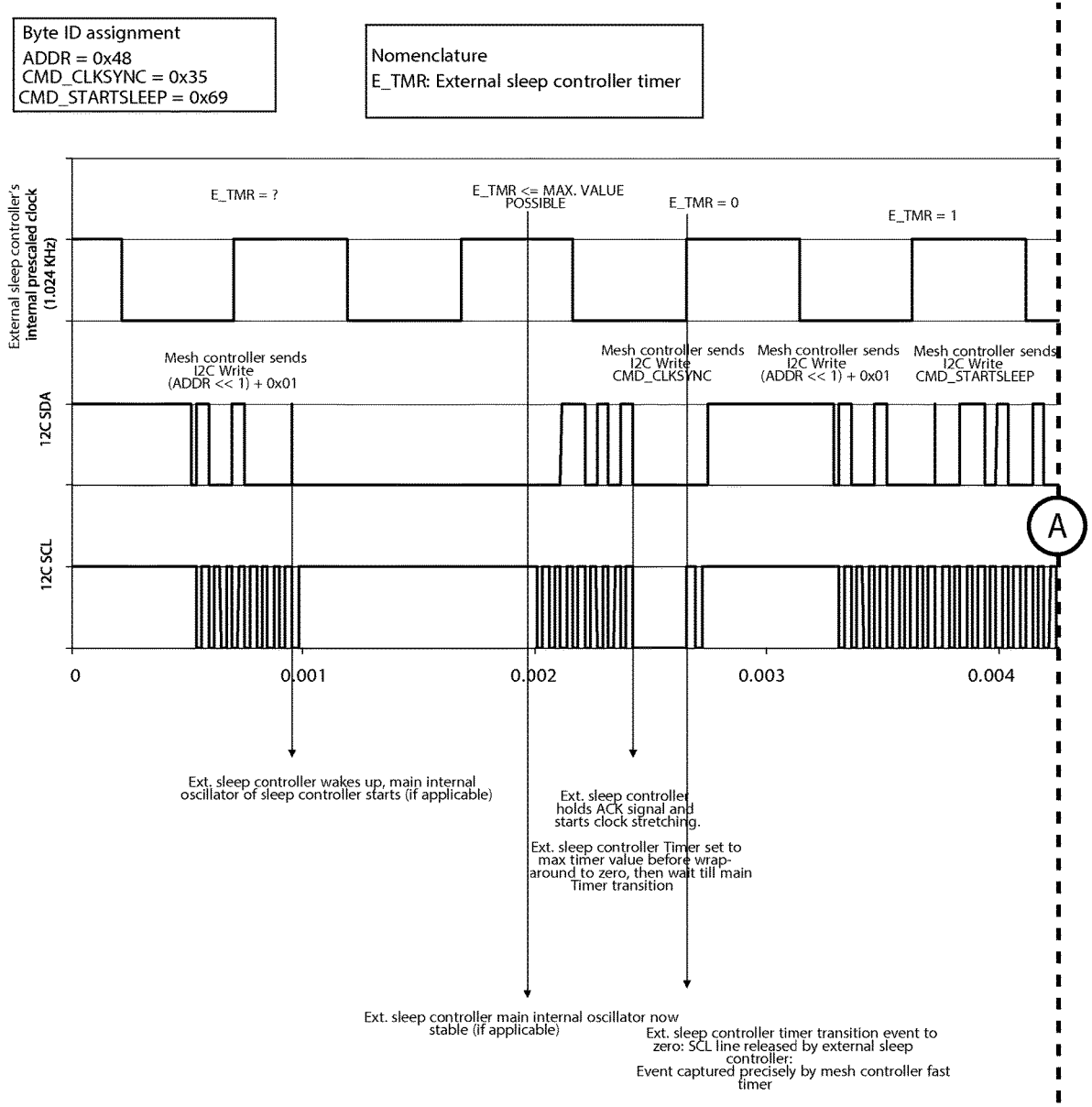
FIG. 13A, 13B show a diagram showing an I2C bus waveform timeline for an external sleep controller communication bus during the sleep initiation phase, according to an embodiment.
Figure 13B:
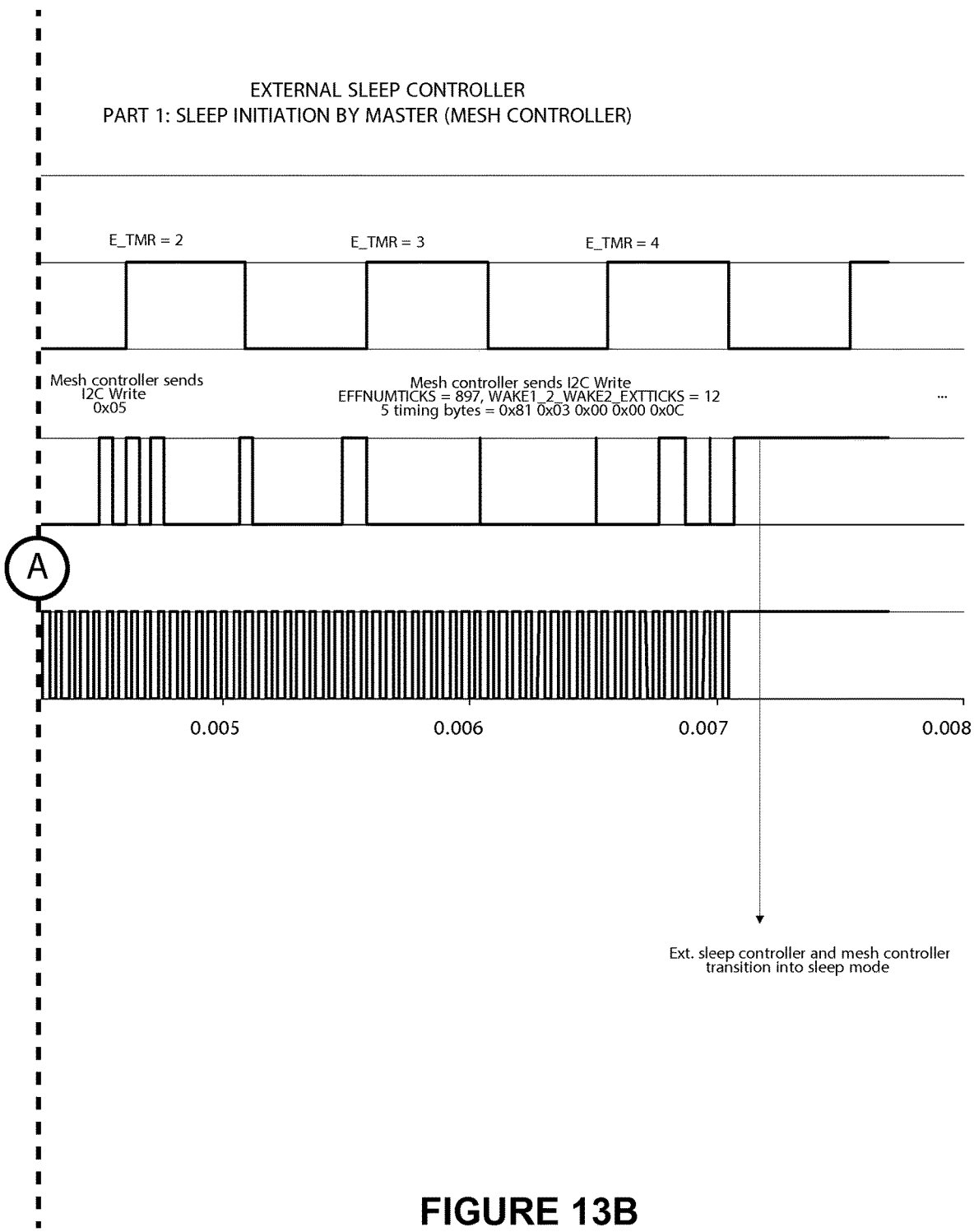

FIG. 13A, 13B show an I2C bus waveform timeline 1300 for an external sleep controller communication bus during the sleep initiation phase, according to an embodiment. The sleep period 302 is represented by a number of periods of the low frequency clock 120. Moreover, the sending of the timing information from the main controller 110 is scheduled to match a start of a period of the low frequency clock 120. The scheduling comprises delaying the sending of the timing information until the start of a next period of the low frequency clock 120. This start of the next period is embedded in a communication protocol of the digital serial bus 106 and signaled from the external sleep controller 104 to the main controller 110. More particularly, the delaying comprises clock stretching 1314 (see FIG. 13A, 13B) and the signaling is made through a clock transition 1316 of the external sleep controller 104.

FIG. 14A, 14B show an I2C bus waveform timeline for an external sleep controller communication bus during the wake-up phase, according to an embodiment. After sending the wake signal 1410, an initialization signal from the external sleep controller 104, is further sent over the digital serial bus 106, to the main module 102 to initialize the main clock 112 (2nd wake signal) 1412.

The timing information sent from the main controller 102 further comprises a time delay to be elapsed between the wake signal and the initialization signal (between the 1st and 2nd wake signals). This time delay is represented by a number of periods of the low frequency clock 120.

Moreover, the sleep period data takes into account a guard time (example 420 in FIG. 4) to compensate for an error in the low frequency clock 120. The guard time 420 is calculated according to:

guard time=e×n+$f_{safety}$, wherein e represents said error (in μsec) of the low frequency clock, n represents a number of packet failures ("drops") tolerated, and $f_{safety}$ represents a safety factor (in μsec).

Figure 12:
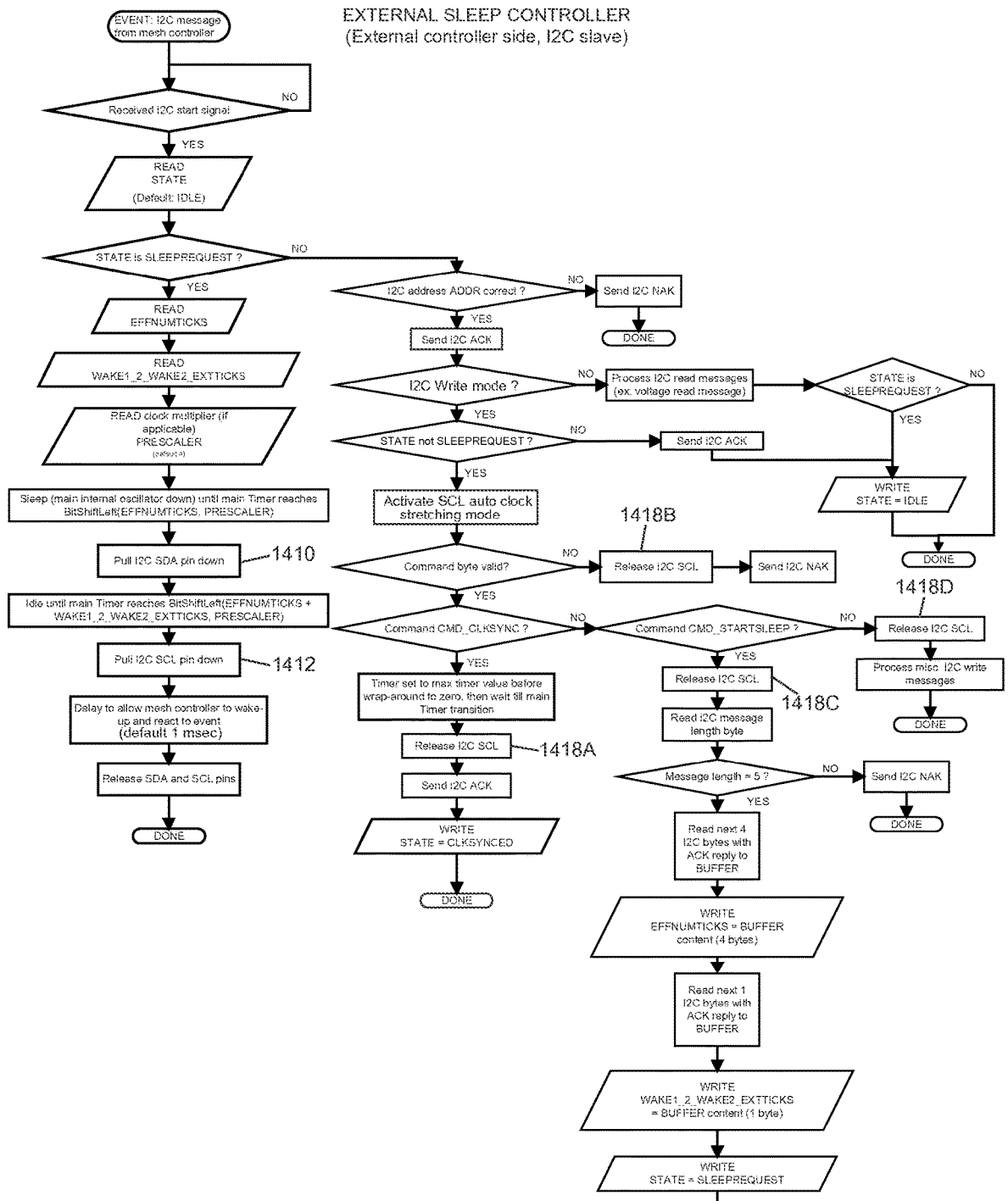
FIG. 12 is a flowchart showing an operation of an external sleep controller (I2C slave), according to an embodiment.

FIG. 11A to 11D show a flowchart of steps executed at the main controller 110 (also referred to as "I2C master") that is connected via I2C bus to the external sleep controller 104 for managing sleep mode. FIG. 12 is a flowchart detailing the operation of an external sleep controller (I2C slave), according to an embodiment.

Communication Protocol

FIG. 4 shows a schematic diagram representing elements of a communication protocol 400 for the node system 100 described herein, in accordance with an embodiment. More particularly, the diagram represents different levels of the protocol, from broader to more specific, namely a periodic sleep-wake cycle level 410, a broadcast cycle level 430, a regular broadcast phase level 440, an FHSS level 460, a packet level 510, and a configuration frame level 530. The periodic sleep-wake cycle level 410 shown includes time periods 412, 414, 416, 418, 420, 422, 424, 426, 428. The broadcast cycle level 430 shown includes time periods 432, 434, 436, 438. The regular broadcast phase level 440 shown includes time dependent phases 442, 444, 446, 448, 450, 452. The FHSS level 460 shown includes time periods 462, 464, 466, 468, 470, 472, 474, 476, 478, 480, 482, 484, 486, 488, 490, 492, 494, 496, within slots 502, 504, 506. The packet level 510 represents a data packet 512 containing data elements 514, 516, 518, 520, 522. The configuration frame level 530 represents the configuration frame 518 which contains data elements 532, 534, 536, 538, 540, 542, 544, 546, 548, 550, 552.

In accordance with this embodiment, with further reference to FIGS. 1A and 19, there is provided a method for communicating within a network 200. The network 200 comprises end nodes 100 and a coordinator node 210, the network 200 being cooperatively synchronized and configured to broadcast data packets during broadcast cycles 414, 422, 428 through a flooding mechanism (multiple floodings may be involved).

Each data packet 512 comprises a configuration frame 518 and a data frame 520, the configuration frame 518 comprising hop data. The hop data may include a sequence number 540 representing the current number of hops and a hop maximum 536 representing a maximum number of hops for a given broadcast phase 422.

The method comprises for each broadcast cycle 422:

a) during an outbound broadcast phase 448, sending from the coordinator node 210 a coordinator-originating data packet for polling at least one of the nodes 100, the data frame of the coordinator-originating data packet comprising address data corresponding to the at least one end node to be polled; and b) during an inbound broadcast phase 450, receiving at the coordinator node a node-originating data packet returned from one of said at least one of the end nodes 100, the data frame of the node-originating data packet comprising node data from the end node having been polled.

Each of the outbound 442, 448 and inbound 444, 446, 450, 452 broadcast phases comprises successive time slots 464, 466, 468, 470 for at least one of said end node to either receive the data packet or rebroadcast the data packet to the network 200. The method further comprises:

i) during one of said time slots 468, receiving at one of the end nodes, one of said data packets; and ii) during another one of said time slots 470:

updating the hop data in the data packet (for example, by incrementing or decrementing the sequence number 540);

rebroadcasting the data packet from the end node 100 (if the incremented sequence number is equal or less than the maximum number of hops 536); and during an inbound broadcast phase 450, if the end node corresponds to the address contained in the data packet, generating and broadcasting a data packet comprising node data from the end node and corresponding hop data (for example, where the hop data has a reinitialized sequence number).

Each time slot has a duration ranging between about 1 μsec and about 100 μsec. It is to be understood that the time slots may have variable durations depending on the particular implementation.

In accordance with an embodiment, each of said outbound 442, 448 and inbound 444, 446, 450, 452 broadcast phases comprises a set number of time slots ranging between 2 and 31. It is to be understood that in accordance with alternate embodiments, a broadcast phase may have any suitable number of time slots.

Each of the outbound and inbound broadcast phases further comprises a frequency change guard time period 462. The frequency change guard time period 462 may be set to a period set up to about 10 μsec, for example. In accordance with an embodiment, the guard time 462 is set to 1 μsec.

In other words, there is provided a method for communicating within a network 200 of nodes 100. The network 200 is cooperatively synchronized and configured to broadcast data packets 512 to the network 200 during broadcast phases 442, 444, 446, 448, 450, 452 through a flooding mechanism, each data packet 512 comprising hop data. The method comprises, for each broadcast phase 450:

1) broadcasting a data packet from a source node 100 during a predetermined time slot 470; and 2) receiving the data packet at one or more destination node during said predetermined time slot 468.

The method further repeats steps (1) and (2) according to the hop data, at respective predetermined time slots, wherein each destination node of step (2) corresponds to a source node in a next execution of step (1) and the data packet received in step (2) corresponds substantially to the data packet 512 to be broadcasted in the next execution of step (1).

The hop data may represent a maximum number of hops 536 and a current hop number 540. In this case, the method further comprises at each destination node of step (2), updating the current hop number 540 in the data packet. The repeating is thus executed until the current hop number has reached the maximum number of hops 536.

The current hop number 540 corresponds to a sequence number and the updating comprises incrementing the sequence number; the method further comprises before step (1), initializing the sequence number 540.

The nodes 100 comprise end nodes 100 and a coordinator node 210. Each broadcast cycle 432 comprises: at least one outbound broadcast phase 448 wherein the coordinator node 210 broadcasts a coordinator-originating data packet directed to one or more of said end node 100; and at least one inbound broadcast phase 450 wherein a node-originating data packet is received at the coordinator node 210.

The method further comprises broadcast cycles 422, where each broadcast cycle 422 comprises successive ones of the at least one outbound broadcast phase 448 and of the at least one inbound broadcast phase 450, consecutive broadcast cycles 414, 422, 428 being separated by a sleep period 418, 424.

The coordinator-originating data packet of the outbound broadcast phase 448 comprises address data representing to one or more end node to be polled and each node-originating data packet of the outbound broadcast phase 448 comprises node data from each end node having been polled.

In accordance with an embodiment, each node 100 comprises a storage 126 for storing configuration data 518, wherein the data packets comprise updated configuration data, the method further comprising after step (b), updating at each destination node, the corresponding configuration data based on the updated configuration data 518 of the data packet 512 in order to synchronize the configuration data of ends nodes 100 in the network 200.

Multi-Phase Broadcast Modes

In the above-described method, the broadcast cycle may comprise multiple inbound broadcast phases 444, 446, 450, 452, i.e. step (b) of the afore-mentioned method is executed multiple times sequentially, in respective inbound broadcast phases, within a given broadcast cycle 432.

This feature may be useful for segmenting larger volume elements to be transmitted across the network 200. In such a case, the data frame of each of the node-originating data packet of the said multiple inbound broadcast phases of step (b) comprises a segmented portion of a data element, to be reconstituted at the coordinator node.

In some cases, the data frame of the coordinator-originating data packet of the outbound broadcast phase 448 may comprise address data associated to a plurality of said end nodes (for example, to poll several nodes with one polling message); the method then comprises, for each of the plurality of end nodes, broadcasting a data packet in respective ones of said multiple inbound broadcast phases 450, 452.

In other embodiments, the broadcast cycle 432 may comprise multiple outbound broadcast phases 442, 448, for example to transfer data to an asymetric client 220, as previously explained.

Acknowledgement of Receipt

In other embodiments, referring to FIGS. 21A, 21B and 22A to 22D, the data packet broadcasted by a source node is addressed to a plurality of destinations nodes, the data packet having data set for acknowledging receipt, each destination node being associated to a predetermined position in the data set, the method further comprising for each of the destination nodes of step (b), updating the received data packet at the corresponding predetermined position to indicate an acknowledgement of receipt.

In some embodiments, a high-level communication protocol is wrapped in bounded bit streams called "files" and segmented in chunks in order to be broadcastable via the lower-level protocol. Each chunk is identified by an unique sequence number so as to enable "file" reconstruction at receiver site. Each chunk is sent within free space available in a data payload of the packet to be broadcasted by a given node. Acknowledgement may be sent which directly contains information pertaining to the chunk that has been acknowledged, such as (but not limited to) the chunk sequence number. Acknowledgement may be sent which contains information pertaining to a specific broadcast cycle and broadcast phase where said chunk was broadcasted, so as to uniquely identify it via the structure of the broadcast phases themselves. Moreover, acknowledgement of an end node for a coordinator originating packet may be implicit to that end node by virtue of simply replying to said coordinator packet at the requested broadcast cycle and broadcast phase, said request being sent at all times during broadcast out phases by said coordinator node.

The identification of a specific broadcast cycle and/or phase combination may be sent as a number identifier. Alternatively, the identification of a specific broadcast cycle and/or phase combination may be sent as a bitmask, where the position of a bit correlate directly to the position of a given broadcast phase. The method may allow for acknowledgement verification and network health checking. Moreover, acknowledgement signals may be combined with chunks so as to be sent in the same packet.

Also, multiple acknowledgements may be sent simultaneously in the same packet. Simultaneous acknowledgement may be used in order to achieve handshaking between a set of nodes, whether a coordinator node or an end node, so as to enable robust point-to-multipoint communication between all nodes within the set. The number of end nodes in the set may match exactly the number of broadcast in phases per cycle, and each of those end nodes are then assigned a specific broadcast "in" phase within a broadcast cycle, so that any of those end nodes can acknowledge all transactions from the broadcast cycle preceding it by a known number of broadcast cycles.

Priority Management in Poll Scheduling by Coordinator Node

In accordance with an embodiment, each node address is associated to a priority queue number in a storage. The storage is preferably located at the coordinator node 210 (see FIG. 19). The priority queue numbers represent a polling order for the coordinator node. The address in the coordinator-originating data packet of the outbound broadcast phase corresponds to the end node having a highest priority based on the priority queue number. After the outbound broadcast phase, the priority queue numbers are reassigned.

The reassigning may comprises:
  lowering a priority of the end node having been polled;
  maintaining a higher priority level of critical ones of said end nodes; and/or
  maintaining a higher priority level of predetermined ones of said end nodes for a period of time.

The reassigning may be initiated further to receiving a priority change request at the coordinator node, comprising a node address and a corresponding new priority queue number, in which case the reassigning comprises updating in the storage the priority queue number associated to the node address, with the new priority queue number.

The priority change request may be initiated by an end node, for example a "sniffer" node which may be made via a user interface of a client application.

Alternatively, the priority change request may be initiated in response to a detected trigger event. A trigger event may include: a warning or error threshold detected on a given end node; an old timestamp condition on a given end node; and/or a user interacting with a gauge on a user interface connected to the coordinator node (in which case the priority mode stays active for a while, and then stops after a while if the client application remains idle).

Asymetric Client

In addition, referring to FIG. 19, the coordinator node 210 stores a system database 212, and at least one of the end nodes 100 of step (i) is an asymmetric client (or "sniffer") 220 comprising a replicated database 222, i.e. at least a portion of the content of the replicated database 222 is substantially sourced from the system database 212 at the coordinator node 210. The method further comprises after step (i) updating, via the asymmetric client 220, the replicated database 222 with content of the data packet 512 (FIG. 4). The content of the replicated database 222 comprises at least one group among: configuration variables 230, data variables 232 and node network state information 234.

The method may thus further include sending a command from the asymmetric client 220 directed to the coordinator node 210, for example to obtain specific content to be updated in the replicated database 222.

Further reference is made to the portions described above, in relation to FIGS. 16 to 18.

Redux Phase

As illustrated FIG. 4, with further reference to FIGS. 1, 8 and 19, the broadcast cycle 422 further comprises a redux phase 434. The redux phase 434 includes one or more time slot 488, 490 for an end node 100 (FIGS. 1 and 19) to either receive the data packet or broadcast the data packet to the network 200 (FIG. 19), for a partial flooding to the network 200, so as to split the flooding over multiple broadcast cycles 422, 428.

An end node (for example, a "sniffer") 220 may initiate communication with the coordinator node 210 by broadcasting a data packet during the redux phase 434.

Thus, the redux phase 434 may be used by the "sniffer" 220 to request priority (i.e. sending a priority change request to the coordinator node 210). More particularly, in one embodiment, the coordinator 210 may send a flag in its outbound broadcast to indicate that it gives permission to a particular sniffer node 220 of a specific address to request priority at this time. In an alternative embodiment, the network is configured such that the sniffer 220 or end node 100 is able to do send a priority change request by its own initiative (unsupervised redux slot), in which case the coordinator 210 receiving such a request automatically reassigns the priority scheduling.

Sleep

Still with reference to FIG. 4, as well as FIGS. 1 and 19, consecutive broadcast cycles 414, 422 are separated by a sleep period 418, during which end nodes 100 are deactivated for external communication (i.e. between nodes 100 of the network 200). The sleep period 418 may have a duration of up to about 1 min.

Mesh controller time-sharing with sensor peripheral integration firmware within same processor core In accordance with an embodiment, referring now to FIG. 2, with further reference to FIG. 1, each end node 100 comprises a main controller 110. The method further comprises executing a node-related process, at the main controller 110 of at least one of the end nodes 100, during the sleep period 418.

Each end node 100 of further comprises a non-volatile memory 126 having stored thereon virtual machine (VM) code means 128 being configured to execute the node-related process (i.e. a process that is internal to the node 100). FIG. 2 shows a timeline 150. A node-related process may be triggered by at least one of the following events: booting-up the main controller 152, activating a network seeking mode 154, deactivating a network seeking mode 156, entering a broadcast cycle 164 and leaving a broadcast cycle 162, 168. The virtual machine code means 128 may be further configured to limit execution time of the node-related process based on the duration of the sleep period. For example, the virtual machine code means 128 may include a hypervisor to limit the execution time based on a comparison of a predicted execution time with remaining sleep time. Other VM events are shown at 160, 170.

Possible user processes employed within VMs include:

Fetching analog sensor data interfaced to the available signal conditioning hardware on the mesh controller processor (for example: onboard internal ADCs, digital inputs, timer capture, etc.). This potentially allows to capture sensor data from standards such as 0-10V, 4-20 mA, with minimal signal conditioning circuitry (typically a resistor or a voltage divider is the only thing required for such applications).

Sending analog output signals to external circuitry directly from available hardware on the mesh controller processor (for example: onboard internal DACs, digital outputs, timer compare/PWM generators).

Controlling and acquiring data from I2C/SMBus enabled sensors.

Controlling and acquiring data from SPI enabled sensors.

Controlling and acquiring data from custom digital protocol sensors (ex: 1-Wire) via custom bit-banging protocols implemented in the user VM code.

Doing basic digital signal conditioning operations (typically mathematical operations for converting a raw sensor data into the proper format for transmission via radio).

Capturing the precise timing of the mesh network, and transmitting that information to a coprocessor so as to in-band synchronize the timers of external devices (this is especially useful for applications that need a distributed common time base without having to rely on costly solutions such as individual GPS modules per node). This feature is typically implemented for time of flight triangulation, such as for gunshot localization via a distributed network of wireless acoustic sensors.

Reading and reconfiguring the mesh controller's own internal configuration registers (this also potentially enables meta-programming).

Storing information in accessible internal RAM/ROM memory sections of the mesh controller (typically for storing non volatile sensor factory calibration data).

Communicating event information to external circuitry.

Communicating internal mesh controller information to external circuitry without using standard communication bus (typically a serial port).

Parallel Network Communication and Control

In some embodiments, the network 200 (see FIG. 19) may be combined with a secondary network of nodes (or more additional network(s)), connected to the coordinator node 210. The method comprises operating from the coordinator node, the secondary network between a powered configuration wherein the nodes of the secondary network are connected to a power source, and a sleep configuration wherein the nodes of the secondary network are disconnected from the power source. A data element from the secondary network may be encapsulated in said data packets being broadcasted in the network of end nodes.

In accordance with one embodiment, there is provided a method for communicating within a network comprising end nodes and a coordinator node, the network being configured to broadcast data packets between said nodes during broadcast cycles through a flooding mechanism, consecutive broadcast cycles being separated by a sleep period wherein the end nodes are deactivated for external communication. The method comprises during said sleep period, executing a node-related process, at a main controller of at least one of the end nodes.

The secondary network may be a high bandwidth network, thereby allowing streaming of sources such as camera feeds unrestricted by the primary network bandwidth limitations. Alternatively, the secondary network may be a IEEE802.11 network. Still alternatively, the secondary network may be a cooperative mesh network. It is to be understood that multiple of the above-mentioned examples of secondary networks including a combination of the above-examples or the like may be connected to the main network.

Auto-configuration of the hardware platforms responsible for managing said secondary network may be achieved using the primary network 200. In such a case, network configuration may be accomplished via wrapping of a high-level protocol with handshaking within the communication protocol paradigm of the primary network 200 in order to change configuration data of said secondary network hardware platform such as, but not restricted to, the following: peer addresses, network channel, network bandwidth, network encryption.

The hardware potentially operating the secondary network may be leveraged in order to locally interface with compatible sensors and controllers. The hardware may be a network router is used as the main secondary network is a wifi-enabled router. In addition, legacy gauges and instrument panels are retrofitted via a camera digitizing their state and encapsulating the resulting data in packets broadcasted in the primary network as a regular end node sensor.

Embodiments of the present may apply in the areas of forestry, military, industrial and construction applications.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A method for communicating within a network comprising end nodes and a coordinator node, wherein the end nodes and the coordinator node are configured to broadcast data packets during broadcast cycles through a flooding mechanism, and wherein each broadcast cycle is separated by a sleep period wherein the end nodes are deactivated for external communication, the method comprising, for each broadcast cycle:

a) during an outbound broadcast phase, transmitting, by the coordinator node, a coordinator-originating data packet for polling at least one of the end nodes, a data frame of the coordinator-originating data packet comprising address data corresponding to the at least one of the end nodes to be polled; and b) during an inbound broadcast phase, receiving, by the coordinator node, a data packet returned from one of the end nodes, wherein a data frame of the data packet comprises end node data, and wherein each of the outbound and inbound broadcast phases comprise successive time slots, and c) during a redux phase, receiving, by the coordinator node, a redux phase data packet that was partially flooded to the network by an end node during a previous broadcast cycle, wherein the redux phase data packet is broadcast to the network over a plurality of broadcast cycles, wherein any end node within the network is permitted to broadcast during the redux phase, and wherein the redux phase is assigned a shorter time slot than a time slot of the outbound broadcast phase.

2. The method of claim 1, wherein the end nodes are configured to communicate in a synchronized manner such that a delay between transmissions of each of the end nodes is less than half of a bit transmission time.

3. The method of claim 1, further comprising transmitting, by the coordinator node and to the end nodes:
 a duration of the outbound broadcast phase,
 a duration of the inbound broadcast phase, and
 a duration of the redux phase.

4. The method of claim 1, wherein the redux phase comprises a partial flooding to the network of the redux phase data packet, so as to split the flooding of the redux phase data packet over multiple broadcast cycles.

5. The method of claim 1, wherein the data frame of the coordinator-originating data packet comprises:
 timing information for synchronizing clocks of each of the end nodes;
 a maximum number of hops for transmissions in the network; and
 an indication of which frequency channel to use for each hop.

6. The method of claim 1, wherein transmitting the data frame of the coordinator-originating data packet comprises transmitting the data frame of the coordinator-originating data packet before receiving a response to a previously transmitted coordinator-originating data packet.

7. The method of claim 1, further comprising:
 receiving, by the coordinator node, the redux phase data packet; and
 adjusting, by the coordinator node and based on the redux phase data packet, a polling order of the coordinator node.

8. The method of claim 7, wherein adjusting the polling order comprises increasing a priority of an originating node of the redux phase data packet.

9. A node communicating in a network, the node comprising:
 a processor;
 a network interface for communicating within the network; and
 memory comprising executable instructions, which, when executed by the processor, cause the node to, during a single broadcast cycle of the network:
  broadcast, during an outbound broadcast phase of the broadcast cycle, a data packet comprising a polling request for another node in the network, wherein within the single broadcast cycle the data packet comprising the polling request is transmitted to each node of the network;
receive, during an inbound broadcast phase of the broadcast cycle, a data packet originating from the other node in the network that is responsive to the polling request, wherein within the single broadcast cycle the data packet that is responsive to the polling request is transmitted to each node of the network;
broadcast, during a redux phase of the broadcast cycle, a redux phase data packet, wherein the redux phase is shorter than the outbound broadcast phase, wherein the redux phase data packet is broadcast to the network over a plurality of broadcast cycles, wherein any end node within the network is permitted to broadcast during the redux phase, wherein the redux phase is assigned a shorter time slot than a time slot of the outbound broadcast phase, and wherein within the single broadcast cycle the redux phase data packet is transmitted to a subset of the nodes of the network; and
after the single broadcast cycle, enter a sleep period where the node is deactivated for external communication until a next broadcast cycle.

10. The node of claim 9, further comprising:
a first clock, and
a second clock having a higher accuracy than the first clock, and
wherein the executable instructions further cause the node to periodically correct the first clock based on the second clock.

11. The node of claim 10, wherein the node is configured to maintain, using the first clock and the second clock, a synchronization within the network of less than half of a bit transmission time.

12. The node of claim 9, wherein the executable instructions further cause the node to:
receive sensor data from a sensor corresponding to the node; and
after determining that the sensor data satisfies a predetermined threshold, generate the redux phase data packet.

13. The node of claim 9, wherein the executable instructions further cause the node to:
receive an indication of a duration of the outbound broadcast phase;
receive an indication of a duration of the inbound broadcast phase; and
receive an indication of a duration of the redux phase.

14. A system comprising:
a coordinator node communicating in a network,
a first end node communicating in the network, and
a second end node communicating in the network,
wherein the coordinator node comprises:
a processor;
a network interface for communicating within the network; and
memory comprising executable instructions, which, when executed by the processor of the coordinator node, cause the coordinator node to:
broadcast, during an outbound broadcast phase of a broadcast cycle, a data packet comprising a polling request for the first end node;
receive, during an inbound broadcast phase of the broadcast cycle, a data packet originating from the first end node that is responsive to the polling request; and
receive, during a redux phase of the broadcast cycle, a first redux data packet that was partially flooded to the network during a previous broadcast cycle, and
wherein the first end node comprises:
a processor;
a network interface for communicating within the network; and
memory comprising executable instructions, which, when executed by the processor of the first end node, cause the first end node to:
receive, during the outbound broadcast phase, the data packet comprising the polling request;
broadcast, during the inbound broadcast phase, the data packet that is responsive to the polling request;
receive, during a redux phase of the broadcast cycle, a second redux phase data packet from the second end node, wherein the redux phase is shorter than the outbound broadcast phase of the broadcast cycle, and wherein any end node within the network is permitted to broadcast during the redux phase; and
after the broadcast cycle, enter a sleep period where the first end node is deactivated for external communication until a next broadcast cycle, and
wherein the second end node comprises
a processor;
a network interface for communicating within the network; and
memory comprising executable instructions, which, when executed by the processor of the second end node, cause the second end node to:
broadcast, during the redux phase of the broadcast cycle, the second redux phase data packet; and
after the broadcast cycle, enter a sleep period where the second end node is deactivated for external communication until the next broadcast cycle.

15. The system of claim 14, wherein the instructions, when executed by the processor of the second end node, cause the second end node to
receive, during the outbound broadcast phase, the data packet comprising the polling request;
broadcast, during the outbound broadcast phase, the data packet comprising the polling request;
receive, during the inbound broadcast phase, the data packet that is responsive to the polling request; and
broadcast, during the inbound broadcast phase, the data packet that is responsive to the polling request.

16. The system of claim 14, wherein the instructions, when executed by the processor of the first end node, cause the first end node to broadcast, during the redux phase, the second redux phase data packet.

17. The system of claim 14, wherein during the outbound broadcast phase the data packet comprising the polling request is received by every end node of the network.

18. The system of claim 14, wherein during the inbound broadcast phase the data packet that is responsive to the polling request is received by every end node of the network.

19. The system of claim 14, wherein during the redux phase the second redux phase data packet is not received by some end nodes of the network.

20. The node of claim 9, wherein the executable instructions further cause the node to:

determine, based on the data packet originating from the other node in the network, a frequency that the data packet originating from the other node in the network was transmitted on;

determine, based on the data packet originating from the other node in the network, a frequency for re-transmitting the data packet originating from the other node in the network; and determine, based on the data packet originating from the other node in the network, a current phase of the network.

* * * * *